United States Patent
Jahan

(10) Patent No.: US 8,950,789 B2
(45) Date of Patent: Feb. 10, 2015

(54) BARBED CONNECTION FOR USE WITH IRRIGATION TUBING

(75) Inventor: Rowshan Jahan, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 591 days.

(21) Appl. No.: 13/197,169

(22) Filed: Aug. 3, 2011

(65) Prior Publication Data

US 2011/0285126 A1 Nov. 24, 2011

Related U.S. Application Data

(63) Continuation-in-part of application No. 12/972,271, filed on Dec. 17, 2010, and a continuation-in-part of application No. 12/642,546, filed on Dec. 18, 2009.

(51) Int. Cl.
*F16L 33/00* (2006.01)
*F16L 47/00* (2006.01)
*F16L 49/00* (2006.01)
(Continued)

(52) U.S. Cl.
CPC ............... *B05B 1/044* (2013.01); *B05B 1/267* (2013.01); *B05B 1/3026* (2013.01); *B05B 15/062* (2013.01); *B05B 15/10* (2013.01); *F16L 33/30* (2013.01); *F16L 37/0985* (2013.01); *F16L 55/1157* (2013.01)
USPC ........... 285/259; 285/256; 285/239; 239/600; 239/207

(58) Field of Classification Search
CPC . F16L 33/207; F16L 33/2076; F16L 33/2073; F16L 33/24; F16L 33/01; F16L 33/30; F16L 33/00; F16L 35/30; F16L 55/1286; F16L 55/115; F16L 55/1157

USPC ....................... 239/203, 204, 582.1, 600, 207; 285/256, 259, 370, 397, 389, 386, 356, 285/395, 354, 393, 247, 246, 239
See application file for complete search history.

(56) References Cited

U.S. PATENT DOCUMENTS 146,622 A 1/1874 Valentine
567,962 A 9/1896 Cooper
(Continued)

FOREIGN PATENT DOCUMENTS

CN 202082527 12/2011
DE 1214062 4/1966
(Continued)

OTHER PUBLICATIONS

Rain Bird's Xeri-Pops Tech Specs, 2005, Rain Bird Corporation, Jan. 2005.
(Continued)

*Primary Examiner* — Dinh Q Nguyen
(74) *Attorney, Agent, or Firm* — Fitch, Even, Tabin & Flannery, LLP

(57) ABSTRACT

A multi-barbed connection suitable for use in connecting a piece of flexible irrigation tubing is provided, where one of the barbs is a circumferential barb configured for forming a generally fluid tight connection with the tubing and another of the barbs is a corner barb having one or more corners configured for biting into the tubing for at least partially assisting in retaining the tubing on the connection. The connection can be part of a fitting for fluidly joining multiple pieces of tubing or part of an irrigation device, such as a pop-up irrigation sprinkler.

19 Claims, 39 Drawing Sheets

(51) Int. Cl.
*B05B 1/04* (2006.01)
*B05B 1/26* (2006.01)
*B05B 1/30* (2006.01)
*B05B 15/06* (2006.01)
*B05B 15/10* (2006.01)
*F16L 33/30* (2006.01)
*F16L 37/098* (2006.01)
*F16L 55/115* (2006.01)

(56) References Cited

U.S. PATENT DOCUMENTS

| | | | |
|---|---|---|---|
| 589,216 A * | 8/1897 | McKee | 285/239 |
| 1,015,904 A | 1/1912 | Niederlander et al. | |
| 1,853,805 A | 4/1932 | Elder | |
| 1,996,855 A | 10/1933 | Cheswright | |
| 1,987,499 A | 1/1935 | Tabozzi | |
| 2,066,473 A * | 1/1937 | Jorgensen | 285/237 |
| 2,262,585 A | 11/1941 | Irmischer | |
| 2,314,000 A | 3/1943 | Lusher et al. | |
| 2,314,001 A | 3/1943 | Lusher et al. | |
| 2,626,167 A | 1/1953 | Lake | |
| 2,810,603 A | 10/1957 | Storch | |
| 2,968,440 A | 1/1961 | Cone | |
| 3,046,698 A | 7/1962 | Breen et al. | |
| 3,067,950 A | 12/1962 | Goldman | |
| D200,641 S | 3/1965 | Halligan | |
| 3,193,205 A | 7/1965 | Hanson | |
| 3,221,746 A | 12/1965 | Noble | |
| D204,670 S | 5/1966 | Gilson | |
| 3,323,725 A | 6/1967 | Hruby, Jr. | |
| 3,454,225 A | 7/1969 | Hunter | |
| D217,794 S | 6/1970 | Johnson | |
| 3,589,616 A * | 6/1971 | Stephens | 239/204 |
| 3,711,130 A | 1/1973 | Betzler | |
| 3,794,249 A | 2/1974 | Lockwood | |
| 3,799,453 A | 3/1974 | Hart | |
| D233,340 S | 10/1974 | Diedrich et al. | |
| D235,343 S | 6/1975 | Otto | |
| 3,940,066 A | 2/1976 | Hunter | |
| 3,944,261 A | 3/1976 | Reed et al. | |
| 3,957,292 A | 5/1976 | Diggs | |
| 3,977,066 A | 8/1976 | Sands et al. | |
| 3,980,325 A | 9/1976 | Robertson | |
| 4,095,744 A | 6/1978 | Villelli | |
| D251,734 S | 5/1979 | McCaw et al. | |
| 4,168,043 A | 9/1979 | vonBernuth | |
| D254,505 S | 3/1980 | Parsons et al. | |
| D254,863 S | 4/1980 | Hayes | |
| 4,220,283 A | 9/1980 | Citron | |
| 4,226,815 A | 10/1980 | Cockman | |
| 4,253,684 A | 3/1981 | Tolbert et al. | |
| 4,257,629 A | 3/1981 | Maple et al. | |
| D259,278 S | 5/1981 | McCaw et al. | |
| 4,274,583 A | 6/1981 | Hunter | |
| D260,810 S | 9/1981 | Cleveland | |
| 4,305,608 A | 12/1981 | Stuemky et al. | |
| 4,316,579 A | 2/1982 | Ray et al. | |
| 4,334,551 A | 6/1982 | Pfister | |
| 4,349,049 A | 9/1982 | Silvey | |
| 4,351,477 A | 9/1982 | Choi | |
| 4,353,506 A | 10/1982 | Hayes | |
| 4,392,616 A | 7/1983 | Olson | |
| 4,392,678 A | 7/1983 | Adamczyk | |
| 4,408,786 A | 10/1983 | Stuemky | |
| 4,459,318 A | 7/1984 | Hyans | |
| 4,460,129 A | 7/1984 | Olson | |
| 4,479,796 A | 10/1984 | Kallok | |
| 4,511,163 A | 4/1985 | Harris et al. | |
| 4,522,339 A | 6/1985 | Costa | |
| 4,526,572 A | 7/1985 | Donnan et al. | |
| D282,962 S | 3/1986 | Gerber | |
| D283,641 S | 4/1986 | Spetzler et al. | |
| 4,583,767 A | 4/1986 | Hansen | |
| D283,725 S | 5/1986 | Mahoney | |
| D284,222 S | 6/1986 | Hamilton | |
| 4,597,594 A | 7/1986 | Kacalieff et al. | |
| 4,635,972 A | 1/1987 | Lyall | |
| 4,650,473 A | 3/1987 | Bartholomew et al. | |
| D290,646 S | 6/1987 | Cook | |
| 4,693,707 A | 9/1987 | Dye | |
| 4,703,957 A | 11/1987 | Blenkush | |
| 4,722,481 A | 2/1988 | Lemkin | |
| 4,726,612 A | 2/1988 | Picton | |
| 4,729,511 A | 3/1988 | Citron | |
| 4,745,950 A | 5/1988 | Mathieu | |
| 4,752,033 A | 6/1988 | Groendyke | |
| 4,757,588 A | 7/1988 | Churchich | |
| 4,778,447 A | 10/1988 | Velde et al. | |
| 4,787,557 A | 11/1988 | Jackson | |
| 4,787,558 A | 11/1988 | Sexton et al. | |
| 4,790,481 A | 12/1988 | Ray et al. | |
| 4,790,832 A | 12/1988 | Lopez | |
| D300,361 S | 3/1989 | Tokarz | |
| 4,819,875 A | 4/1989 | Beal | |
| 4,834,292 A | 5/1989 | Dyck | |
| 4,844,516 A | 7/1989 | Baker | |
| 4,875,719 A | 10/1989 | Mylett | |
| 4,913,352 A | 4/1990 | Witty et al. | |
| 4,971,366 A | 11/1990 | Towsley | |
| 4,984,740 A | 1/1991 | Hodge | |
| 4,994,048 A | 2/1991 | Metzger | |
| 5,057,074 A | 10/1991 | Suzuki et al. | |
| 5,063,968 A | 11/1991 | Bartholomew | |
| 5,076,615 A | 12/1991 | Sampson | |
| 5,092,849 A | 3/1992 | Sampson | |
| 5,098,395 A | 3/1992 | Fields | |
| 5,104,150 A | 4/1992 | Bard et al. | |
| 5,139,483 A | 8/1992 | Ryan | |
| 5,140,738 A | 8/1992 | Pinkerman, Jr. | |
| 5,163,618 A | 11/1992 | Cordua | |
| D333,178 S | 2/1993 | Novy | |
| D333,179 S | 2/1993 | Mikiya et al. | |
| 5,205,821 A | 4/1993 | Kruger et al. | |
| 5,257,826 A | 11/1993 | Prassas et al. | |
| 5,259,894 A | 11/1993 | Sampson | |
| 5,265,802 A | 11/1993 | Hobbs et al. | |
| 5,265,803 A | 11/1993 | Thayer | |
| 5,335,943 A | 8/1994 | Duryea | |
| 5,335,944 A | 8/1994 | Mitsui et al. | |
| 5,351,674 A | 10/1994 | Hawks | |
| 5,381,832 A | 1/1995 | Mitsui | |
| 5,405,339 A | 4/1995 | Kohnen et al. | |
| 5,415,348 A | 5/1995 | Nelson | |
| 5,483,731 A | 1/1996 | Prendel et al. | |
| 5,487,571 A * | 1/1996 | Robertson | 285/259 |
| 5,507,436 A | 4/1996 | Ruttenberg | |
| 5,507,532 A | 4/1996 | Mitsui | |
| 5,527,072 A | 6/1996 | Norkey | |
| D372,093 S | 7/1996 | Sampson et al. | |
| 5,553,786 A | 9/1996 | Israel | |
| D375,160 S | 10/1996 | Sampson et al. | |
| 5,573,280 A | 11/1996 | Salter et al. | |
| 5,592,726 A | 1/1997 | Suresh | |
| 5,613,802 A | 3/1997 | Farrell | |
| 5,620,427 A | 4/1997 | Werschmidt et al. | |
| 5,636,937 A | 6/1997 | Zemlicka | |
| D382,639 S | 8/1997 | Musgrave et al. | |
| D387,147 S | 12/1997 | Vandermast et al. | |
| D388,876 S | 1/1998 | Sampson | |
| 5,709,415 A | 1/1998 | Witter | |
| 5,772,262 A | 6/1998 | Dupont et al. | |
| 5,779,148 A | 7/1998 | Saarem et al. | |
| 5,853,202 A * | 12/1998 | Li et al. | 285/256 |
| 5,947,386 A | 9/1999 | Dick et al. | |
| D415,415 S | 10/1999 | Robertson | |
| 6,007,001 A | 12/1999 | Hilton | |
| 6,035,887 A | 3/2000 | Cato | |
| 6,045,059 A | 4/2000 | Weller | |
| 6,050,608 A | 4/2000 | Hattori et al. | |
| 6,086,115 A | 7/2000 | Sahu | |
| D429,627 S | 8/2000 | Gradwell | |
| 6,152,913 A | 11/2000 | Feith et al. | |
| D441,435 S | 5/2001 | Patteson et al. | |

(56) References Cited

U.S. PATENT DOCUMENTS

| | | |
|---|---|---|
| 6,231,085 B1 | 5/2001 | Olson |
| 6,234,411 B1 | 5/2001 | Walker |
| D445,182 S | 7/2001 | Haynes |
| 6,299,075 B1 | 10/2001 | Koller |
| D451,174 S | 11/2001 | Patteson et al. |
| D451,584 S | 12/2001 | Patteson et al. |
| D453,817 S | 2/2002 | Patteson et al. |
| 6,412,484 B1 | 7/2002 | Izuchukwu et al. |
| 6,443,500 B1 | 9/2002 | Inoue et al. |
| D468,015 S | 12/2002 | Horppu |
| 6,499,678 B1 | 12/2002 | Hope |
| 6,505,861 B2 | 1/2003 | Butterfield et al. |
| 6,516,496 B2 | 2/2003 | Ekron |
| 6,520,265 B2 | 2/2003 | Winebrenner |
| D471,261 S | 3/2003 | Kozu |
| D471,262 S | 3/2003 | Kozu |
| 6,536,718 B2 | 3/2003 | Benito-Navazo |
| 6,540,264 B1 | 4/2003 | Yokoyama et al. |
| 6,561,550 B1 | 5/2003 | Kiraz |
| 6,568,608 B2 | 5/2003 | Sirkin |
| 6,581,262 B1 | 6/2003 | Myers |
| 6,637,672 B2 | 10/2003 | Cordua |
| D486,884 S | 2/2004 | Gregory |
| D487,148 S | 2/2004 | Ellingboe et al. |
| D488,866 S | 4/2004 | O'Dell |
| 6,719,330 B2 | 4/2004 | Brown et al. |
| 6,726,253 B2 | 4/2004 | Inoue et al. |
| 6,732,950 B2 | 5/2004 | Ingham, Jr. et al. |
| 6,758,410 B2 | 7/2004 | Kuo |
| 6,779,269 B2 | 8/2004 | Green et al. |
| 6,783,160 B2 | 8/2004 | Rowley |
| 6,799,732 B2 | 10/2004 | Sirkin |
| 6,837,448 B2 | 1/2005 | Han et al. |
| 6,899,355 B2 | 5/2005 | Klein et al. |
| D508,980 S | 8/2005 | Bigelow |
| 6,928,708 B1 | 8/2005 | Larock |
| 6,988,747 B2 | 1/2006 | Allen et al. |
| 6,997,393 B1 | 2/2006 | Angold et al. |
| 7,014,215 B2 | 3/2006 | Cooper et al. |
| 7,014,218 B2 | 3/2006 | Fisher et al. |
| D518,573 S | 4/2006 | French |
| 7,021,672 B2 | 4/2006 | Ericksen et al. |
| 7,048,208 B1 | 5/2006 | Pruitt et al. |
| D530,796 S | 10/2006 | Zielke et al. |
| 7,134,696 B2 | 11/2006 | Poll |
| 7,163,238 B1 | 1/2007 | Mittersteiner et al. |
| 7,226,003 B2 | 6/2007 | Kah, Jr. et al. |
| 7,234,651 B2 | 6/2007 | Mousavi et al. |
| 7,234,652 B2 | 6/2007 | Rodeman |
| 7,255,291 B1 | 8/2007 | Lo |
| 7,293,804 B2 | 11/2007 | Li et al. |
| 7,303,153 B2 | 12/2007 | Han |
| D558,553 S | 1/2008 | Feith |
| 7,322,533 B2 | 1/2008 | Grizzle |
| 7,322,617 B2 | 1/2008 | Paquis |
| D562,939 S | 2/2008 | Lo |
| 7,325,753 B2 | 2/2008 | Gregory et al. |
| 7,346,986 B2 | 3/2008 | Feith |
| 7,360,718 B2 | 4/2008 | Yeh et al. |
| 7,360,800 B2 | 4/2008 | Poll et al. |
| D570,457 S | 6/2008 | Brown |
| 7,419,194 B2 | 9/2008 | Feith |
| 7,448,653 B2 | 11/2008 | Jensen et al. |
| 7,472,840 B2 | 1/2009 | Gregory |
| 7,494,479 B2 | 2/2009 | Montalvo et al. |
| 7,497,480 B2 | 3/2009 | Kerin et al. |
| 7,500,619 B2 | 3/2009 | Lockwood |
| 7,500,620 B2 | 3/2009 | Cordua |
| 7,506,899 B2 | 3/2009 | Feith |
| D597,637 S | 8/2009 | Krohmer et al. |
| 7,581,687 B2 | 9/2009 | Feith et al. |
| 7,597,276 B2 | 10/2009 | Hawkins |
| 7,611,077 B2 | 11/2009 | Sesser et al. |
| 7,621,464 B2 | 11/2009 | Smith et al. |
| 7,621,467 B1 | 11/2009 | Garcia |
| 7,644,870 B2 | 1/2010 | Alexander et al. |
| 7,654,474 B2 | 2/2010 | Cordua |
| 7,658,420 B2 | 2/2010 | Harger et al. |
| 7,677,474 B2 | 3/2010 | Markley et al. |
| 7,681,807 B2 | 3/2010 | Gregory |
| 7,686,235 B2 | 3/2010 | Roberts |
| 7,686,236 B2 | 3/2010 | Alexander |
| 7,717,475 B2 | 5/2010 | Savelle, Jr. et al. |
| 7,726,587 B2 | 6/2010 | Markley et al. |
| 7,731,244 B2 | 6/2010 | Miros et al. |
| D620,550 S | 7/2010 | Feith et al. |
| 7,757,704 B2 | 7/2010 | Lien |
| 7,766,259 B2 | 8/2010 | Feith et al. |
| 7,770,821 B2 | 8/2010 | Pinch |
| 7,770,939 B2 | 8/2010 | Jensen et al. |
| 7,793,868 B2 | 9/2010 | Kah, Jr. et al. |
| 7,823,804 B2 | 11/2010 | Cordua |
| 7,841,547 B2 | 11/2010 | Kah, Jr. et al. |
| 7,850,094 B2 | 12/2010 | Richmond et al. |
| 7,861,948 B1 | 1/2011 | Crooks |
| 7,862,090 B1 | 1/2011 | Foreman |
| 7,878,553 B2 | 2/2011 | Wicks et al. |
| 7,900,851 B2 | 3/2011 | Ruttenberg |
| 8,011,604 B1 | 9/2011 | Holtsnider et al. |
| 8,038,082 B2 | 10/2011 | Belford |
| 8,070,189 B2 | 12/2011 | Yow |
| 8,109,538 B2 | 2/2012 | Helstern |
| 2002/0096023 A1 | 7/2002 | Sanford |
| 2003/0077110 A1 | 4/2003 | Knowles |
| 2005/0194464 A1 | 9/2005 | Bruninga |
| 2006/0006643 A1 | 1/2006 | Schultz |
| 2006/0053608 A1 | 3/2006 | Wu |
| 2006/0192029 A1 | 8/2006 | Grizzle |
| 2006/0283976 A1 | 12/2006 | Wlodarczyk |
| 2007/0119976 A1 | 5/2007 | Kah, Jr. et al. |
| 2007/0134980 A1 | 6/2007 | Poll et al. |
| 2007/0152442 A1 | 7/2007 | Cleveland et al. |
| 2007/0235559 A1 | 10/2007 | Miyake |
| 2008/0012303 A1 | 1/2008 | Poll et al. |
| 2008/0221469 A1 | 9/2008 | Shevchuk |
| 2008/0272594 A1 | 11/2008 | Phillipps |
| 2009/0026286 A1 | 1/2009 | Park |
| 2009/0032614 A1 | 2/2009 | Ruttenberg |
| 2009/0188991 A1 | 7/2009 | Russell et al. |
| 2009/0212559 A1 | 8/2009 | Werth |
| 2009/0220294 A1 | 9/2009 | Proulx et al. |
| 2009/0224070 A1 | 9/2009 | Clark et al. |
| 2009/0232595 A1 | 9/2009 | Willemstyn et al. |
| 2009/0278347 A1 | 11/2009 | Kerin et al. |
| 2010/0007134 A1 | 1/2010 | Elton et al. |
| 2010/0013215 A1 | 1/2010 | Werth |
| 2010/0032943 A1 | 2/2010 | Li et al. |
| 2010/0052313 A1 | 3/2010 | Ishida et al. |
| 2010/0066073 A1 | 3/2010 | Jensen et al. |
| 2010/0078508 A1 | 4/2010 | South et al. |
| 2010/0078934 A1 | 4/2010 | Matsunaga |
| 2010/0090024 A1 | 4/2010 | Hunnicutt et al. |
| 2010/0090036 A1 | 4/2010 | Allen et al. |
| 2010/0090461 A1 | 4/2010 | Spielmann |
| 2010/0109319 A1 | 5/2010 | Zhang et al. |
| 2010/0112261 A1 | 5/2010 | Van Lumig et al. |
| 2010/0116901 A1 | 5/2010 | Roney et al. |
| 2010/0129140 A1 | 5/2010 | Lyon |
| 2010/0147973 A1 | 6/2010 | Wang |
| 2010/0176217 A1 | 7/2010 | Richmond et al. |
| 2010/0176589 A1 | 7/2010 | Bauer |
| 2010/0193603 A1 | 8/2010 | Lo |
| 2010/0219629 A1 | 9/2010 | Kerin et al. |
| 2010/0225104 A1 | 9/2010 | Ully et al. |
| 2010/0225108 A1 | 9/2010 | Mann |
| 2010/0230961 A1 | 9/2010 | Johnson |
| 2010/0244438 A1 | 9/2010 | Johanson |
| 2010/0294854 A1 | 11/2010 | McAfee et al. |
| 2010/0301599 A1 | 12/2010 | Jensen et al. |
| 2010/0327579 A1 | 12/2010 | Montena |
| 2011/0016682 A1 | 1/2011 | Wood, III |
| 2011/0024523 A1 | 2/2011 | Sesser et al. |
| 2011/0036925 A1 | 2/2011 | Cordua |
| 2011/0036933 A1 | 2/2011 | Kah, Jr. et al. |

(56) References Cited

U.S. PATENT DOCUMENTS

| | | |
|---|---|---|
| 2011/0042485 A1 | 2/2011 | McNulty et al. |
| 2011/0057048 A1 | 3/2011 | McAfee |
| 2011/0068195 A1 | 3/2011 | Franks et al. |
| 2011/0079661 A1 | 4/2011 | Barton |
| 2011/0084151 A1 | 4/2011 | Dunn et al. |
| 2011/0147484 A1 | 6/2011 | Jahan et al. |
| 2011/0147488 A1 | 6/2011 | Walker et al. |
| 2011/0147489 A1 | 6/2011 | Walker et al. |
| 2011/0198410 A1 | 8/2011 | Curtis |
| 2011/0297757 A1 | 12/2011 | Schmuckle |
| 2012/0012678 A1 | 1/2012 | Gregory |
| 2012/0037722 A1 | 2/2012 | Shahak |

FOREIGN PATENT DOCUMENTS

| | | |
|---|---|---|
| DE | 2949315 | 7/1980 |
| DE | 3003368 | 8/1981 |
| EP | 0530404 | 3/1993 |
| GB | 2049856 | 12/1980 |

OTHER PUBLICATIONS

Written Opinion of the International Searching Authority and International Search Report issued in International Patent Application No. PCT/US10/61132 on Apr. 19, 2011.

Rain Bird Corporation, Landscape Drip/Xerigation 2005-2006 Catalog, p. 271, (catalog illustrates Models XM-TOOL and EMA-RBPX hole punch tools which were on sale or publicly available more than one year prior to the filing date of the instant application).

Rain Bird Corporation, Xerigation 2001 Catalog, p. 199 (catalog illustrates Models XM-TOOL and EMA-BGX hole punch tools which were on sale or publicly available more than one year prior to the filing date of the instant application).

* cited by examiner

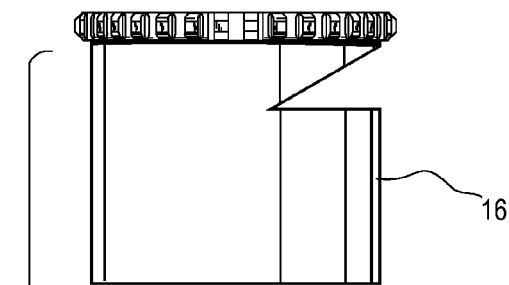
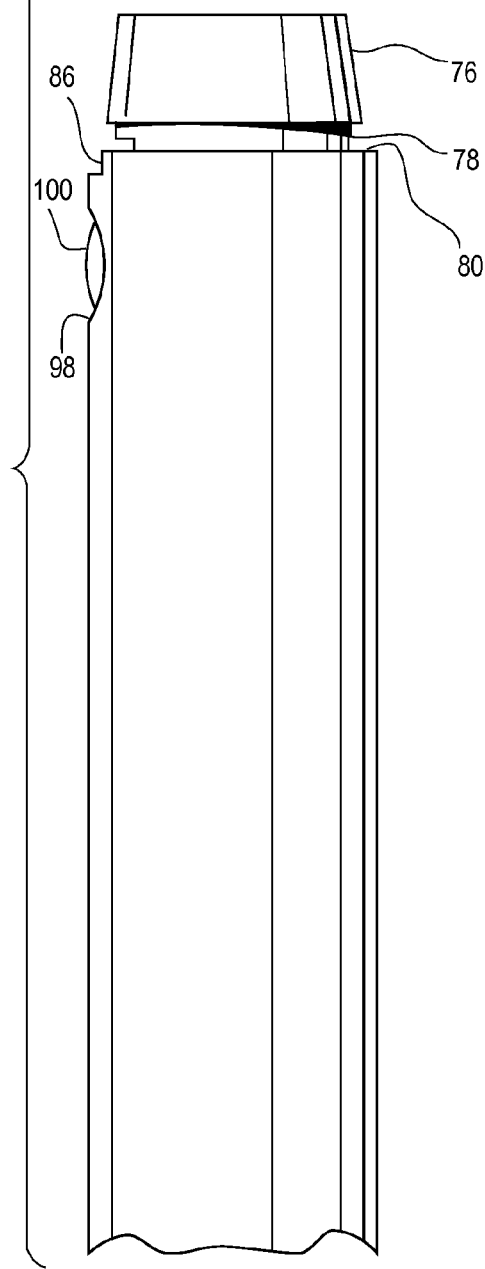
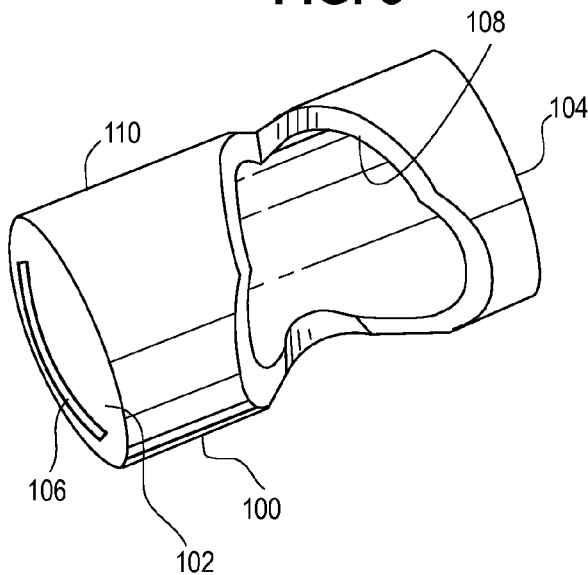

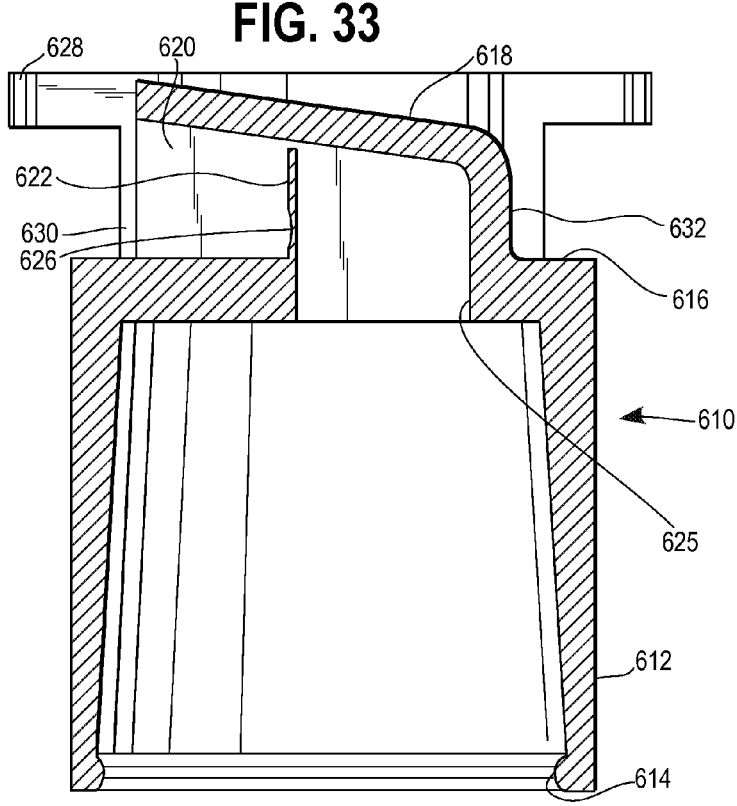
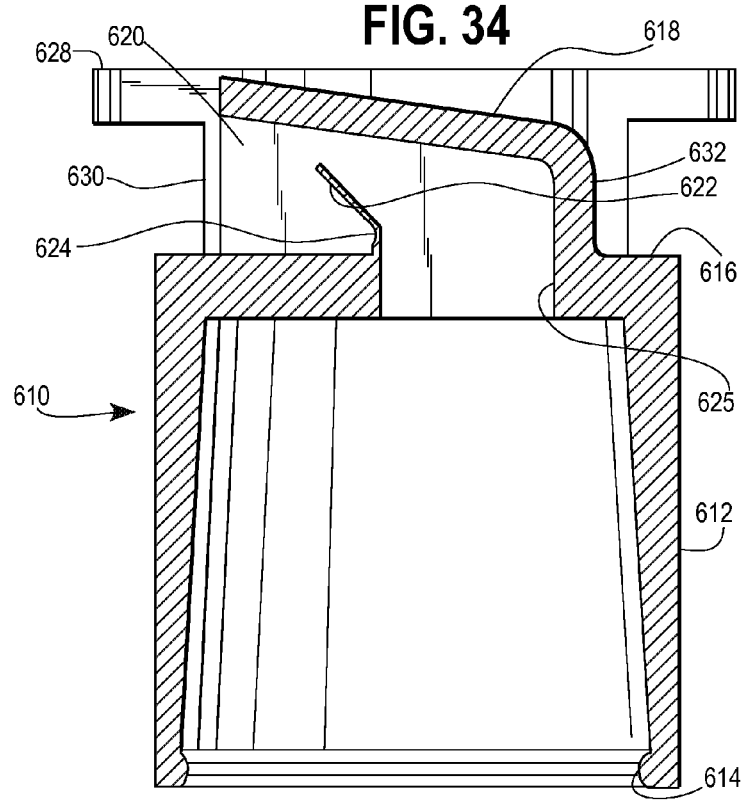

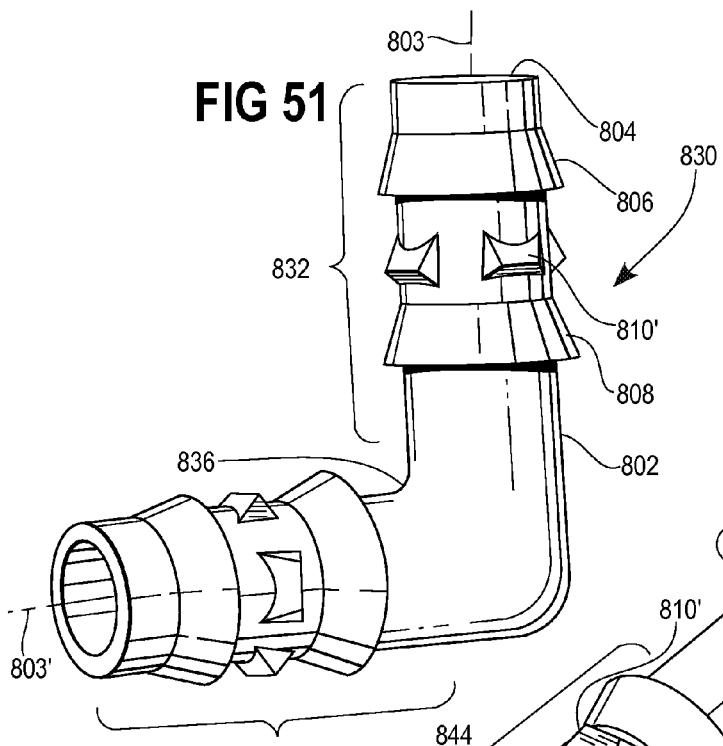
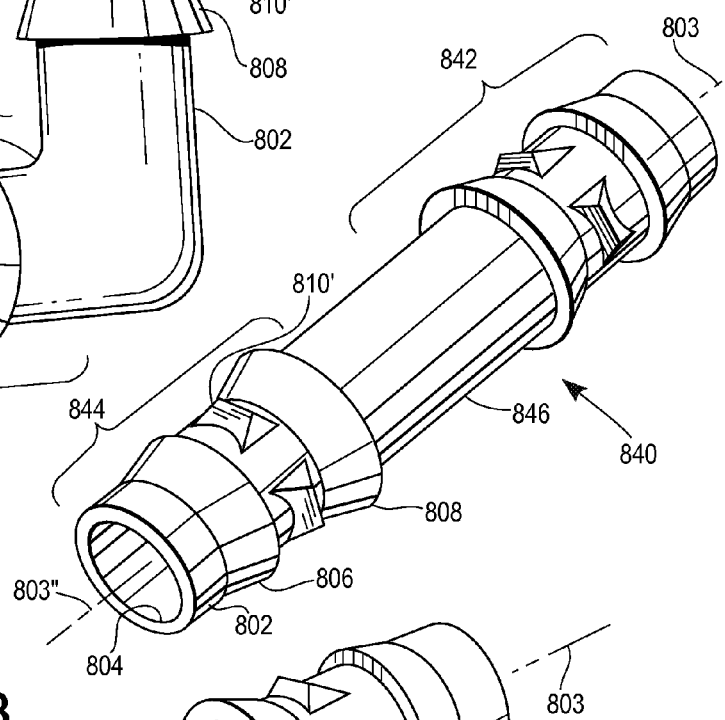
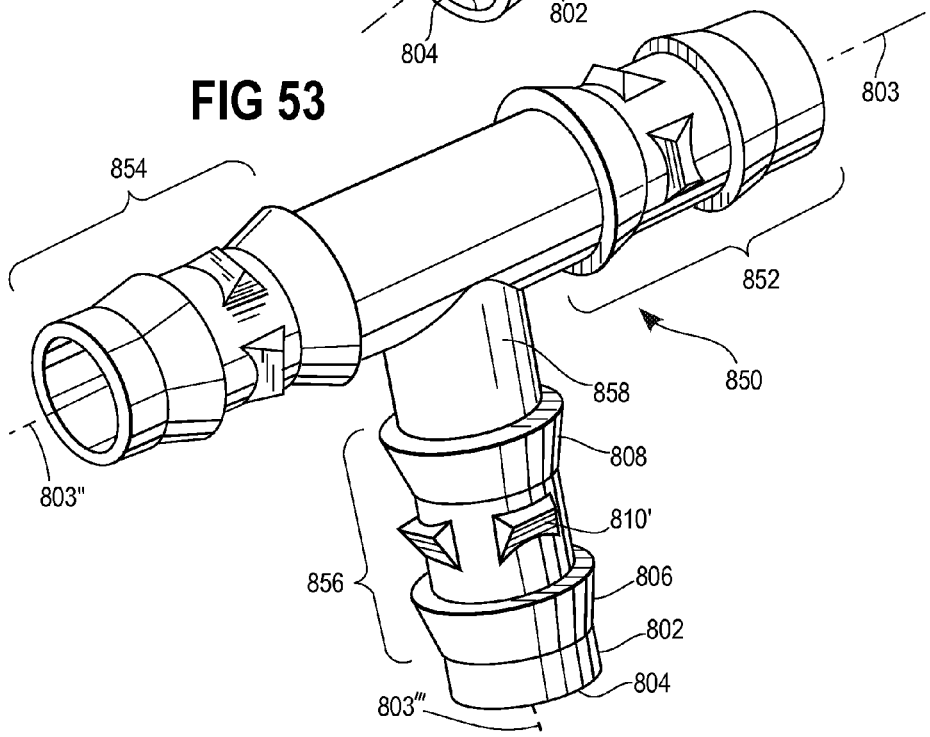

BARBED CONNECTION FOR USE WITH IRRIGATION TUBING

CROSS-REFERENCE TO RELATED APPLICATION

This application is a continuation-in-part of U.S. application Ser. No. 12/972,271, which was filed on Dec. 17, 2010, and U.S. application Ser. No. 12/642,546, which was filed on Dec. 18, 2009, and which are hereby incorporated by reference in their entireties.

FIELD

A barbed connection for use with irrigation tubing is provided and, in particular, a barbed connector that can be used to join irrigation tubing to other irrigation tubing or to an irrigation device for use with low-pressure irrigation systems, such as a pop-up irrigation device.

BACKGROUND

Low-pressure irrigation systems can advantageously provide sufficient irrigation for plants while providing for efficient water consumption. One type of low-pressure irrigation system uses supply tubing having a plurality of drip irrigation devices attached thereto for delivering irrigation water to a precise point at a predetermined and relatively low volume flow rate, such as on the order of ½ gallon per hour up to about 24 gallons per hour.

A common type of drip irrigation device is a drip emitter, which can be disposed in or attached to the supply tubing. The drip emitter can tap a portion of the relatively high pressure irrigation water from the supply tubing for flow through a typically long or small cross section flow path to achieve a desired pressure drop prior to discharge at a target trickle or drip flow rate in order to irrigate a local area adjacent the drip emitter. However, it can be desirable to provide for low-pressure irrigation having a larger flow rate than the trickle or drip flow rate typically provided by a drip emitter, as well as to project the irrigation fluid beyond the local area adjacent a drip emitter. To this end, various types of "pop-up" irrigation devices have been provided for use with low-pressure irrigation systems. "Pop-up" irrigation devices are those that include a riser extensible from a housing.

One type of pop-up irrigation device which releases a relatively low volume of water over a relatively small area as compared to conventional pop-up irrigation sprinklers is disclosed in U.S. Pat. No. 5,613,802. However, this device has several disadvantages. For example, the small diameter, generally flexible body and riser may not be as robust as may be needed. Furthermore, the extensive components that must be located above ground (as shown in FIG. 2) are more susceptible to damage.

Often, nozzle bodies are attached to risers using threading. For example, internal threading on a skirt of the nozzle body can mate with external threading on an end of the riser. This permits a nozzle body to be readily attached or removed from the riser, such as for cleaning or to substitute a different nozzle body. Nozzle bodies and risers are often formed by injection molding of plastic into a mold cavity. In order to make the internal and external threading, complex geometries can be formed in the mold cavities and unscrewing mold components can be used to remove the molded components from the mold cavity. However, both can add to the cost and complexity of the mold cavity and mold equipment, thereby increasing the costs associated with manufacturing the components.

While threading attachment of nozzle bodies can be suitable for many applications, there can be advantages to non-threaded attachment.

SUMMARY

A pop-up irrigation device for use with low-pressure irrigation systems is disclosed. The device is advantageously configured to be more economical to manufacture, have improved reliability in use, to provide for greater flexibility in the installation of low pressure irrigation systems, to reduce installation time and/or to achieve improved durability.

The device has a housing, a riser partially extensible from the housing and a nozzle body removably attached to an end of the riser in either a threaded or a non-threaded manner, such as using a snap-fit. More specifically, the housing has a sidewall, an open end and a closed end that together define an interior of the housing. At least one, and preferable a pair, connection tube extends laterally from the sidewall of the housing and is in fluid communication with the interior of the housing. The connection tube has an open distal end, spaced from the housing, which is configured to be connectable to flexible irrigation tubing. An annular cap optionally may be attached to the open end of the housing and may include an annular, radially-inward extending seal, which may be fixed. The closed end of the housing can optionally include a depending stake with a plurality of blades to facilitate mounting of the housing relative to the ground. Alternatively or in addition, the housing can include one or more ribs extending outwardly to assist in retention of the device in the ground.

The riser is partially extendable from within the interior of the housing and through the cap and seal. The riser has a proximal end portion disposed adjacent the closed end of the housing and a distal end portion that is extendable from the housing. The distal end portion of the riser can have a first segment with a first diameter and a second, uppermost segment with a second diameter. The second diameter may be different than the first diameter, and may be less than the first diameter, such that a step is formed between the first and second segments. The second segment can have an upstanding outer wall with an outwardly-facing circumferential groove that can be used for retaining a snap-on nozzle.

A valve, such as a rotatable plug valve, may optionally be positioned in the first segment of the riser, upstream from the second segment, to control fluid flow through the riser. The valve has an actuator accessible from an exterior of the riser usable to move the plug valve between an open position permitting maximum fluid flow through the valve and a closed position blocking fluid flow through the valve in order to control the distance that fluid is projected from the nozzle. The valve may be recessed within the riser such that it does not interfere with the riser passing through the open end of the housing, including any seal optionally disposed at the open end of the housing.

A seat may be formed in the interior of the riser and can support the valve in a manner that permits rotation of the valve. The seat can have an opening that is selectively restrictable by the valve to control fluid flow from the interior of the housing to the nozzle. In one aspect, the seat can be generally cylindrical and surround the valve, with both an upper opening facing the second segment of the riser and an opposite lower opening. The valve can be shaped as a hollow cylinder with a through port to permit fluid flow through the plug valve. The port may be configured to cooperate with the seat to provide for increasing blockage of the fluid flow when the valve is rotated from its open position to its closed position. The blockage of the fluid flow may increase or decrease either linearly or non-linearly as the plug valve is rotated. The valve can have a closed end with the actuator formed thereon, such as a slot for a screwdriver or other tool. The closed end with the actuator can be accessible through an opening in a sidewall of the riser. The riser may have a longitudinal axis and the valve may have an axis of rotation that is substantially perpendicular to the longitudinal axis of the riser.

A removable, snap on nozzle body can be attachable to the second segment of the distal end of the riser in one aspect. The nozzle body has a top, an outer skirt and at least one orifice for discharging fluid from the interior of the housing via the riser. The skirt can have an inwardly extending protuberance configured to engage the groove of the second segment of the riser to attach the nozzle to the second end of the riser. In one aspect of the nozzle body, the second segment of the distal end portion of the riser can have an upstanding inner wall spaced radially inward from the outer wall. An inner skirt of the nozzle body can be configured to engage, such as in a generally sealing manner, the inner wall of the second segment of the distal end portion of the riser in order to define a fluid chamber between the inner and outer skirts of the nozzle body.

In one version of a nozzle body, there is an inclined deflector disposed below the top of the nozzle body and spaced from an intermediate wall and inclined relative thereto. The deflector can be configured to direct fluid exiting the discharge orifice in a spray pattern, with the discharge orifice extending through the intermediate wall.

In another version, the nozzle body can have an outwardly-facing opening bounded by a top wall, a bottom wall and a pair of sidewalls. A discharge orifice can be formed in the bottom wall for directing water into the opening where it contacts the surfaces thereof and is directed outwardly. The volume of water adjacent the sidewalls can be increased to provide increased and more visible edges of the issuing flow pattern. This can be accomplished by increasing the surface area of the sidewalls as opposed to simply planar sidewalls, such as by adding outwardly extending notches. The arcuate extent of the issuing flow pattern can be determined by the spacing between the sidewalls. More than one opening can be combined to achieve a desired arcuate extent of the issuing flow patterns.

In another aspect, a nozzle body is provided that is suitable for attachment to a riser of an irrigation device, and comprises a hollow, outer cylindrical skirt having an upper portion substantially closed by an upper wall and an open lower portion and defining a boundary of an outer chamber; and a mouth in the outer cylindrical skirt opening radially outward, the mouth being in fluid communication with the outer chamber via an discharge orifice. The mouth can be bounded at least in part by a pair of sidewalls, at least one of the sidewalls having an outwardly extending notch effective to increase the fraction of water volume flowing adjacent thereto as compared to if the sidewall did not have the notch.

In yet another version, the nozzle body can have a plurality of discharge orifices that are each configured to discharge a stream of fluid. The inner skirt may have a plurality of openings in fluid communication with the discharge orifices and upstream thereof. The size and number of the openings and the size and number of the orifices can optionally be selected to create a pressure drop therebetween. A pressure drop can advantageously be used to control the distance of the throw of the irrigation fluid and can lessen the load on the nozzle, the latter of which can be particularly useful when the nozzle has a snap connection to the riser.

The nozzles described above for use with the afore-mentioned pop-up device can be provided on a unitary nozzle bush or other arrangement. The nozzle arrangement comprises a carrier with a plurality of different nozzles disposed about its periphery or along a edge thereof, in the case of a nozzle bush generally resembling a bush or tree. The nozzle arrangement can be formed by injection molding plastic to create a unitary body, with the individual nozzles detachable from the carrier as desired. Various tools can optionally be combined with the carrier, such as a flush tool for use in flushing the lines through the device when attached to a device and a nozzle removal tool for use in removing the nozzles when attached to a device.

In one aspect, the nozzle bush or otherwise shaped arrangement includes a carrier having a flush tool. The carrier includes a generally planar body with a centrally-located depending skirt. The skirt has a diameter sized to snap on to the uppermost segment of the riser. More specifically, the skirt has a free end portion with an inwardly extending annular protuberance which permits the carrier to be snapped onto a riser of an irrigation device, such as with the protuberance at least partially inserted into the outwardly facing groove of the riser. The carrier can have an opening coextensive with the skirt and positioned to direct fluid flow outward from the opening in a direction inclined relative to a longitudinal center axis of the skirt when the skirt is attached to the riser during flushing of the irrigation device to direct the exiting fluid away from a user.

A plurality of nozzle bodies can each be removably connected via a bridge to a periphery of the carrier. Each of the nozzle bodies can have a top, an outer skirt and at least one orifice for discharging fluid. The outer skirt can include an inwardly extending protuberance configured to engage the groove of the riser when attached to the riser, and can be designed to attach to the same riser as the skirt of the carrier of the nozzle bush or otherwise arrangement.

Flush caps are provided for use with the devices described herein, as well as other irrigation devices. The flush caps can be attached to the riser during installation to restrict debris from entering the housing. When a given device is first pressurized with water, the flush cap has a large exit opening that can allow debris to be passed out of the housing. To further restrict debris from entering the housing, a moveable flap can be integrally formed with the flush cap. The moveable flap can move from a closed position at least generally blocking entrance of debris to an open position, such as by pivoting about a living hinge, when pressurized. After initial pressurization, the flush cap can be removed and replaced with a suitable nozzle body.

The nozzle bodies and flush caps described herein can be used with the irrigation devices described herein, but are not limited to such use and can be used with irrigation devices that differ, such as irrigation devices with fixed risers.

A multi-barbed connection suitable for use in connecting a piece of flexible irrigation tubing is provided, where one of the barbs is a circumferential barb configured for forming a generally fluid tight connection with the tubing and another of the barbs is a corner barb having one or more corners configured for biting into the tubing for at least partially assisting in retaining the tubing on the connection. One, two, three or four, or other numbers, of corner barbs can be provided in a ring about the circumference of the connection. The connection can optionally include a second circumferential barb spaced from the first circumferential barb by the corner barb, with the second circumferential barb preferably having a larger diameter than the first circumferential barb such that different diameters of tubing can be used with the connection. The corner barbs can be aligned in one or more circumferential rings about the connection. The connection can be part of a fitting for fluidly joining multiple pieces of tubing or part of an irrigation device, such as the pop-up irrigation sprinklers described herein.

BRIEF DESCRIPTION OF THE DRAWINGS

FIG. 7 is an exploded view of the nozzle and end portion of the riser and nozzle of FIG. 1;

FIG. 8 is a perspective view of a plug valve of the riser of the pop-up irrigation device of FIG. 1 rotatable to adjust the flow through the riser to the attached nozzle;

FIG. 33 is a section view of the second embodiment of the flush cap of FIG. 32 taken along line 34-34 thereof, but showing a flap in a closed position;

FIG. 34 is a section view of the second embodiment of the flush cap of FIG. 32 taken along line 34-34, and showing the flap in an open position;

FIG. 51 is a perspective view of an elbow connector for irrigation tubing having a pair of perpendicular arms each having a corner barb disposed between a pair of circumferential barbs;

FIG. 52 is a perspective view of a straight connector for irrigation tubing having a pair of coaxial arms each having a corner barb disposed between a pair of circumferential barbs;

FIG. 53 is a perspective view of a T-connector for irrigation tubing having a pair of coaxial arms bisected by a perpendicular arm each having a corner barb disposed between a pair of circumferential barbs;

DETAILED DESCRIPTION OF THE DRAWINGS

A first embodiment of a pop-up irrigation device 10 and components thereof illustrated in FIGS. 1-8 and 16-18 includes a housing 12, a riser 14 partially extensible from within the housing and a nozzle body, exemplary embodiments of which are illustrated in FIGS. 9-15, attached to an end of the riser 14 that is extensible from within the housing 12. A spring 44 biases the riser 14 and hence the nozzle body to a retracted position. When the interior of the housing 12 is pressurized with irrigation fluid, the riser 14 and nozzle body can extend from the housing to an extended position against the biasing force of the spring 44 and irrigation fluid can be discharged through one or more orifices of the nozzle body, as will be discussed in greater detail herein.

Figure 1:
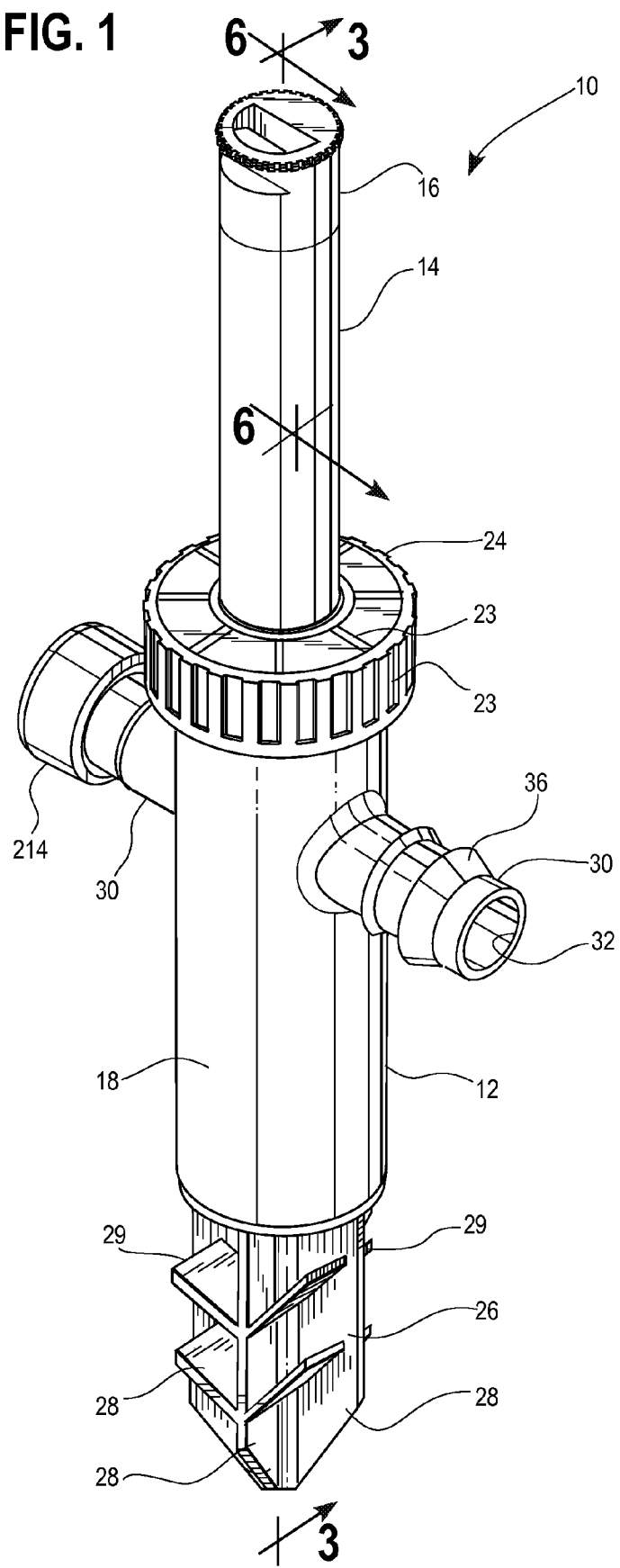
FIG. 1 is a perspective view of a first embodiment of a pop-up irrigation device showing a riser in an extended position relative to a housing and with an attached first embodiment of a nozzle.
Figure 2:
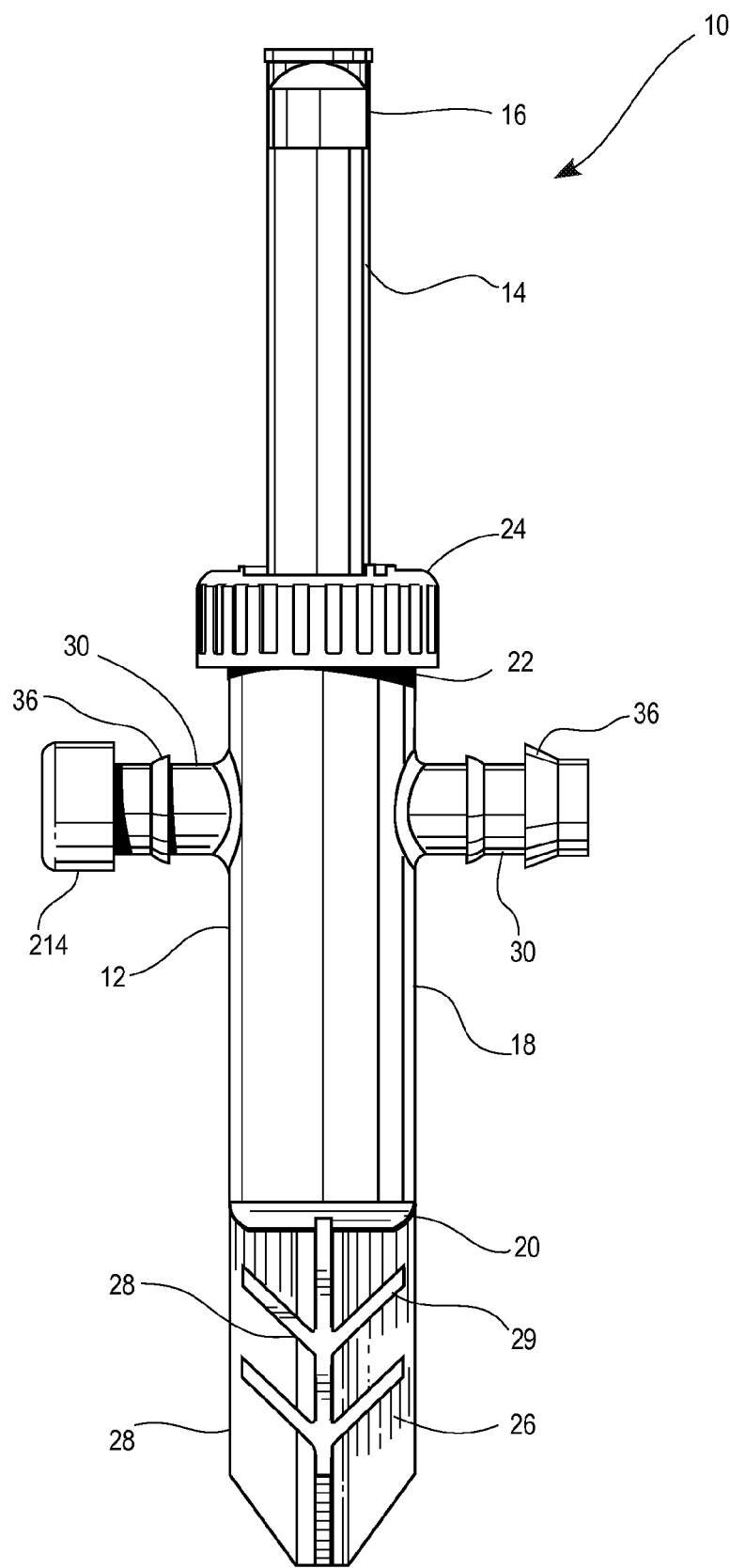
FIG. 2 is a front elevation view of the pop-up irrigation device of FIG. 1 showing the riser in the extended position.
Figure 3:
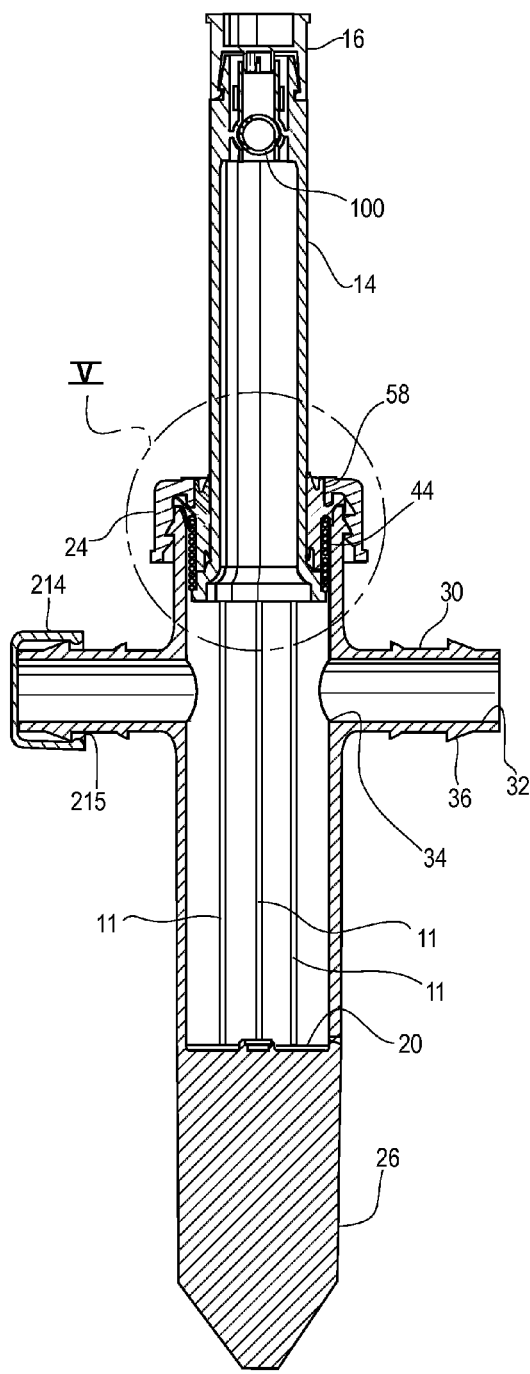
FIG. 3 is a section view of the pop-up irrigation device of FIG. 1 showing the riser in the extended position taken along line 3-3 of FIG. 1.
Figure 4:
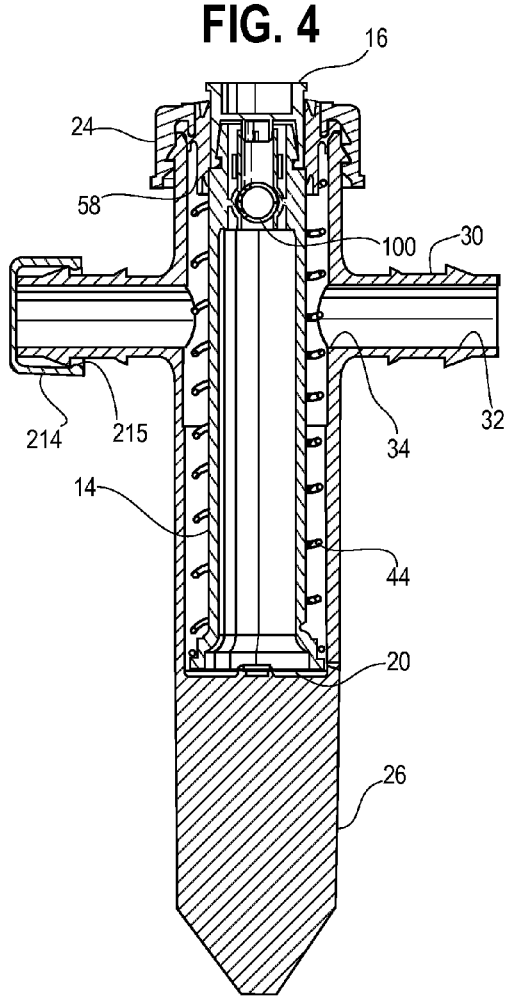
FIG. 4 is a section view of the pop-up irrigation device of FIG. 1 similar to that view shown in FIG. 3 but depicting the riser in a retracted position.

The housing 12 includes a cylindrical sidewall 18 with a closed, lower end 20 and an opposite, upper, open end 22, which together define an interior of the housing 12, as illustrated in FIGS. 3 and 4. A cap 24 is removably attachable to the upper end of the sidewall 18 of the housing 12. The compression spring 44 is disposed within the interior of the housing 12 and biases the riser 16 to its retracted position. When the interior of the housing 12 is sufficiently pressurized with fluid, the riser 14 can shift to its extended position—against the biasing force of the spring 44—to elevate the upper end of the riser 14 and the nozzle body 16 attached thereto above the housing 14, as depicted in FIGS. 1 and 2. The sidewall 18 of the housing 12 has a generally constant inner and outer diameter, with variations contemplated for draft angles and other such modifications for ease of manufacturing when formed of injection-molded plastic.

Figure 5:
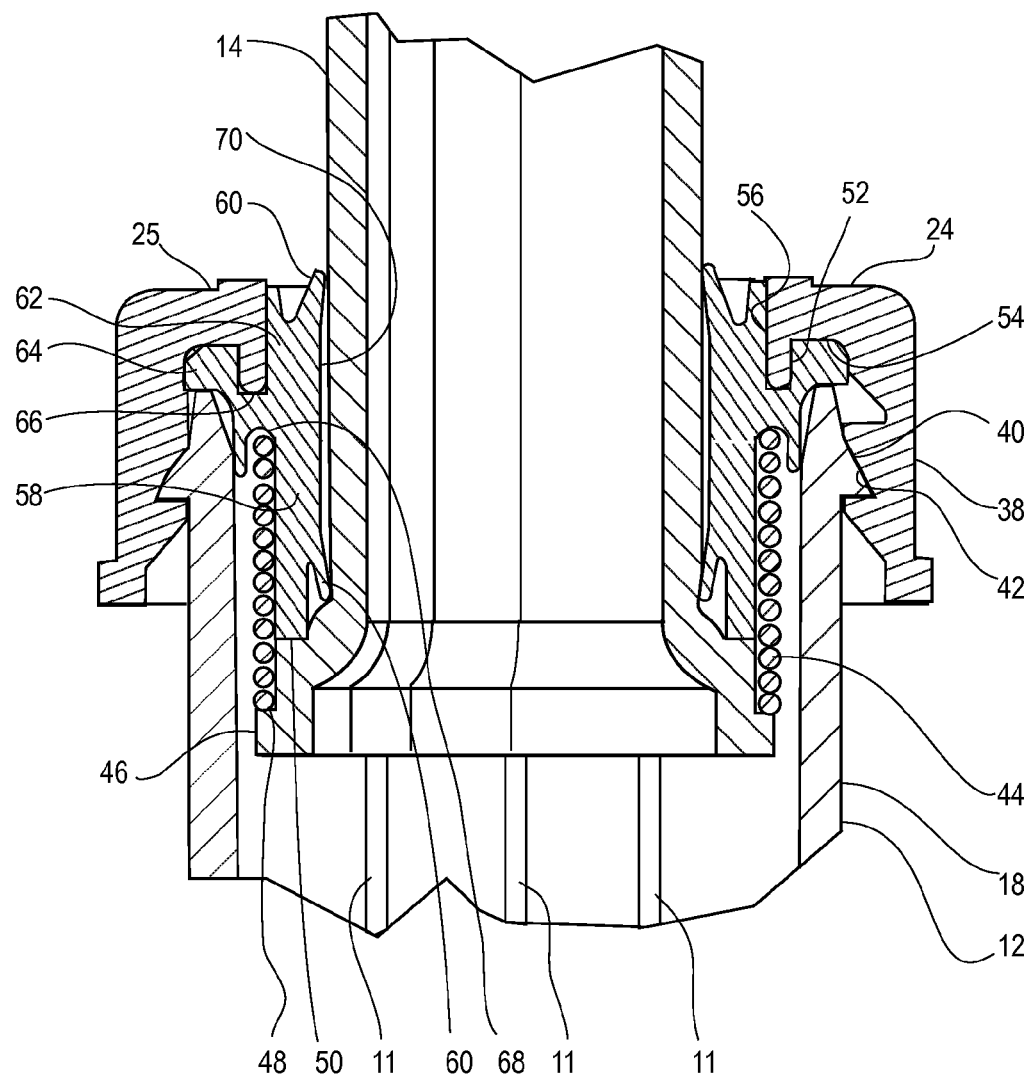
FIG. 5 is a detailed view of region V of the section view of the pop-up irrigation device of FIG. 3 with the riser in the extended position.

The cap 24 has an annular top 25 with a central opening 56, as depicted in FIG. 5. A skirt 38 depends from the periphery of the top 25 of the cap 24 for use in securing the cap 24 to the housing 12. More specifically, the upper end of the sidewall 18 of the housing 12 includes an outer thread 42. The skirt 38 of the cap 24 has an inner thread 40 configured to threadingly engage the outer thread 42 of the sidewall 18 of the housing 12 in order to secure the cap 24 to the housing 12. An annular wiper seal 58 is disposed within the central opening of the top 25 of the cap 24, and includes a central opening 70 through which a middle and top portion of the riser 14 is slidable between its extended and retracted positions. The wiper seal 58 surrounds the riser 14 and restricts fluid from leaking between the riser 14 and the wiper seal 58 and between the cap 24 and the sidewall 18 of the housing 12. Further details of the construction of the wiper seal 58 will be discussed in greater detail below. Raised ribs 23, textures, indicia and the like may be formed on the top and/or skirt of the cap 24 to assist in gripping and rotating the cap 24 to attached or detach the cap 24 from the housing 12.

Extending outward from the sidewall 18 of the housing 12 is a pair of connection ports 30, as illustrated in FIGS. 1-4. The connection ports 30 are each a tubular member having a first open end 32 spaced from the sidewall 18 of the housing 12 and a second, opposite open end 34 in fluid communication with the interior of the housing 12. The connection ports 30 are designed to be connected to a supply of fluid, such as from a pressure regulating valve, or to a downstream pop-up irrigation device 10 or other irrigation device. To this end, one or more barbs 36 may be provided on the exterior of the connection ports 30. A suitable pressure regulating valve is Model No. XCE-100-PRF-BFF, available from Rain Bird Corporation, Azusa, Calif. While two connection ports 30 are illustrated, there could be one connection port, no connection ports, or three or more connection ports. In addition, the housing can include any number of connection ports, along with other openings, such as a threaded opening in the bottom of the interior of the housing for connection to threaded pipe. By way of example, when there are two connection ports, one of the connection portions can be connected to tubing for supplying fluid and the other connection port can be connected to tubing for supplying a downstream irrigation device. Alternatively, one of the connection ports can be capped using a snap-on cap 214 (illustrated in FIGS. 9-11) with a skirt having an inwardly-extending protuberance for cooperating with the barb 36 to restrict removal. This is useful when there is no downstream irrigation device that is to be connected to the pop-up irrigation device 10.

The barbs 36 can be of differing sizes in order to accommodate different diameters of tubing on a single connection port 30. For example, an inner barb can have a larger diameter than an outer barb. This permits larger diameter tubing to be slid past the outer barb and secured with a friction fit to the inner barb. This also permits narrower diameter tubing to be secured with a friction fit to the outer barb. The use of differing sizes of barbs can provide flexibility in the installation of the irrigation devices, as well as simplified manufacture and distribution as few types of devices have to be made as compared to if a different design of device were made for each different diameter of tubing.

The closed end 20 of the housing 12 can optionally include a depending stake 26. The stake 26 includes a plurality radially-outward extending blades 28 which taper as they extend away from the housing 12. Some of the blades can include inclined vanes 29, as illustrated in FIGS. 1 and 2, to further assist in retention of the housing 12 in the ground. Specifically, the vanes 29 can be disposed on a pair of opposing sides of the blades 28. The stake 26 can be inserted into the ground to support the housing 12 relative to the ground. Although in the illustrated embodiment there are four blades 28, any suitable number of blades can be utilized.

The wiper seal 58 has a cylindrical body 62 dimensioned to fit inside the central opening 56 of the cap 24. The central opening 70 of the wiper seal 58 is dimensioned to receive the riser 16. The body has a pair of comparatively thin, inwardly inclined extensions 60 adjacent the top and bottom of the body 62. The extensions 60 are dimensioned to be in general sealing engagement with the riser 16 during the extension and retraction of the riser 16 from the body 12 of the irrigation device 10, as well as when the riser 16 is in its fully extended and fully retracted positions. The inwardly-facing portion of the body 62 disposed between the pair of extensions 60 is preferably spaced from the riser 16 such that friction is reduced during movement of the riser 16. A downward-facing pocket 68 is formed radially outward from the body 62 to receive the upper extent of the spring 44. A generally opposite, upward facing pocket 66 is also formed in the body 62 to receive a depending rim 52 of the underside of the top of the cap 24. A radially-outward extending flange of the body 62, positioned generally adjacent the upward facing pocket 66, is dimensioned to fit into a gap 54 formed between the skirt 38 and the rim 52 of the cap 24, and is positioned to abut an uppermost edge of the housing 12 and the underside of the top of the cap 24 when the cap 24 is securely attached to the housing 12 in order to form a seal between the cap 24 and the housing 12. The annular wiper seal 58 can be carried by the cap 24, either by being adhesively attached, co-molded or simply held in place by frictional engagement with adjacent surfaces of the cap 24. The housing 12 and riser 14 can be formed of an ABS polymer, the cap 24 of an acetal polymer and the wiper seal 58 of an elastic material, such as a thermoplastic elastomer, although these and other components described herein can be formed of other suitable materials.

Turning now to details of the riser 14, the riser 14 is a generally tubular component with an open upper end and an open lower end with a fluid passage therebetween, as illustrated in FIGS. 3 and 4. The fluid passage permits fluid from the interior of the housing 12 to exit the housing 12 through the riser 14 and ultimately through the nozzle body 16 attached to the upper end of the riser 14. The majority of the riser 14 has a first outer diameter and a first inner diameter. However, there are different diameters adjacent the each of the upper end and lower end of the riser 14, as explained in greater detail below.

Figure 6:
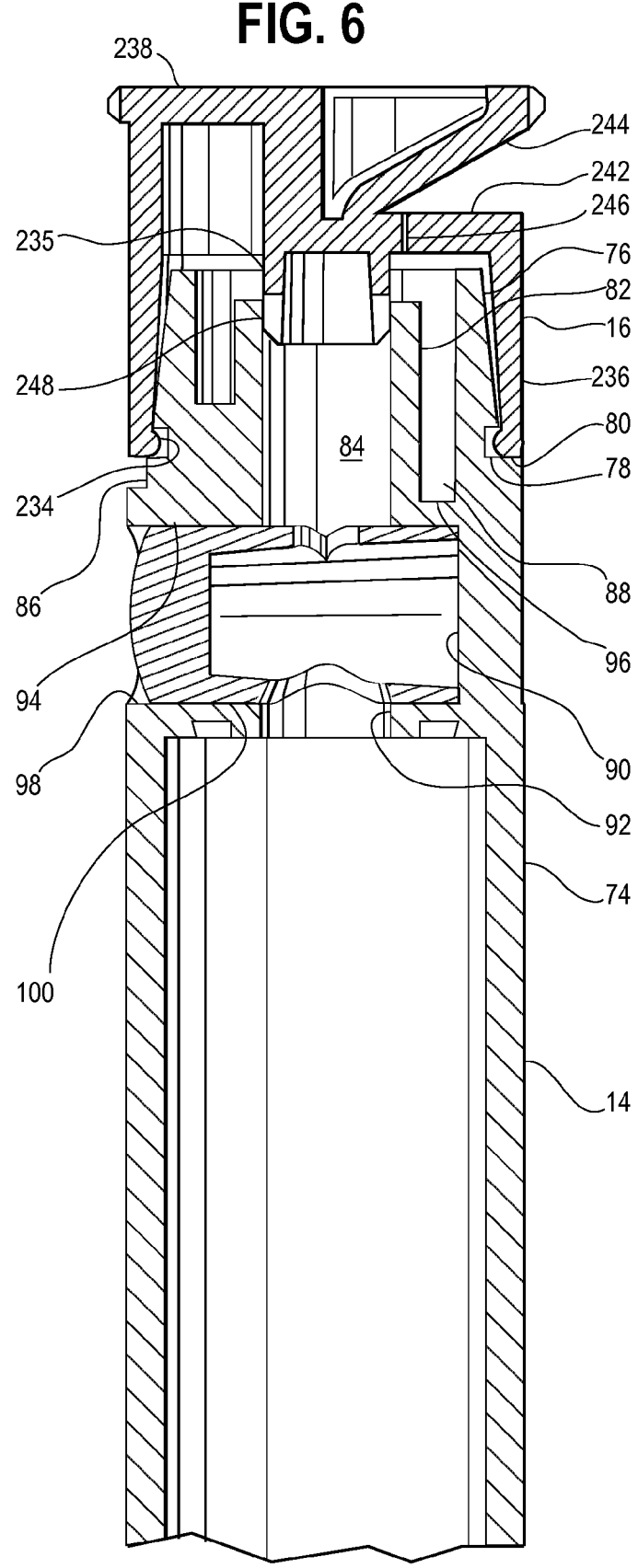
FIG. 6 is a section view of an end portion of the riser and the attached nozzle of FIG. 1 taken along line 6-6 of FIG. 1.

With reference to FIGS. 6 and 7, adjacent the upper end of the riser 14 is a tapered wall 76 narrowing toward the uppermost extent of the riser 14. This tapered wall 76 has a maximum diameter that is less than the first outer diameter, as well as a generally constant inner diameter that is less than the first inner diameter. An upper step 80 is formed at the intersection of the maximum diameter of the tapered wall 76 and the first outer diameter of the riser 14. Coextensive with the step 80 is an inwardly-extending, circumferential groove 78. The groove 78 is dimensioned to at least partially receive an inwardly-extending, annular protuberance 234 of the outer skirt 236 of the nozzle body 16 in order to removably secure the nozzle body 16 to the upper end of the riser 14 using a snap-fit.

The purpose of the tapered wall 76 is to urge the lower end of the outer skirt 236 of the nozzle body 16 outwardly until the protuberance is radially aligned with the groove 78 and can snap into place in the groove 78. To facilitate detachment of the nozzle body 16 from the riser 14, an external slot 86 may be provided in the riser 14. The bottom of the slot 86 includes an inwardly-extending wall of the riser 14, below the step 80, while the top of the slot 86 is exposed to an end of an outer skirt 236 of the nozzle body 16 (which we be described in greater detail below). This permits a tip of a pry tool, such as a flat blade screwdriver or the like, to be inserted into the slot 86 to pry the end of the outer skirt 236 outwardly away from the riser 14, and hence the adjacent portion of the protuberance 234 out of engagement with the groove 78, to permit the nozzle body 16 to be moved upwardly past the maximum diameter of the tapered wall 76 and off of the upper end of the riser 14.

Spaced radially inward from the tapered wall 76 is an upstanding inner wall 82 having an outlet fluid passage 84 extending therethrough. The inner wall 82 has a height that is less than the height of the surrounding tapered wall 76, and is configured to mate with part of the nozzle body 16, as will be described in greater detail, to form a fluid chamber 88 between the nozzle body 16, the outer diameter of the inner wall 82, and the inner diameter of the tapered wall 76, as well as an upper intermediate wall 96 of the riser 16 extending between the lower extent of the inner wall 82 and the adjacent portion of the tapered wall 76.

A valve, in the exemplary embodiment a plug valve 100, is disposed within the riser 16 upstream of the nozzle body 16, as illustrated in FIGS. 3, 4 and 6 in order to control fluid flow through the riser 14 and, specifically, from the lower end of the riser 14 to the upper end of the riser 14 and hence the nozzle body 16 thereon. The plug valve 100 is accessible through an opening 98 is the side of the riser 14, and is rotatable to vary the amount of fluid flowing through the riser 14 and to the nozzle body 16. The plug valve 100 is recessed within the opening 98 of the riser 14 such that the valve 100 does not interfere with the movement of the riser 14 between its extended and retracted positions.

Figure 19:
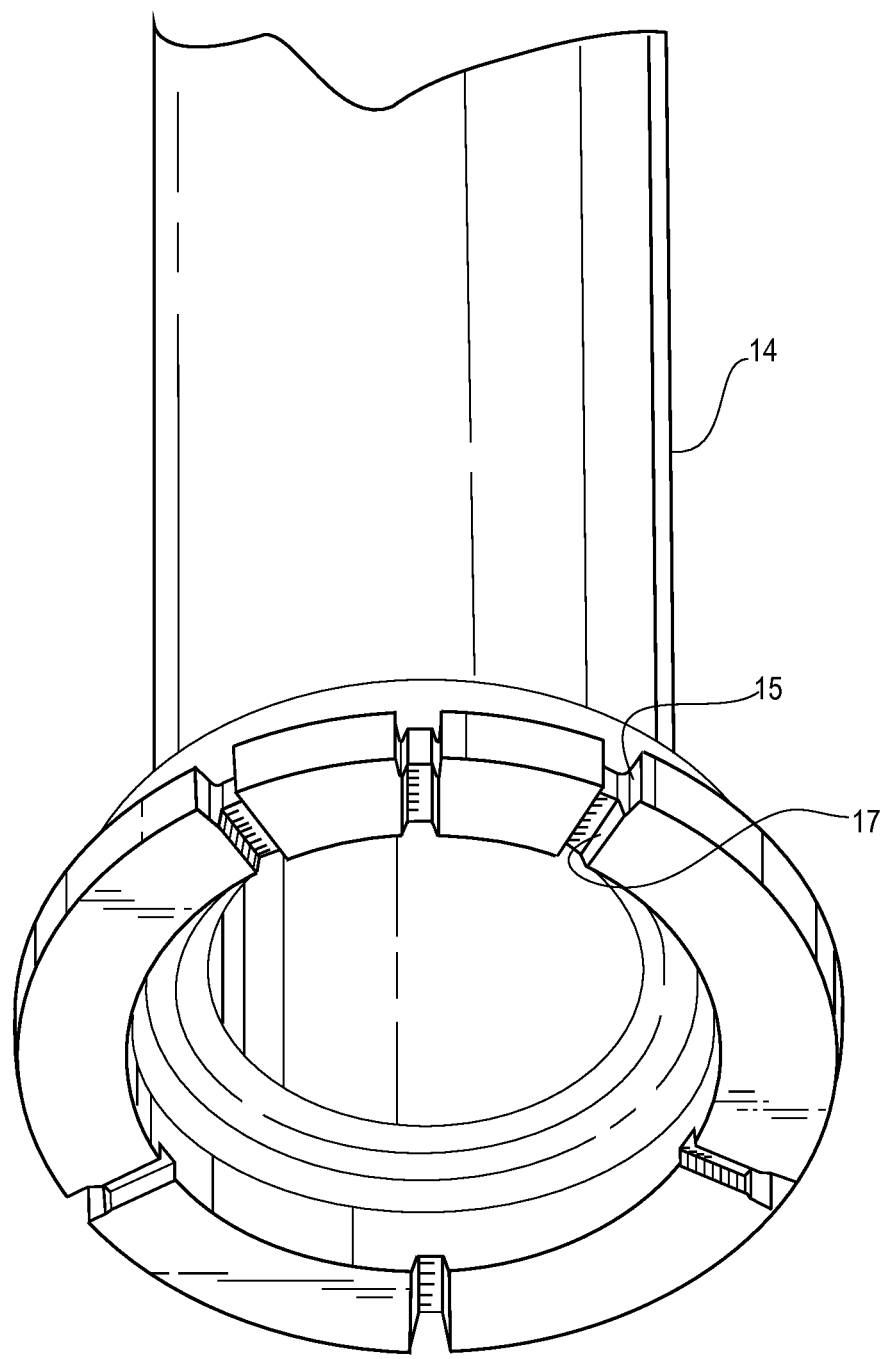
FIG. 19 is a detailed view of an alternative bottom end of the riser.

The riser 14 may optionally be keyed to the housing 12 such that rotation between the two is limited. This can advantageously permit the plug valve 100 to be orientated to be accessible from consistent side of the housing 12. An indicator, such as text and/or an arrow, can be attached to or integrally formed with the housing 12 to indicate the location of the plug valve 100, particularly useful when the riser 14 is retracted. To limit rotation between the riser 14 and the housing 12, the lower end of the riser 14 can have one or more radially-outward extending, longitudinally-orientated slots 15, as illustrated in FIG. 19. A corresponding number of longitudinally-extending, radially-inward protruding ribs 11 can be formed on the inner portion of the sidewall of the housing 12, as illustrated in FIGS. 3 and 5. The ribs 11 of the housing 12 can mate with the slots 15 of the riser 14 to limit relative rotation therebetween. Furthermore, the position and number of the ribs 11 and slots 15 can be selected so that the riser 14 will fit into the housing 12 with only one predetermined orientation, which can be used to align the plug valve 100, such as in an asymmetrical arrangement. For example, three closely spaced slots 15 can be arranged on one side of the bottom portion of the riser 14, and three widely spaced slots 15 can be arranged on the opposite side of the bottom portion of the riser 14, along with similarly spaced, cooperating ribs 11 in the housing 12. Also as illustrated in FIG. 19, each of the slots 15 at the bottom of the riser 14 can be aligned with radially-extending slots 17. The radially-extending slots 17 can facilitate fluid flow to the interior of the riser 14, such as when the bottom of the riser 14 is abutting the bottom of the interior of the housing 12.

The plug valve 100 is cylindrical, having a sidewall 110, a closed end 102 and an opposite open end 104, as illustrated in FIGS. 6 and 8. The plug valve 100 has a flow port 108 in the sidewall 110 that is tapered in size from wide to narrow. However, the plug valve 100 may optionally not be tapered. The closed end 102 has an actuator formed on the exterior thereof in order to facilitate rotation of the actuator, such as by using a tool. In the exemplary embodiment, the actuator is a slot 106 configured to receive the end of a tool, such as a flat blade screwdriver.

The plug valve 100 is seated in a chamber having a surrounding cylindrical wall 94 integrally formed in the riser 14, which chamber has a closed end 90 opposite the opening 98 extending through the side of the riser 14, as illustrated in FIG. 6. The lower portion of the chamber wall 94 has an inlet passage 92 and the upper portion of the chamber wall, spaced closer to the nozzle body 16 than the lower portion of the chamber wall, coincides with the outlet fluid passage 84.

Rotation of the plug valve 100 can bring the flow port 108 into and out of alignment with one or both of the inlet passage 92 and the outlet fluid passage 84 of the riser 14 to control the volume of fluid flowing through the riser 14 to the nozzle body 16 in order to control the throw radius of fluid exiting the nozzle body 16. The plug valve 100 can be configured to merely block and unblock the fluid flow, as well as configured to vary the volume of the fluid flow at many different increments between fully blocked and fully unblocked. The dimensions of the inlet passage 92 of the riser 14, the outlet fluid passage 84 of the riser 14 and the flow port 108 of the valve 100 can be selected to provide for the desired range of flow rates.

In another alternative embodiment, a valve is disposed within a riser 316 and is configured to have one or more stops which limit the movement of the valve. As depicted in the exemplary embodiment of FIGS. 16-18, the valve may be a rotatable plug valve 300, similar to that described above. That is, the rotatable plug valve 300 has a cylindrical outer wall 302, a closed end 304 and an open end 306, along with an opening 308 extending through the outer wall 302 to permit fluid flow therethrough. A slot 310 for a flat head screwdriver is formed in the closed end 304 of the valve 300, and an arrow 312 or other such indicator may also be formed in the closed end 304 for use in determining the position of the valve 300 when viewed from the exterior of the riser 316.

Figure 16:
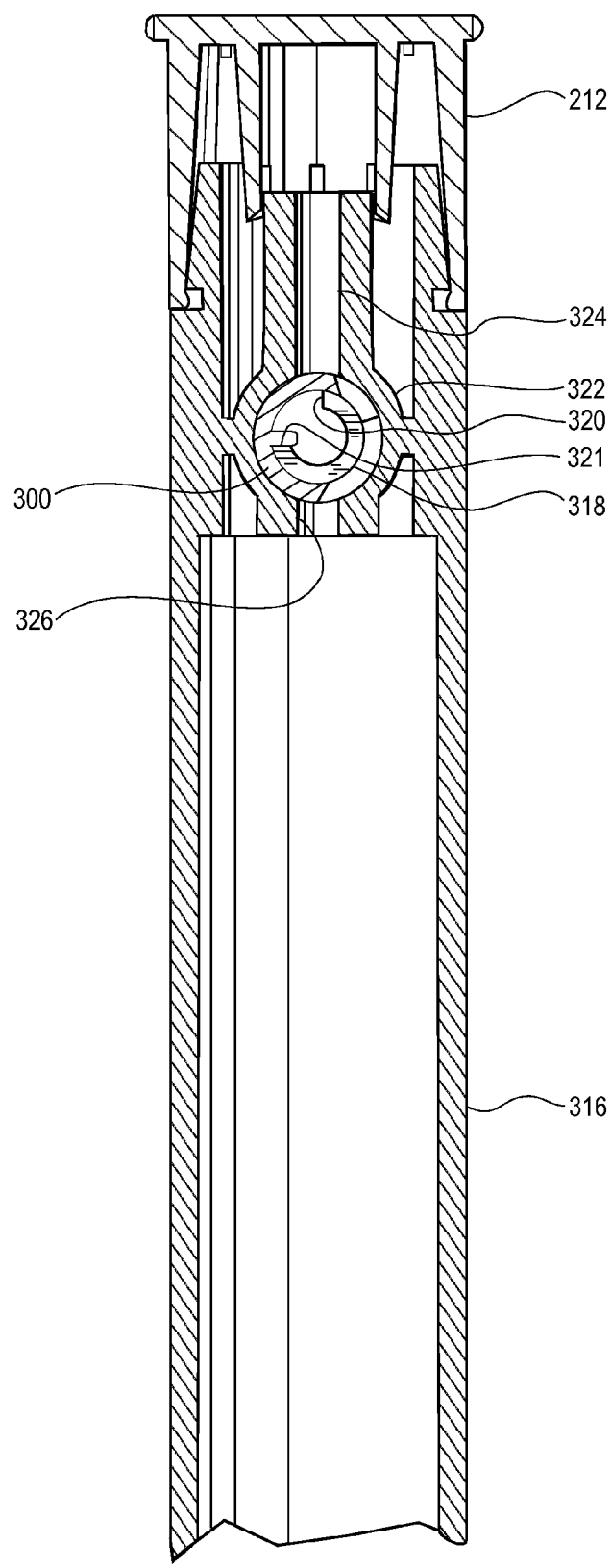
FIG. 16 is a sectional view of an end portion of an alternative riser having a nozzle attached thereto and an alternative plug valve, and taken perpendicular to an axis of rotation of the plug valve, the riser having a stop positioned to limit rotation of the plug valve.
Figure 17:
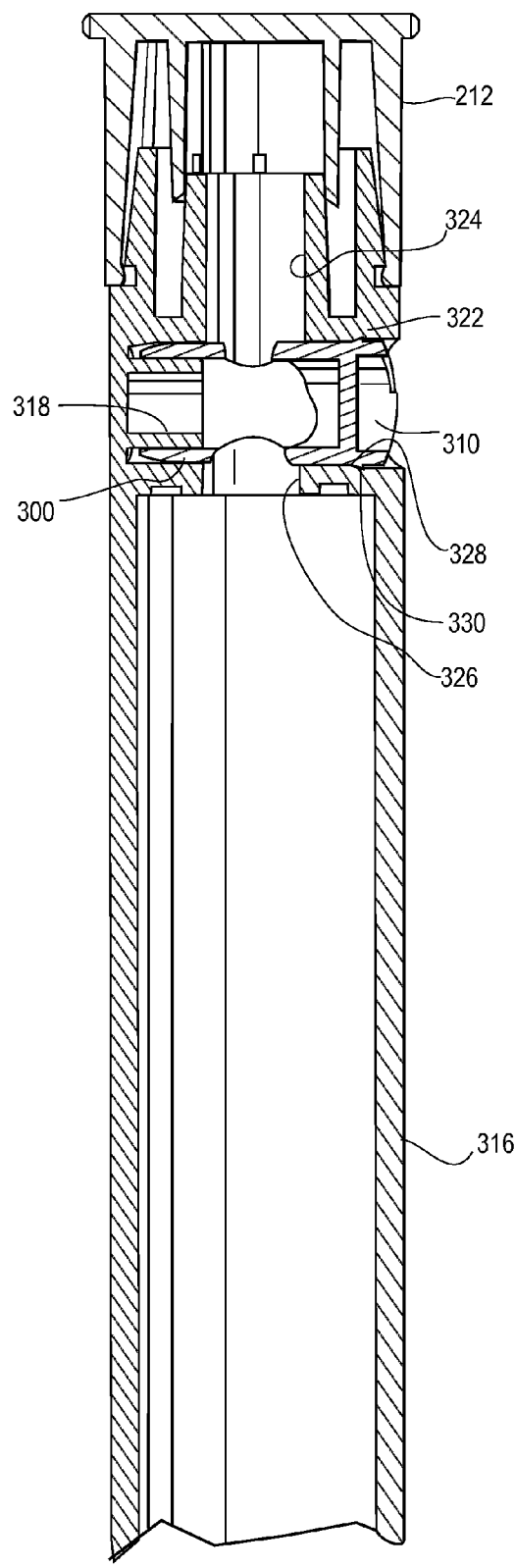
FIG. 17 is a sectional view of the end portion of the alternative riser having a nozzle attached thereto and the alternative plug valve of FIG. 16 and taken parallel to the axis of rotation of the plug valve.
Figure 18:
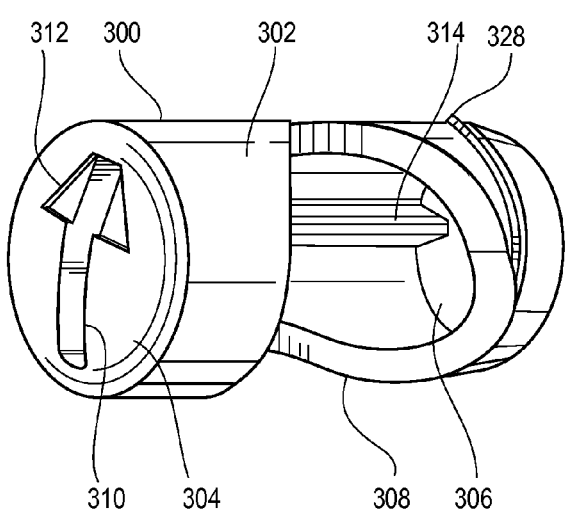
FIG. 18 is a perspective view of the alternative plug valve of FIGS. 16 and 17.

Unlike the valve 100 described in the prior embodiment, the plug valve 300 of the alternative embodiment has a longitudinally-extending, internal rib 314. The rib 314 is configured to cooperate with a stop 318 formed in the interior of the riser 316. More specifically, the stop 318 is generally C-shaped, as illustrated in FIG. 16, and extends inwardly toward the longitudinal axis of the riser 316, as illustrated in FIG. 17. The stop 318 is dimensioned to fit within the open end 306 of the plug valve 300. When the rib 314 of the plug valve 300 abuts one end 321 of the stop 318, further rotation in that direction is limited by the one end 321. When the rib of the plug valve 300 abuts the other end 320 of the stop 318, further rotation in that direction is limited by the other end 320. The rib 314 and stop 318 can be configured so that the rotation of the plug valve 300 is limited to being between fully open and fully closed, and to provide tactile feedback to a user when those positions are reached. The plug valve 300 may be supported in a seat 322 which surrounds a significant extend of the plug valve 300, and the opening 308 can be alignable with an upstream opening 326 and downstream opening 324 through the seat 322 to permit fluid flow through the riser 316. The plug valve 300 can optionally include a radially-outward barb 328 about its circumference, as illustrated in FIGS. 17 and 18. The barb 328 can be configured to made with an annular groove 330, illustrated in FIG. 17, disposed within the seat 322 for the plug valve 300 within the riser 14, and can be configured to permit insertion of the plug valve 300 into the seat 322 while restricting removal. A barb-and-groove arrangement can also be used for the aforementioned plug valve 100. The plug valves described herein can be made of polyethylene or other suitable materials.

Moving in a direction toward the lower end of the riser 14 is a region with an enlarged, second inner and outer diameter and then yet another region with an even more enlarged, third inner and outer diameter. The intersection of the first outer diameter and the second outer diameter creates a perpendicularly extending first step 50. The intersection of the second outer diameter and the third outer diameter creates a perpendicularly extending second step 46. The first step 50 is positioned to be engaged by the depending portion of the body 62 of the wiper seal 58 when the riser 14 is at its maximum extension from the interior of the housing 12 in order to form a seal therewith, as illustrated in FIG. 5, further restricting water from exiting through the open upper end 22 of the housing 12 other than via the riser 14. The second step 46 is positioned to be engaged by a lower end 48 of the spring 44 for biasing the riser 44 to its fully retracted position.

Figure 22:
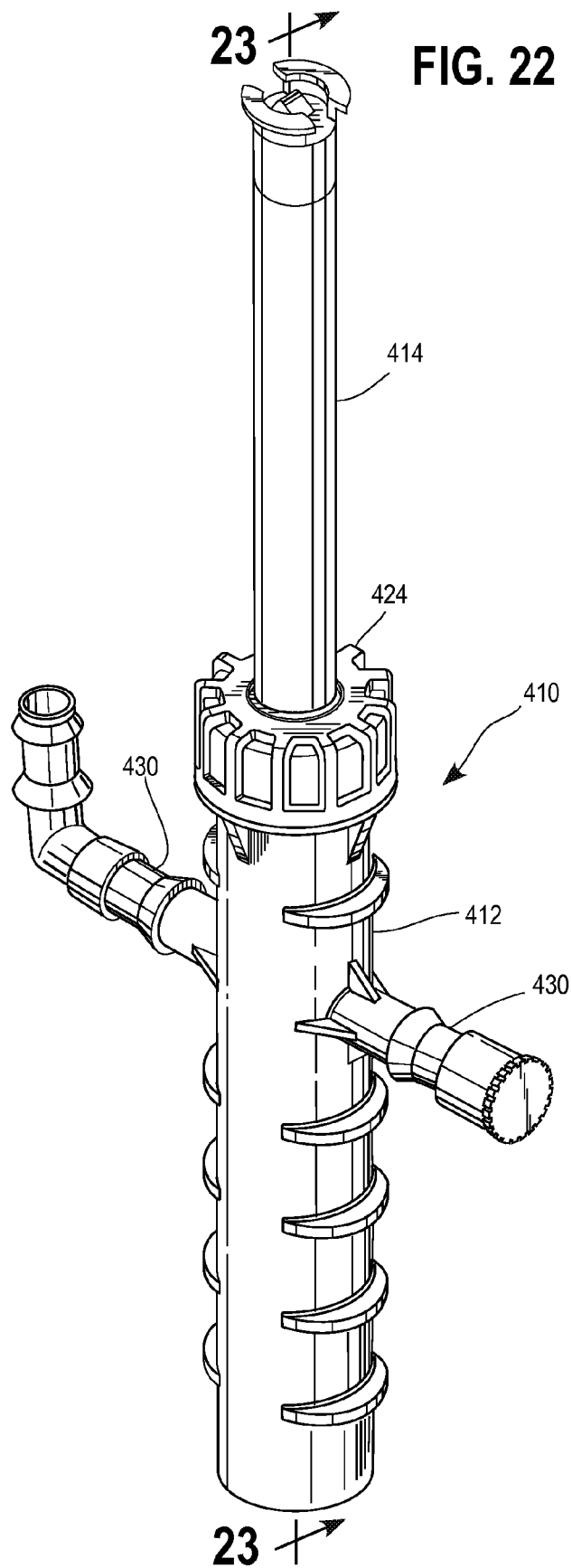
FIG. 22 is a perspective view of a second embodiment of a pop-up irrigation device showing a riser in an extended position relative to a housing and with an attached nozzle.
Figure 23:
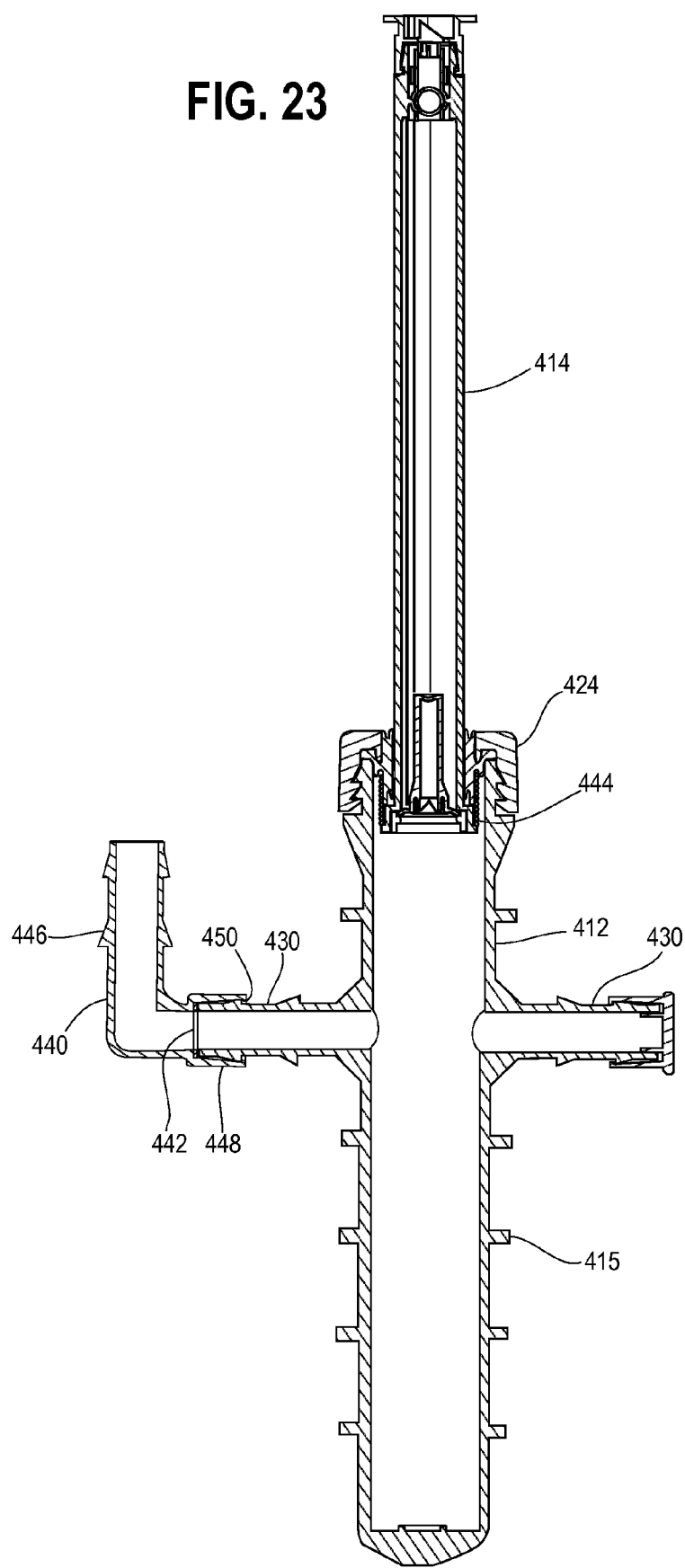
FIG. 23 is a section view of the pop-up irrigation device of FIG. 22 showing the riser in the extended position, taken along line 23-23 of FIG. 22.
Figure 24:
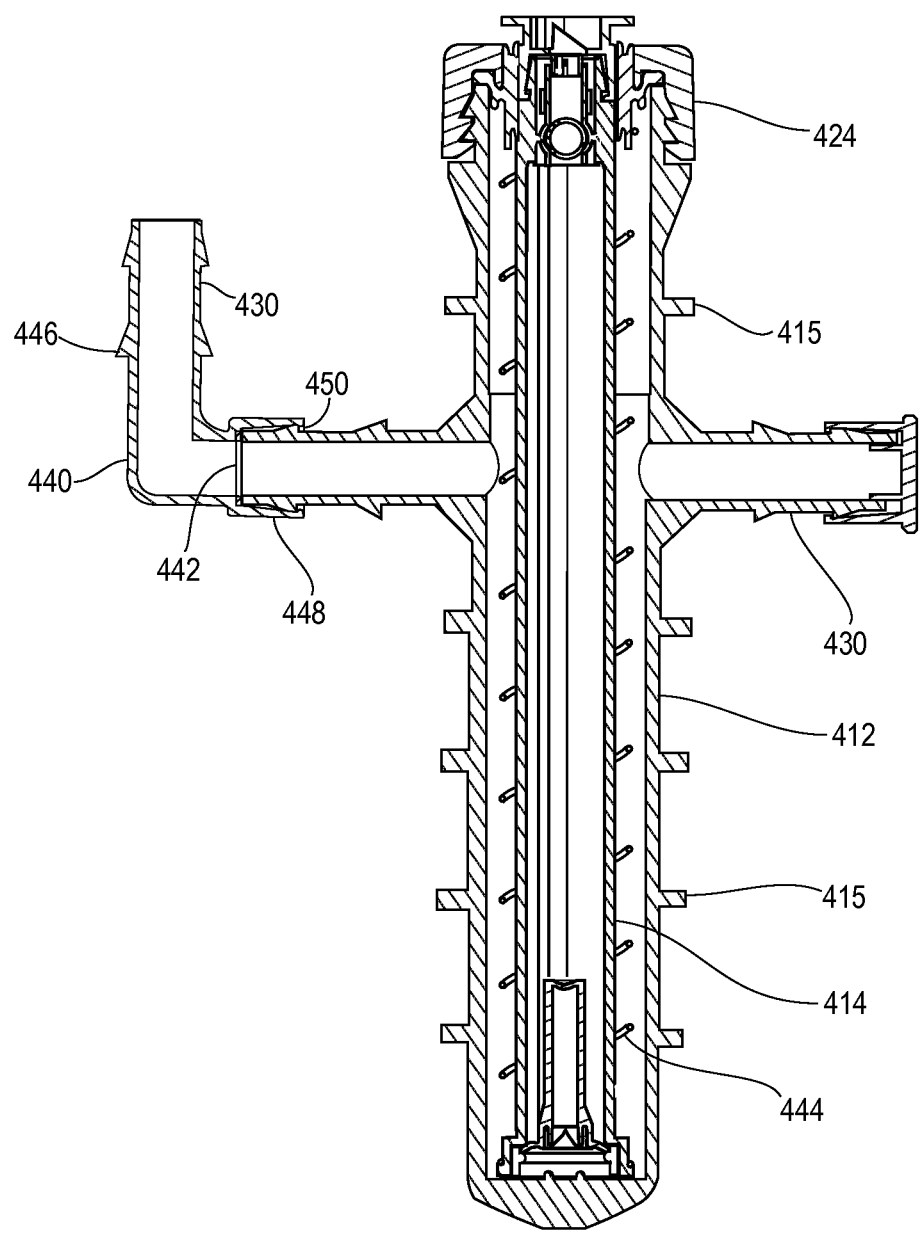
FIG. 24 is a section view of the pop-up irrigation device of FIG. 22 similar to that view shown in FIG. 23 but depicting the riser in a retracted position.
Figure 25:
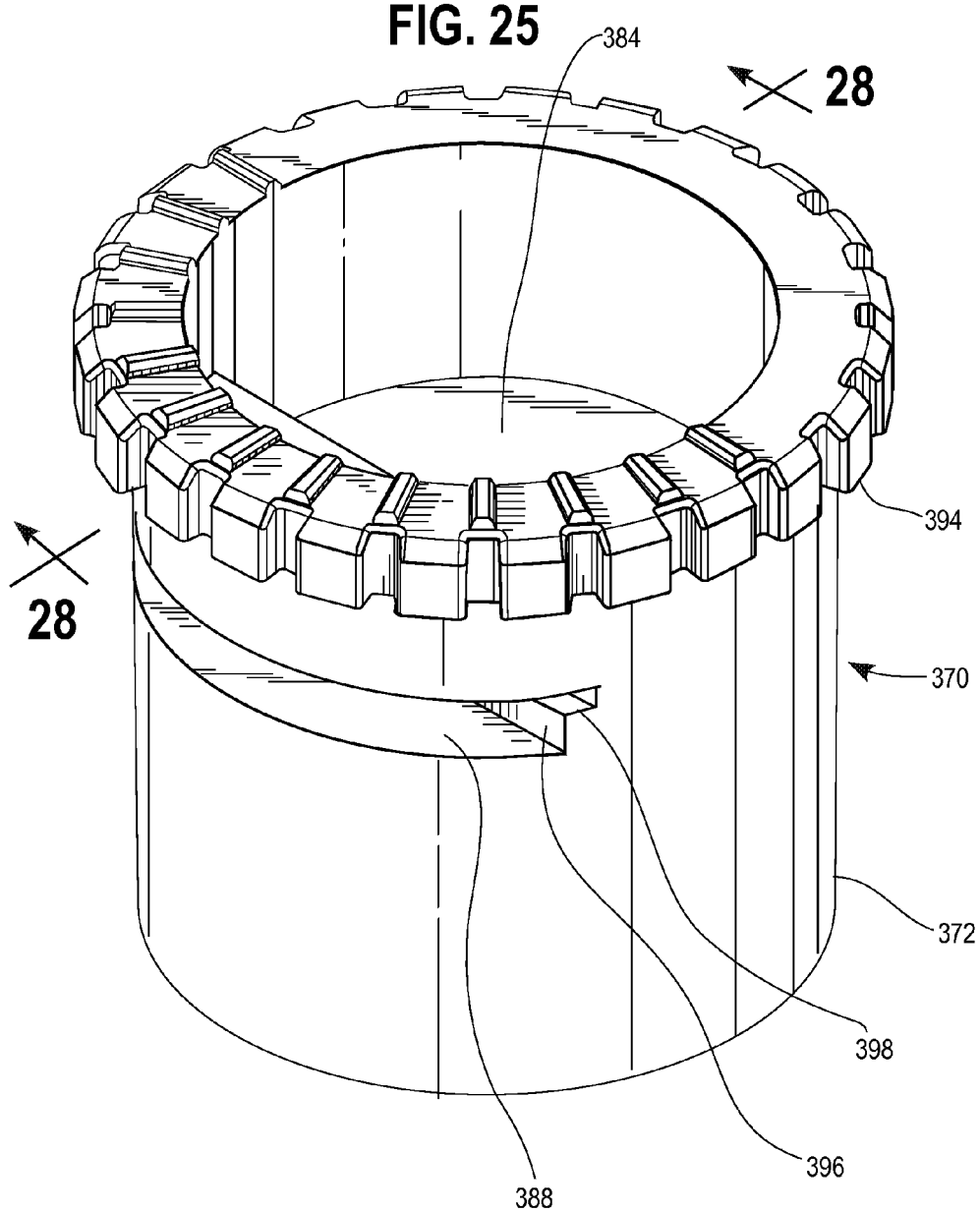
FIG. 25 is a front perspective view of a third embodiment of a nozzle body attachable to an end of a riser, configured for emitting fluid in a pattern having about 180 degrees of arcuate extent.
Figure 26:
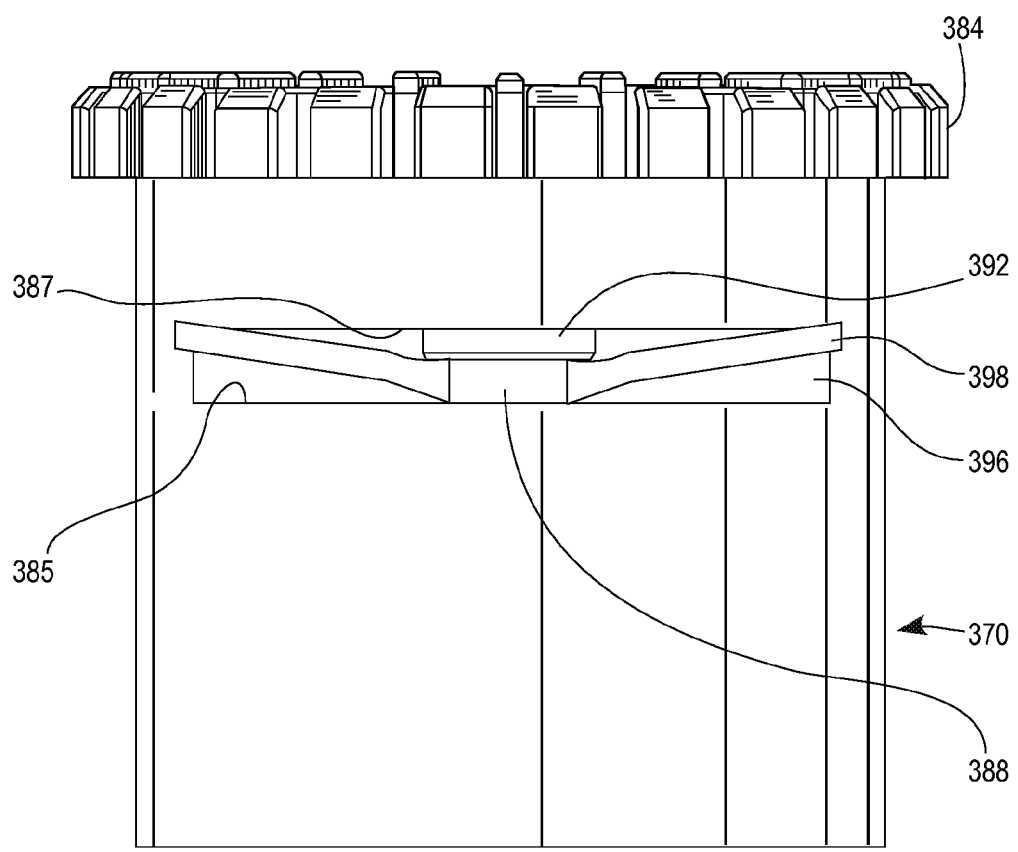
FIG. 26 is a front elevation view of the nozzle body of FIG. 25.
Figure 27:
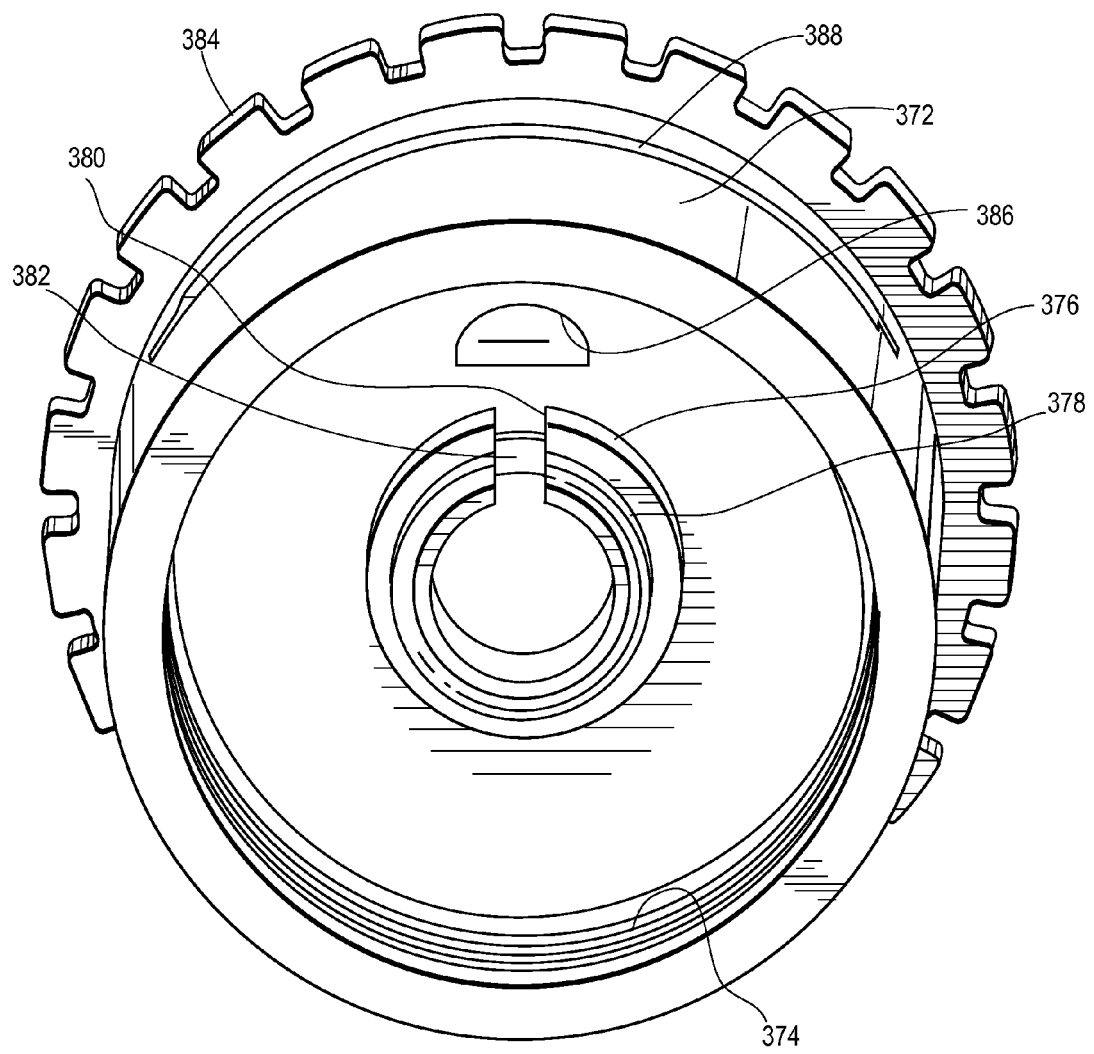
FIG. 27 is a bottom perspective view of the nozzle body of FIG. 25.
Figure 28:
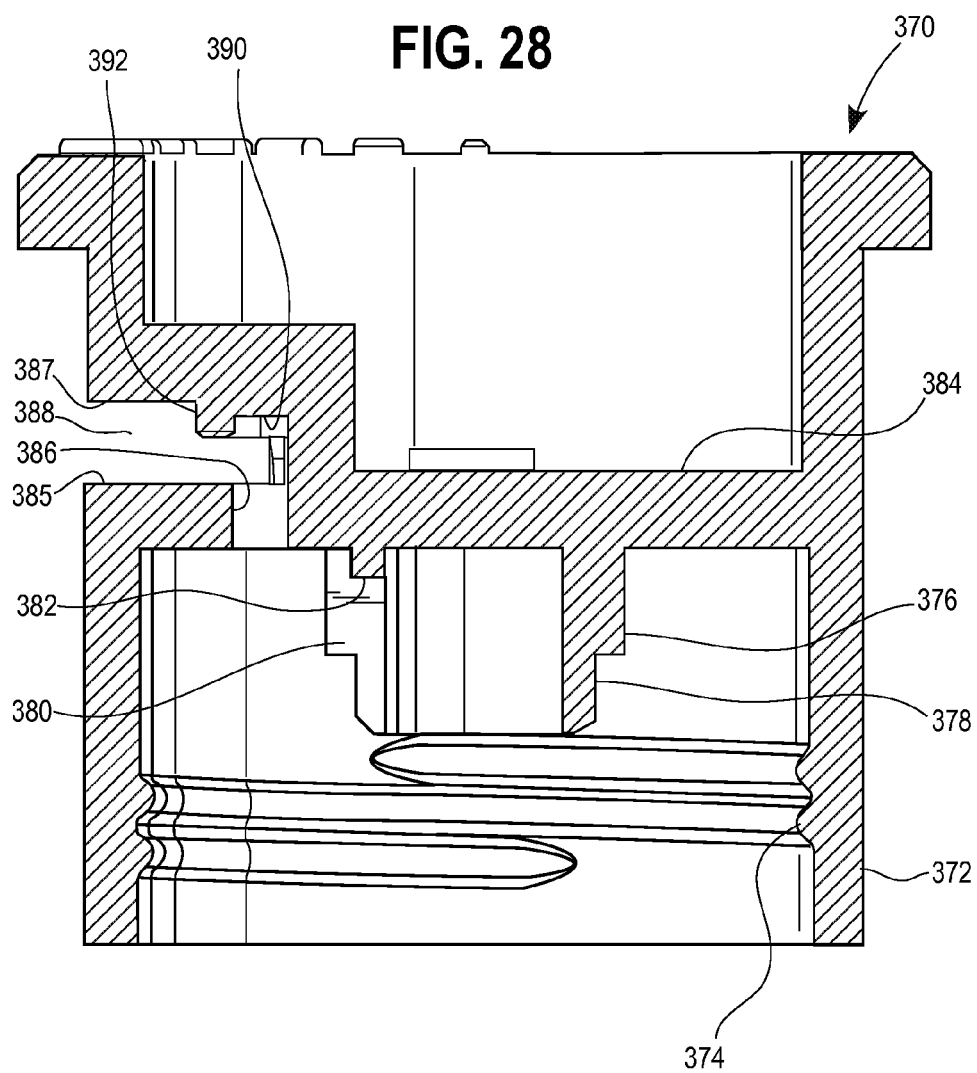
FIG. 28 is a section view of the nozzle body of FIG. 25 taken along line 28-28 thereof.

Turning now to a second embodiment, illustrated in FIGS. 22-24, the components of the pop-up irrigation device 410 are generally similar to the first embodiment. That is, a riser 414 is partially extensible from a housing 412 and through a central opening of a cap 424 attached to an open end of the housing 412 when pressurized with fluid. A nozzle body or flush cap (discussed herein below in greater detail) is attached to a distal end of the riser 414. A spring 444 biases the riser 414 to a retracted position, the force of the spring 444 being overcome when pressurized to extend the riser 414 from the housing 412. Also like the prior embodiment, the housing 412 of the second embodiment includes a pair of opposite, outwardly and transversely extending connection ports 430 for attachment of flexible tubing or the like.

Optionally omitting the stake 26 of the prior embodiment, the housing 412 of the pop-up irrigation device 410 of the second embodiment includes outwardly extending ribs 415 disposed along substantially the entire axial length of the housing 412. The ribs 415 function to assist in retaining the device 410 in the ground when the device 410 is at least partially buried in the ground. When connected to plastic tubing, the tubing can tend to urge the device 410 upward and out of the ground. This can be due to the bias in the tubing resulting from coiling of the tubing prior to use, as well as common manufacturing techniques for such tubing. To counteract such an urging from the tubing, the ribs 415 along the length of the housing 412 can assist in anchoring the housing 412 and thus the device 410 in the ground to resist upward urging by the tubing.

The ribs 415 of the exemplary embodiment have generally planar, closely spaced tops and bottoms. They have arcuate outer edges, and project outwardly between about 0.1 and 0.5 inches or greater, and preferably between about 0.15 and 0.25 inches, and even more preferably between abet 0.18 and 0.2 inches. The ribs 415 can be between about 0.05 and 0.25 inches, and preferably about 0.1 inches in thickness. The ribs 415 can be spaced apart by different amounts, such as by between about 0.5 and 1.5 inches, and preferably by between about 0.8 and 1 inch. However, other dimensions can also be suitable. While they can extend continuously about the circumference of the housing 412, they can be disposed in a pair of arrays, one array on each side of the housing, such that a pair of longitudinal gaps on the housing 412 are formed therebetween. This gap can facilitate manufacturing, as well as provide space for a label or other indicia to be disposed. The ribs 415 can extend substantially perpendicularly relative to a longitudinal axis of the housing 412. Alternatively, the ribs 415 can be inclined at an angle other than perpendicular relative to the longitudinal axis of the housing 412. They can also extend at different angles on the same housing 412, and in uneven numbers between multiple arrays.

Another difference from the prior embodiment is that in the second embodiment of the pop-up irrigation device 410, a ratchet ring is used to permit rotation of the riser 414 relative to the housing 412. This can be useful for adjusting the aim of the stream or spray issuing from an attached nozzle body or flush cap, particularly when using a threaded nozzle body instead of a snap-on nozzle body (although it can also be used with the latter, to provide a second degree of freedom of rotation).

Yet another difference is that an annular retention ring may be seated in a corresponding depression formed in the riser 414 about the plug valve to retain the plug valve in the riser 414. The retention ring may be welded or otherwise attached to the riser 414, and can be formed of an ABS polymer.

An optional rotatable elbow 440, depicted in FIGS. 22-24, can be provided for attachment to one of the connection ports 430 or 30. A second, optional elbow could be attached to the other of the connection portions 430 or 30. Further, two or more elbows 440 can be connected to each other to provide additional degrees of rotational freedom. The elbow 440 can have an end portion 448 with an inner snap bead 450, much like the snap-on cap 214 discussed above, to facilitate the attachment in a manner which allows the elbow 440 to rotate relative to the port 430 or 30. A gasket 442 or other sealing member can be carried in the end portion 448 of the elbow 440 for abutting the face of the connection port 430 or 30 for forming a seal, and can be made of a thermoplastic elastomer or other suitable materials. The elbow 440 can be made of an ABS polymer or other suitable materials. The opposite end portion of the elbow 440 can have barbs for attachment of flexible tubing, such as the above-described barbs 36 of the connection ports 30, including barbs of differing diameters. The rotatability of the elbow 440 (as well as between elbows when two or more are connected) can advantageously provide for additional degrees of freedom of movement, which can facilitate installation of the devices. For example, the tubing can be connected to the device prior to final positioning of the device, with the elbows or other swivel devices that permit rotational movement between the tubing and the connection ports 30 facilitating flexibility in moving the connected device to its final position.

A filtration screen (illustrated in FIGS. 23 and 24) can optionally be included in any of the devices described herein. For example, the bottom of the riser can be adapted to retain or receive a filtration screen.

Flow Control Adapter

In some circumstances, it may be useful to convert an existing device designed for use with a threaded nozzle bodies to use with the snap-on nozzle bodies described therein. In those same or other circumstances it may be useful to add the flow control capabilities of the aforementioned plug valves into an existing device.

Figure 37:
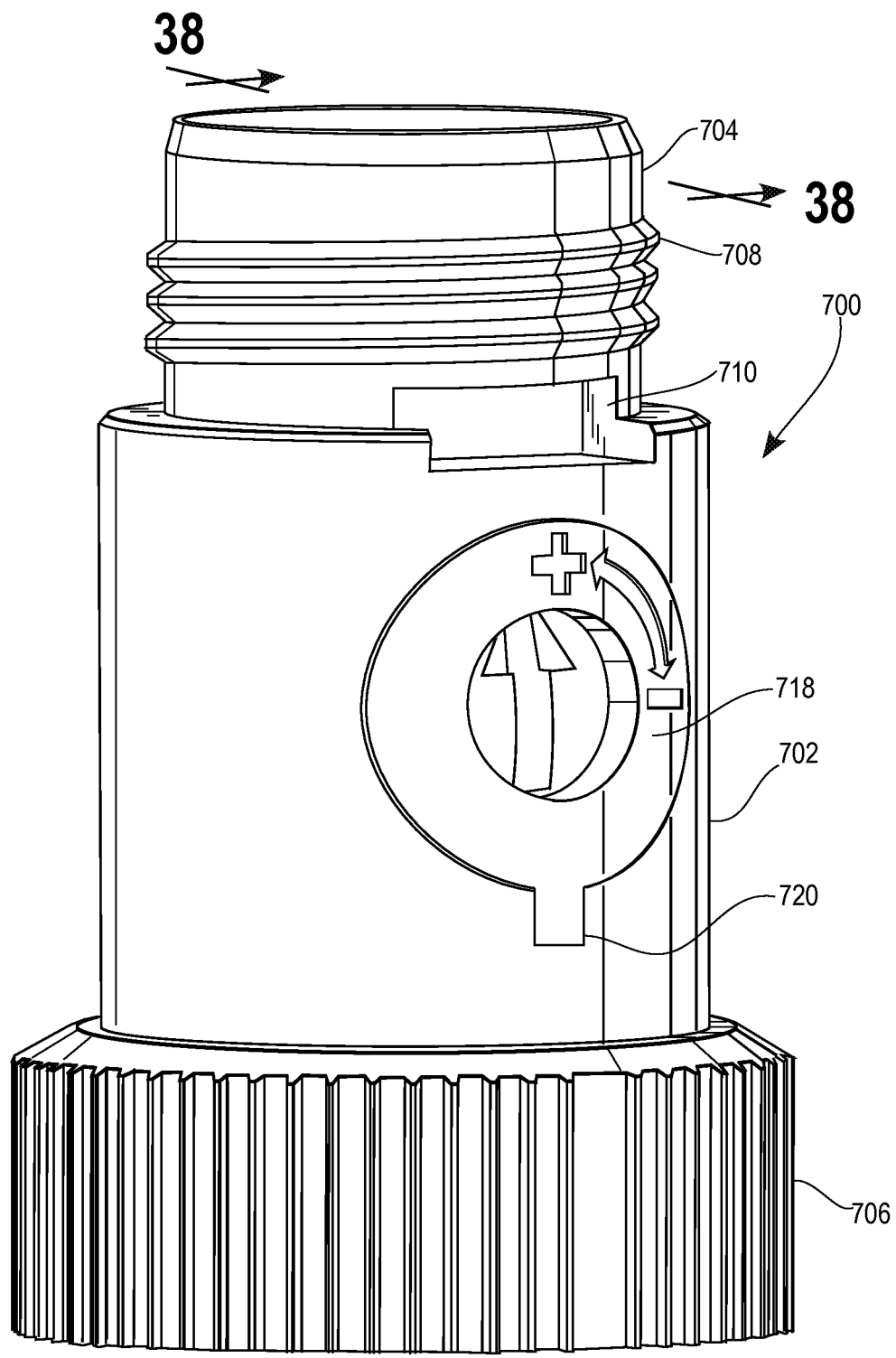
FIG. 37 is a perspective view of a flow control adapter.
Figure 38:
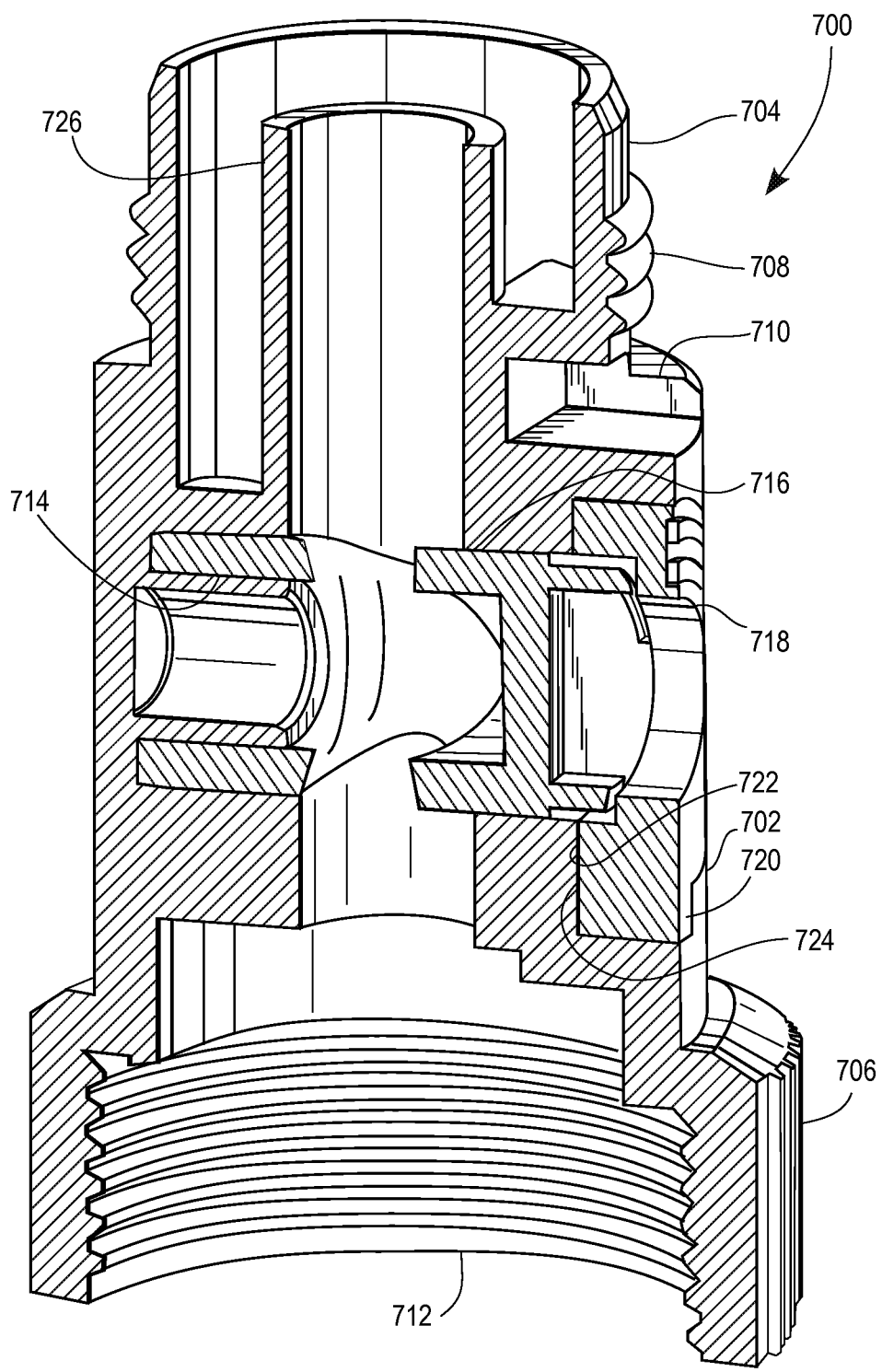
FIG. 38 is a sectional view of the flow control adapter of FIG. 37 taken along line 38-38 thereof.
Figure 39:
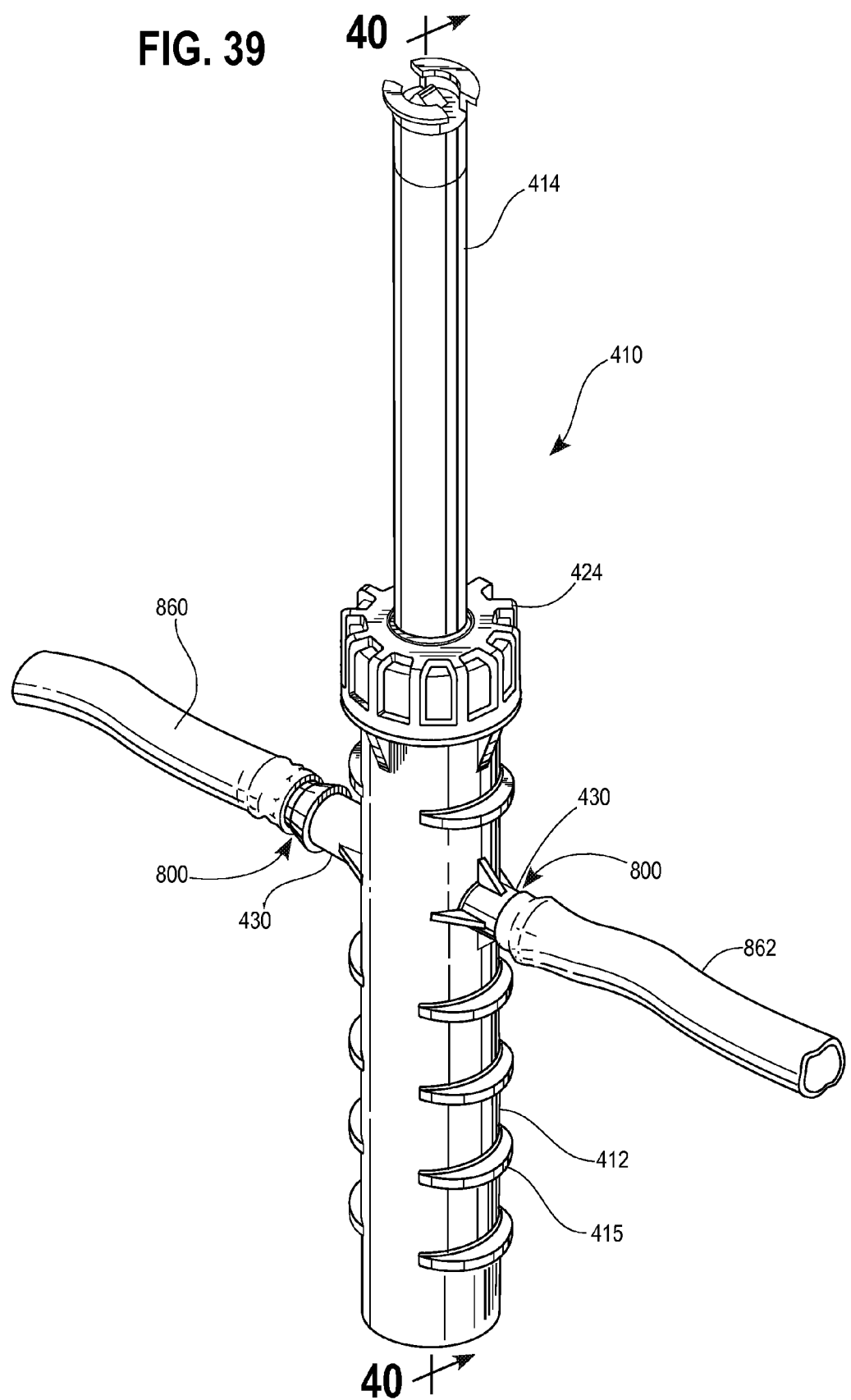
FIG. 39 is a perspective view of alternative embodiment of a pop-up irrigation device showing a riser in an extended position relative to a housing and with an attached nozzle, similar to the embodiment of FIG. 22 but with each connection port having an intermediate corner barb disposed between an inner and an outer circumferential barb and with irrigation tubing connected to the connection ports.
Figure 40:
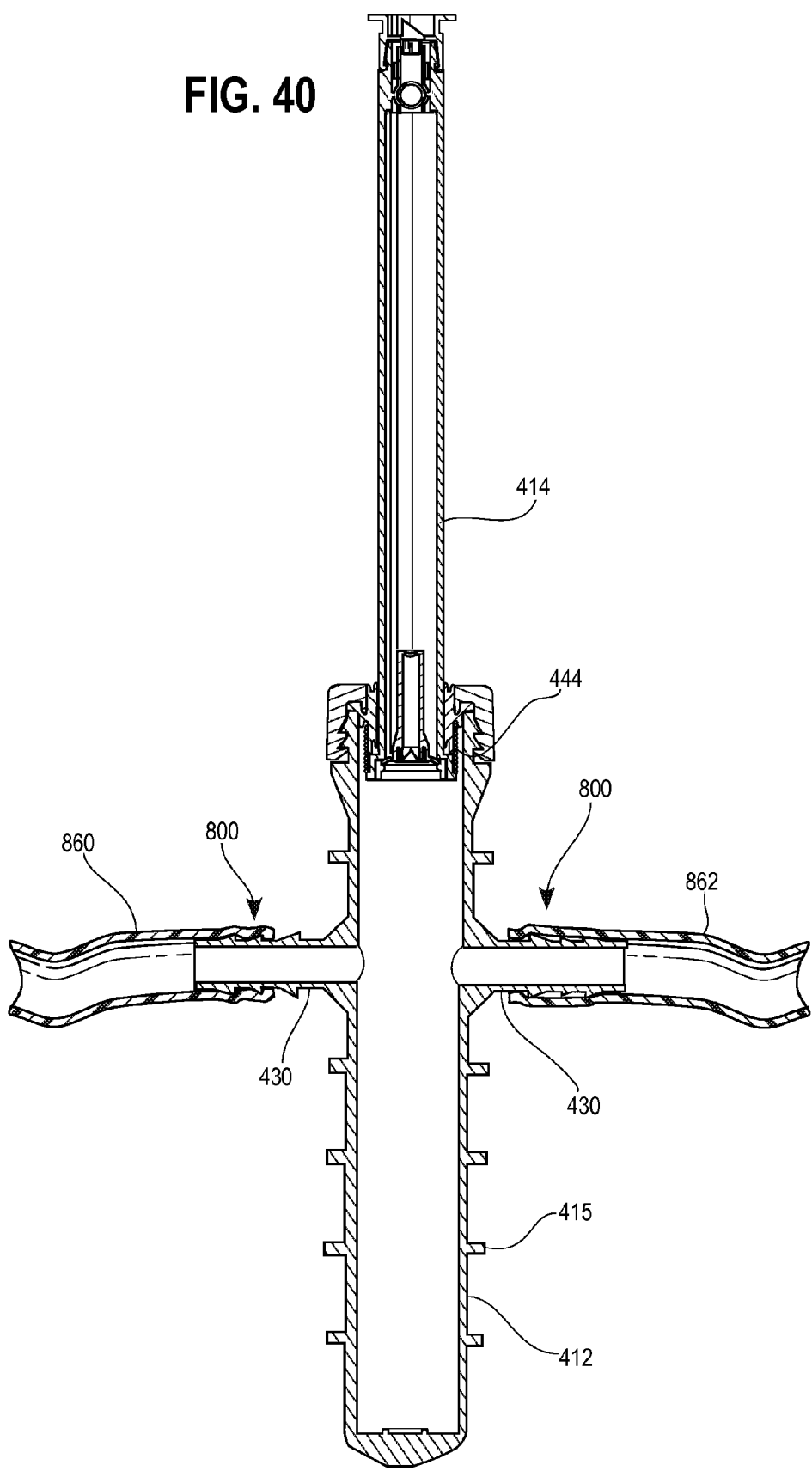
FIG. 40 is a section view of the pop-up irrigation device of FIG. 39 showing the riser in the extended position, taken along line 40-40 of FIG. 39.

To address the former circumstances, an adapter 700 can be provided, an exemplary embodiment of which is depicted in FIGS. 37 and 38. The adapter 700 has a bottom end 706 configured to attach to a riser, such as using internal threads 712, and a top end 704 adapted for attachment of a nozzle body, such as using external threads 708 or, alternatively, using a protuberance (not illustrated) configured for receiving a snap-on nozzle body along with an optional indentation 710 for removal of the snap-on nozzle body.

To address the latter circumstances or the circumstances in combination, a central portion 702 of the adapter can optionally be configured with a valve operable to adjust the fluid flowing through the adapter. The valve can be a rotatable plug valve 714 the same as or similar to the other plug valves discussed herein, being disposed in a seat 716 having an opening therethrough. An opening of the plug valve 714 can be selectively alignable with the opening in the seat 716 such that the flow through the adapter can be adjusted, such as from closed or substantially closed to fully open, as well as in between. As with the plug valve 300 discussed above with reference to the exemplary embodiment of FIGS. 16-18, the rotatable plug valve 714 can have a cylindrical outer wall, a closed end and an open end, along with an opening extending through the outer wall to permit fluid flow therethrough. A slot for a flat head screwdriver or other tool can be formed in the closed end of the valve 714, and indicia may be present on the closed end for use in determining the position of the valve 714 when viewed from the exterior of the riser. The plug valve 714 can include a stop to limit its rotation relative to the riser, such as the longitudinally-extending, internal rib and C-shaped stop described above.

An external recess 722 surrounding the opening in the adapter through which the plug valve 714 is both insertable and accessible is configured to receive a retainer 718, such can be attached by welding, adhesive or other suitable methods. The retainer 718 can have an opening through which the plug valve 714 is accessible, but is small enough that the plug valve 714 cannot be withdrawn therethrough. The recess 722 can have an extension 724 configured to receive an extension 720 of the retainer 718 such that the retainer 718 can be keyed in a preferred orientation relative to the central portion 702 of the adapter 700. An internal stem 726 can optionally be provided to facilitate use with nozzles having inner and outer skirts, such as the types described herein.

Nozzle Bodies

Figure 12:
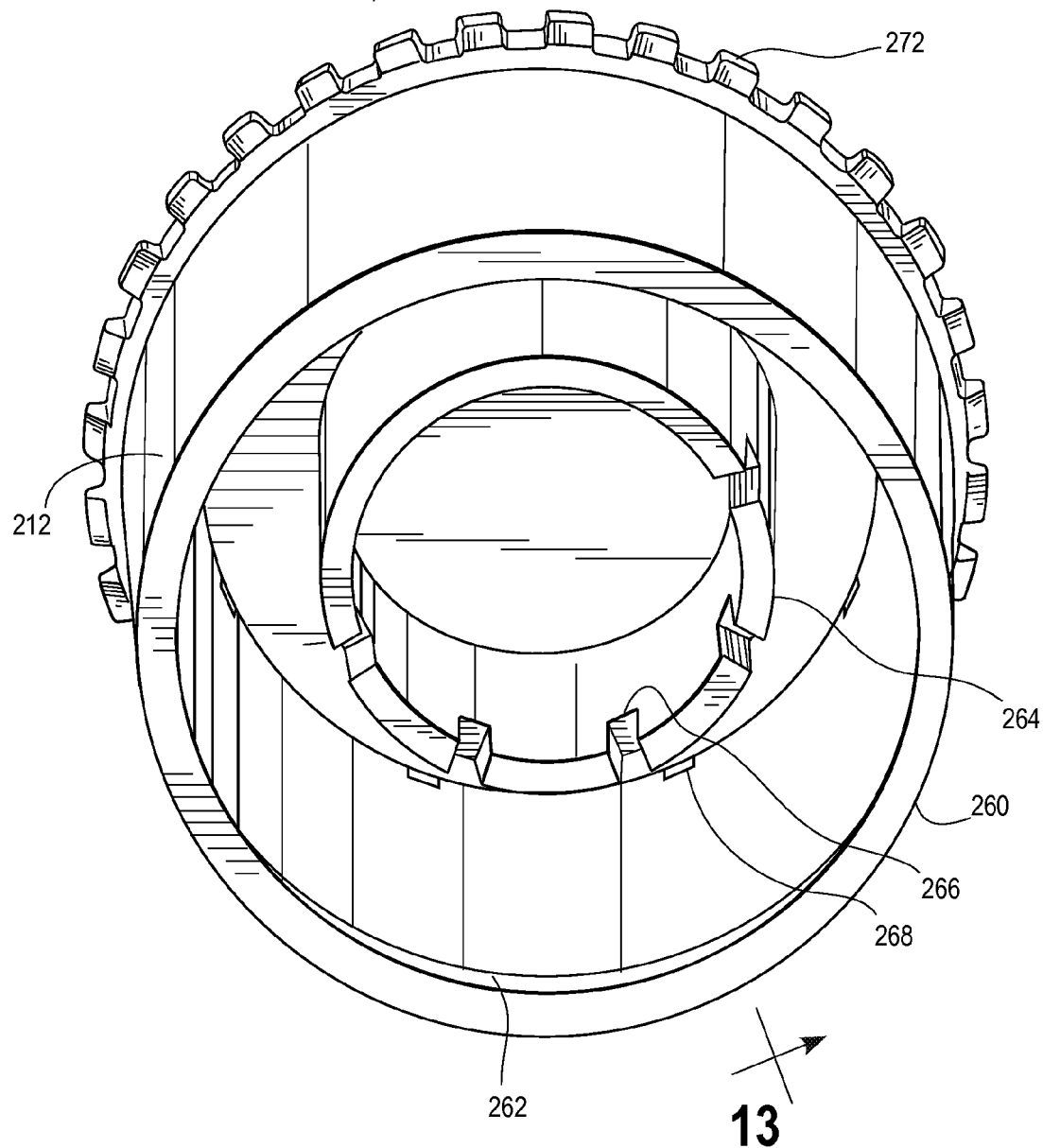
FIG. 12 is a bottom perspective view of one of the nozzles of the nozzle bush of FIG. 9.
Figure 13:
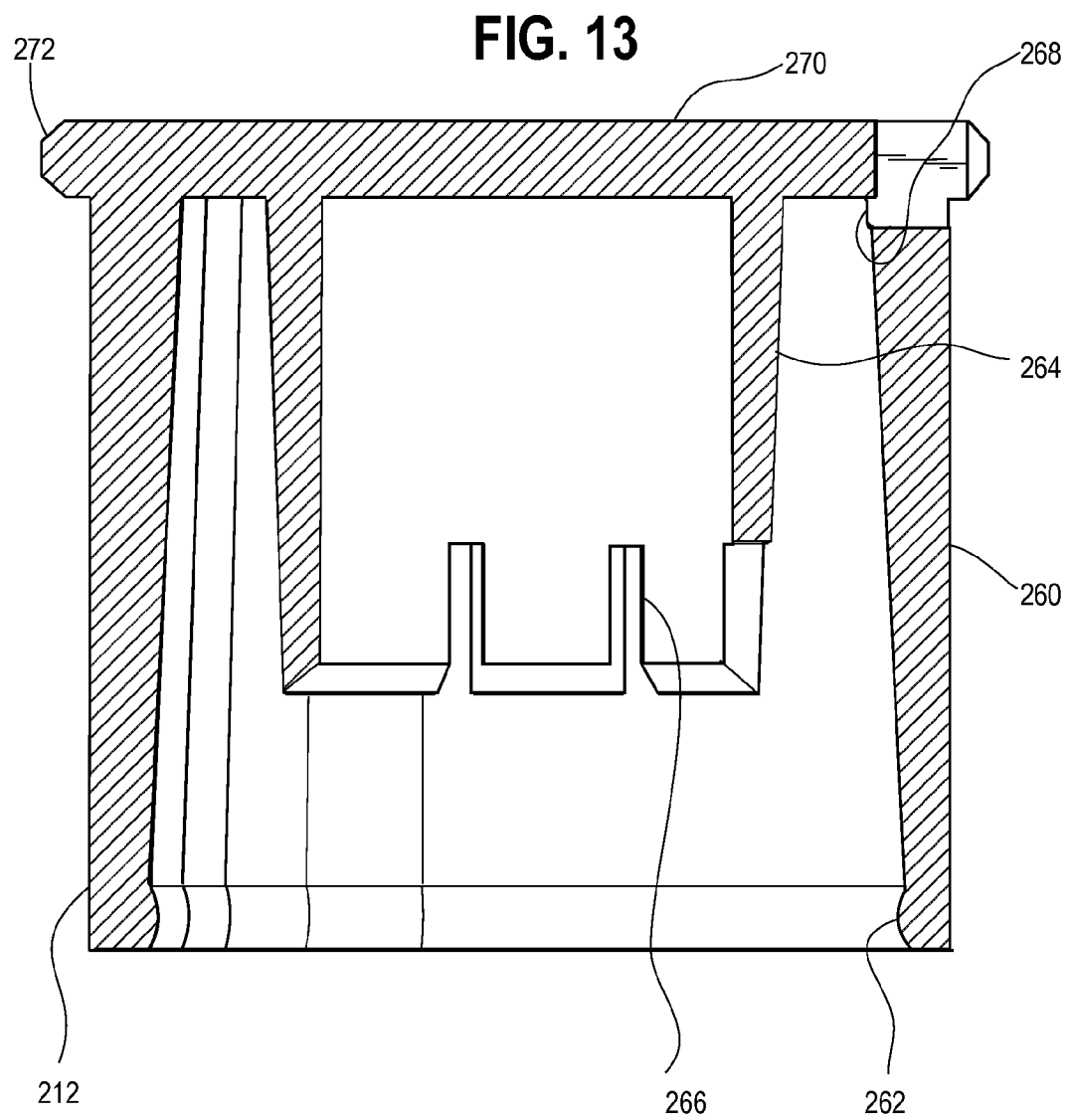
FIG. 13 is a sectional view of the nozzle of FIG. 12 taken from line 13-13 of FIG. 12.
Figure 14:
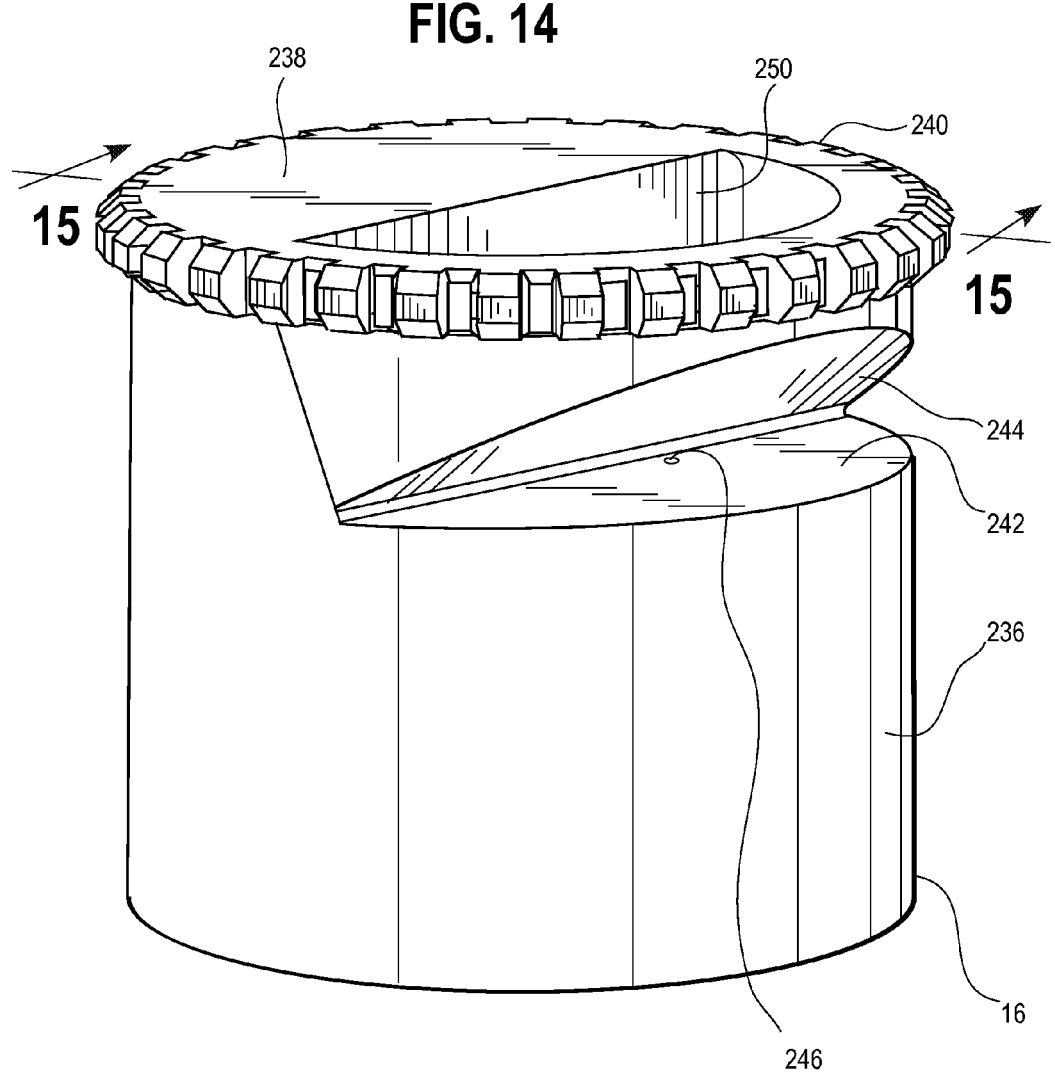
FIG. 14 is a front perspective view of another of the nozzles of the nozzle bush of FIG. 8.
Figure 15:
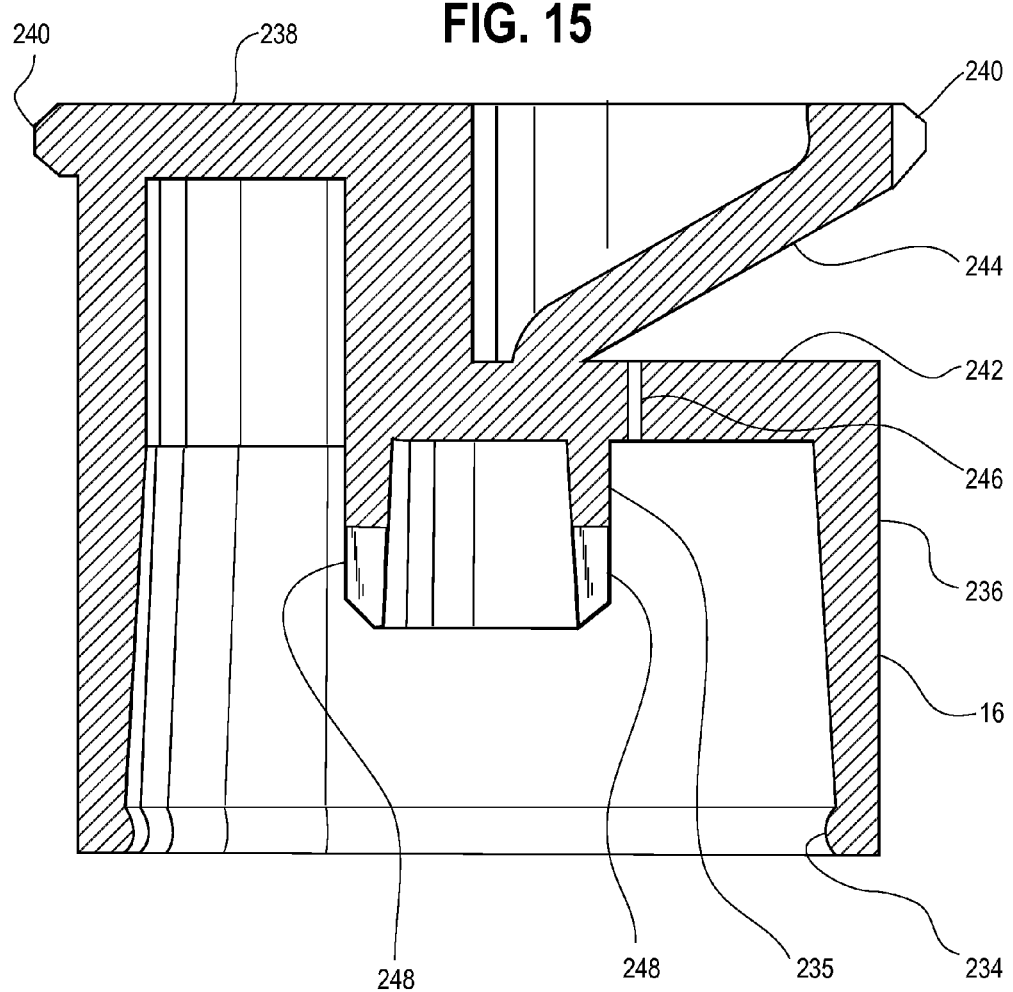
FIG. 15 is a sectional view of the nozzle of FIG. 14 taken from line 15-15 of FIG. 14.

Nozzle bodies having different configurations can be selectively attached to the riser. A first type of nozzle body can be configured to discharge irrigation water in a spray pattern, an example of which is illustrated in FIGS. 14 and 15. The geometry of the nozzle body can control the arcuate extent of the spray pattern, as will be discussed in greater detail below. For example, the nozzle body can be configured to have a spray pattern with an arcuate extent of 90 degrees, 180 degrees or about 360 degrees. As second type of nozzle body can be configured to discharge irrigation water in a stream pattern through one or more openings, an example of which is illustrated in FIGS. 12 and 13. The number of openings and their spacing can vary depending upon the desired arcuate extent of the stream pattern, as will be discussed in greater detail below. For example, the nozzle body can be configured to have a stream pattern with an arcuate extent of 90 degrees, 180 degrees or about 360 degrees.

With reference to an example of the first type of nozzle body, and equally applicable to the second type of nozzle body, the nozzle body 16 has a top 238 with a depending outer skirt 236, as illustrated in FIGS. 14 and 15. The end of the outer skirt 236, opposite the top 238, has a radially-inward extending protuberance 234 that is configured to be at least partially received with the radially-outward facing groove 78 extending about the circumference of the upper portion of the riser 14. The protuberance 234 on the outer skirt 236 of the nozzle body 16 is designed to snap into the groove 78 of the riser 14, as illustrated in FIG. 6. This type of attachment between the nozzle body 16 and the riser 14 eliminates the need for internal and external threading arrangements, thereby advantageously providing cost savings as well as simplified attachment and detachment of the nozzle body 16 from the riser 14.

Moreover, the snap arrangement can be configured to advantageously permit the nozzle body 16 to be rotated when it is attached to the riser 14, thereby facilitating adjustments to the direction of the emitted spray or stream and permitting the spray or stream to be directed away from a user during installation or adjustments. The riser 14 and nozzle body 16 can be configured to permit nozzle body 16 rotation a full 360 degrees, or less if desired. In one aspect, the nozzle body 16 can be configured to rotate relative to the riser 14 when attached thereto at least 90 degrees, 180 degrees or greater up to a full 360 degrees, preferably without requiring moving in the axial direction of the riser 14, such as would be required with a threaded attachment. Alternatively, the riser can have a threaded end for attachment of a threaded nozzle body, and optionally be configured to rotate relative to the housing to position the nozzle body.

Disposed radially inward from the outer skirt 236 is a depending inner skirt 235. The inner skirt 235 has a length less than the length of the outer skirt 236 such that it is recessed within the outer skirt 236. When attached to the riser 14, the outer side of the inner skirt 236 can engage the inner side of the upstanding inner wall 82 of the upper end of the riser 14, as discussed above. Conversely, the relative positions of the inner skirt 235 of the nozzle body 16 and the inner wall 82 of the riser 14 can be reversed. The lower edge of the inner skirt 235 of the nozzle body 16 can have a plurality of different slots 248 formed therein and extending to the edge of the skirt 235. The one or more slots 248 provide for a restricted or metered fluid communication from outlet fluid passage 84 of the riser 14 to the fluid chamber 88 disposed between the inner and outer walls 82 and 76 of the upper end of the riser 14, as illustrated in FIG. 6. From the fluid chamber 88, fluid can exit the nozzle body 16 through the one or more orifices 246 thereof. The purpose of the slots 248 is to provide for a pressure drop in the irrigation fluid upstream of the orifice 246 in the nozzle body 16, thereby advantageously permitting a higher pressure of irrigation fluid to be supplied to the irrigation device 10. The number and size of the slots 248, as well as their open area when engaged with the upstanding inner wall 82 of the riser 14, can be selected to provide for a desired pressure drop. Furthermore, the number and size of the orifices 246 can be selected to provide for a further pressure drop. Thus, varying the number and size of the slots 248 and orifices 246 can together be utilized to achieve a desired pressure drop.

Turning first to details of an exemplary embodiment of the first type of nozzle body 16 configured to emit a spray pattern, depicted in FIGS. 14 and 15, the nozzle body 16 includes the outer skirt 236 with inwardly-facing protuberance 234, inner skirt 235 with slots 248 and top wall 238 that have been referenced above. Disposed about the periphery of the top 238 are a plurality of radially-extending teeth 240, which can provide for improved gripping as opposed to a smooth periphery of the top 238. The orifice 246 extends through an intermediate wall 242 which extends generally perpendicular to a longitudinal axis of the nozzle body 16. The upstream end of the orifice 246 is in fluid communication with the fluid chamber 88 disposed between the inner and outer walls of the upper end of the riser 14. The downstream end of the orifice 246 is orientated to direct the exiting fluid jet against an inclined deflector 244, which in turn breaks up the fluid jet and deflects the jet outwardly from the mouth created in the outer skirt 236 of the nozzle body 16 between the deflector 244 and the intermediate wall 242 and away from the device to irrigate the surrounding terrain.

Figure 9:
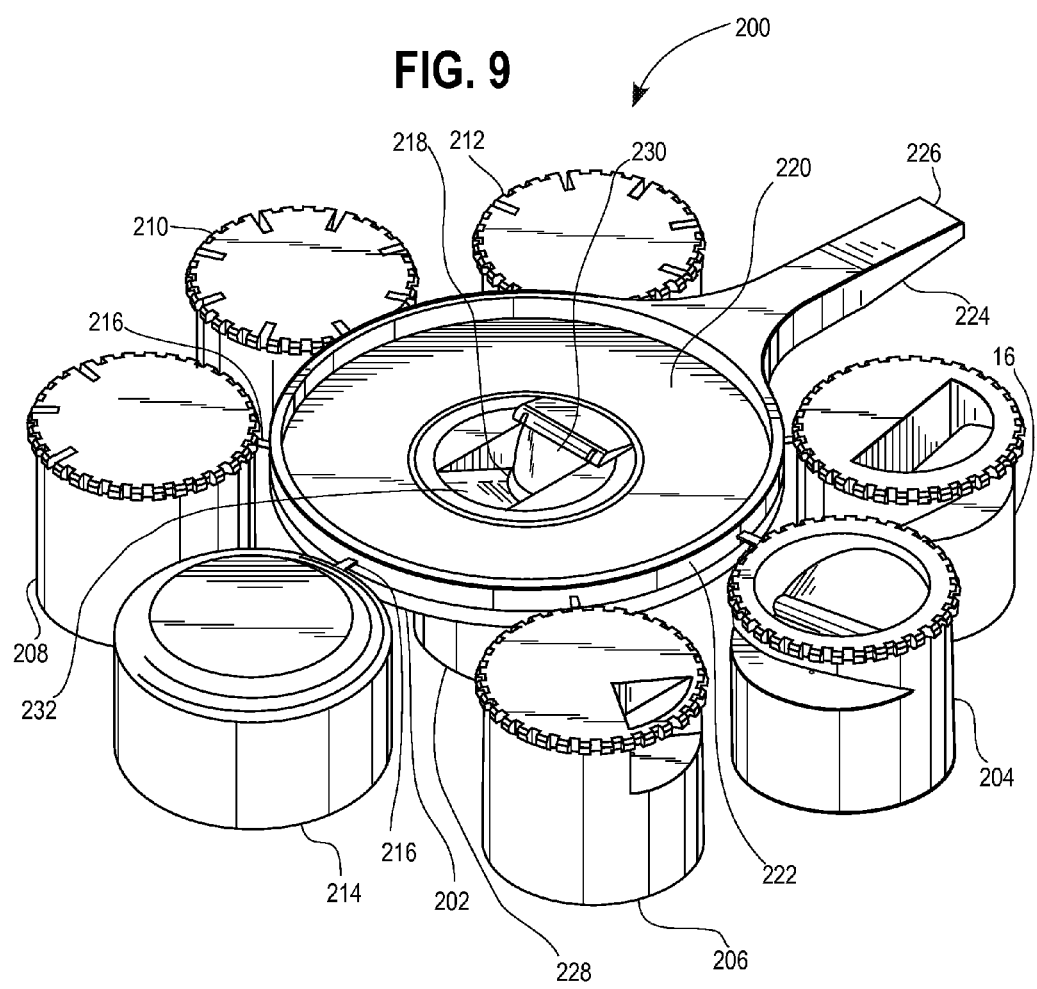
FIG. 9 is a perspective view of a nozzle bush having a plurality of nozzles disposed about its perimeter, the nozzles being attachable to the riser of the pop-up irrigation device of FIG. 1.
Figure 10:
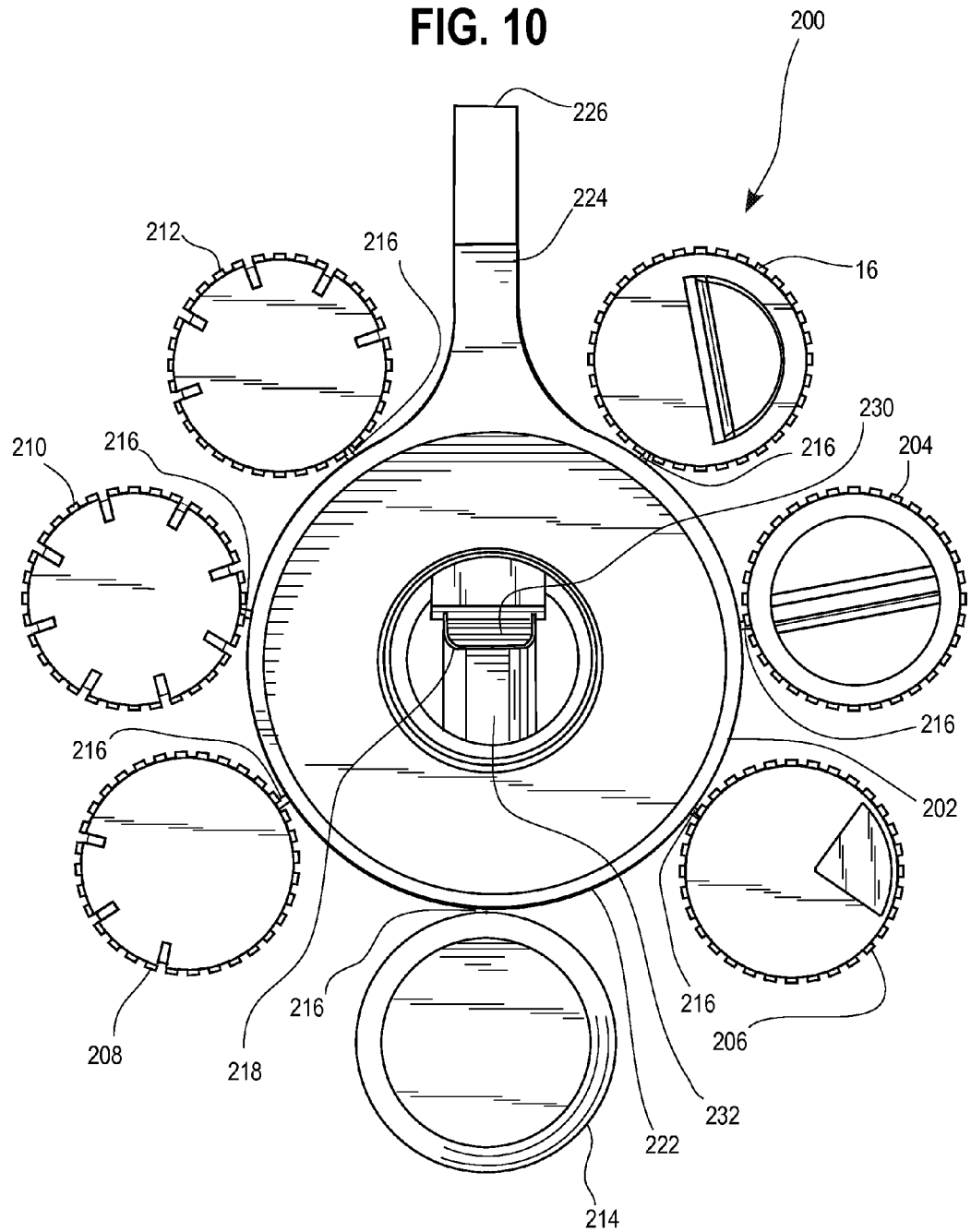
FIG. 10 is top plan view of the nozzle bush of FIG. 9 showing the top sides of the nozzles.
Figure 11:
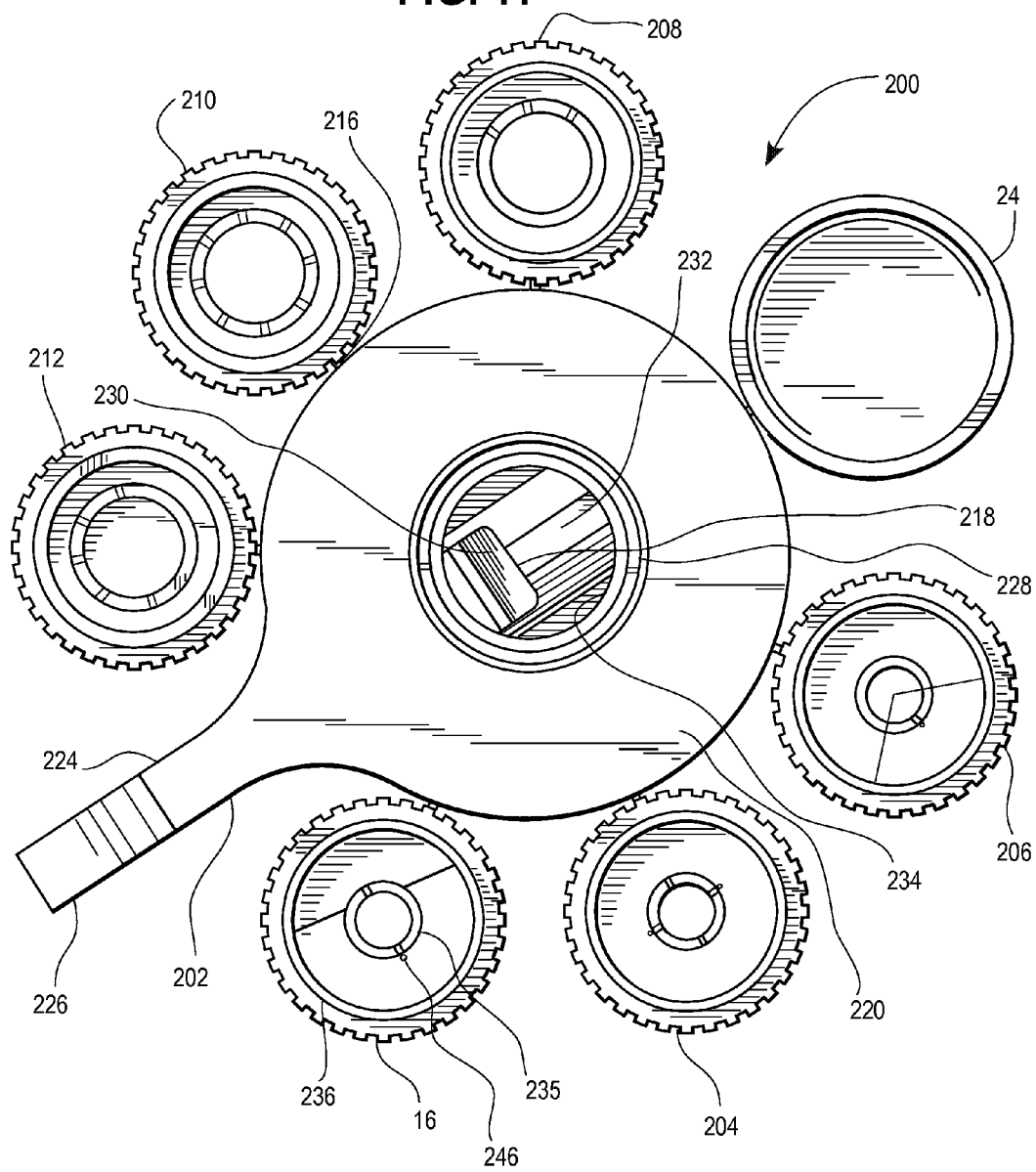
FIG. 11 is a bottom plan view of the nozzle bush of FIG. 9 showing the undersides of the nozzles.

In the embodiment of FIGS. 14 and 15, the mouth extends about 180 degrees of the nozzle body 16, thereby creating a semicircular spray pattern. Other configurations of the spray pattern can be achieved using different nozzle body geometries, and are illustrated in FIGS. 9-11. For example, a quarter-circle spray pattern can be achieved using a nozzle body 206 having a mouth that extends about 90 degrees of the nozzle body 206. A full-circle spray pattern can be achieved using a nozzle body 204 having one mouth that extends about 180 degrees of the nozzle body 204 and a second mouth that also extends about 180 degrees of the nozzle body 204, each with their own orifice, thereby effectively combining a pair of about 180 degree mouths onto a single nozzle body 204. Other arcuate spray patterns can be achieved by adjusting the arcuate extent to which the mouth extends of the nozzle body. Furthermore, the number of orifices and their sizes feeding each mouth can vary depending upon the desired spray pattern.

Turning next to details of an exemplary embodiment of the second type of nozzle body 212 configured to emit a stream pattern, depicted in FIGS. 12 and 13, the nozzle body 212 includes an outer skirt 260 with an inwardly-facing protuberance 262, an inner skirt 264 with slots 266 and a top 270 similar to those referenced above with respect to the nozzle body 16 of the first type. Also similar, disposed about the periphery of the top 270 are a plurality of radially-extending teeth 272. However, instead, of having the aforementioned mouth formed between the deflector 244 and intermediate wall 242 fed by an orifice 246, one or more orifices 268 (in the illustrated embodiment, five orifices) extend through the sidewall 260 and/or top wall 270 of the nozzle body 212. The orifices 268 in the illustrated embodiment are formed at the intersection of the sidewall 260 and top wall 270 and are generally rectangular, although other locations and shapes of the orifices 268 can be suitable. The edges defining the orifices 268 can be shaped or tapered to further shape the exiting stream of irrigation fluid. Also, the inner skirt 264 of the nozzle body 212 configured for emitting streams can be dimensioned for engaging the outer diameter of the inner wall 82 of the riser 14, as opposed to the inner diameter of the inner wall 82 of the riser 14 as in the case of the inner skirt 235 of the aforementioned nozzle body 16 configured for emitting a spray. However, either nozzle body type could be adapted to have the inner skirt engage either the inner or outer diameter of the inner wall 82 of the riser 14.

In the embodiment of FIGS. 12 and 13, the five orifices 268 are equally spaced about 180 degrees around the circumference of the nozzle body 212, thereby creating a semicircular stream pattern. Other configurations of the stream pattern can be achieved using different nozzle body geometries, and are illustrated in FIGS. 9-11. For example, a quarter-circle stream pattern can be achieved using a nozzle body 208 having three equally spaced orifices that extend about 90 degrees around the circumference of the nozzle body 208. A full-circle stream pattern can be achieved using a nozzle body 210 having eight equally spaced orifices that extend 360 degrees around the circumference of the nozzle body 210. Other arcuate stream patterns can be achieved by adjusting the arcuate extent, spacing, size and number of orifices.

Figure 20:
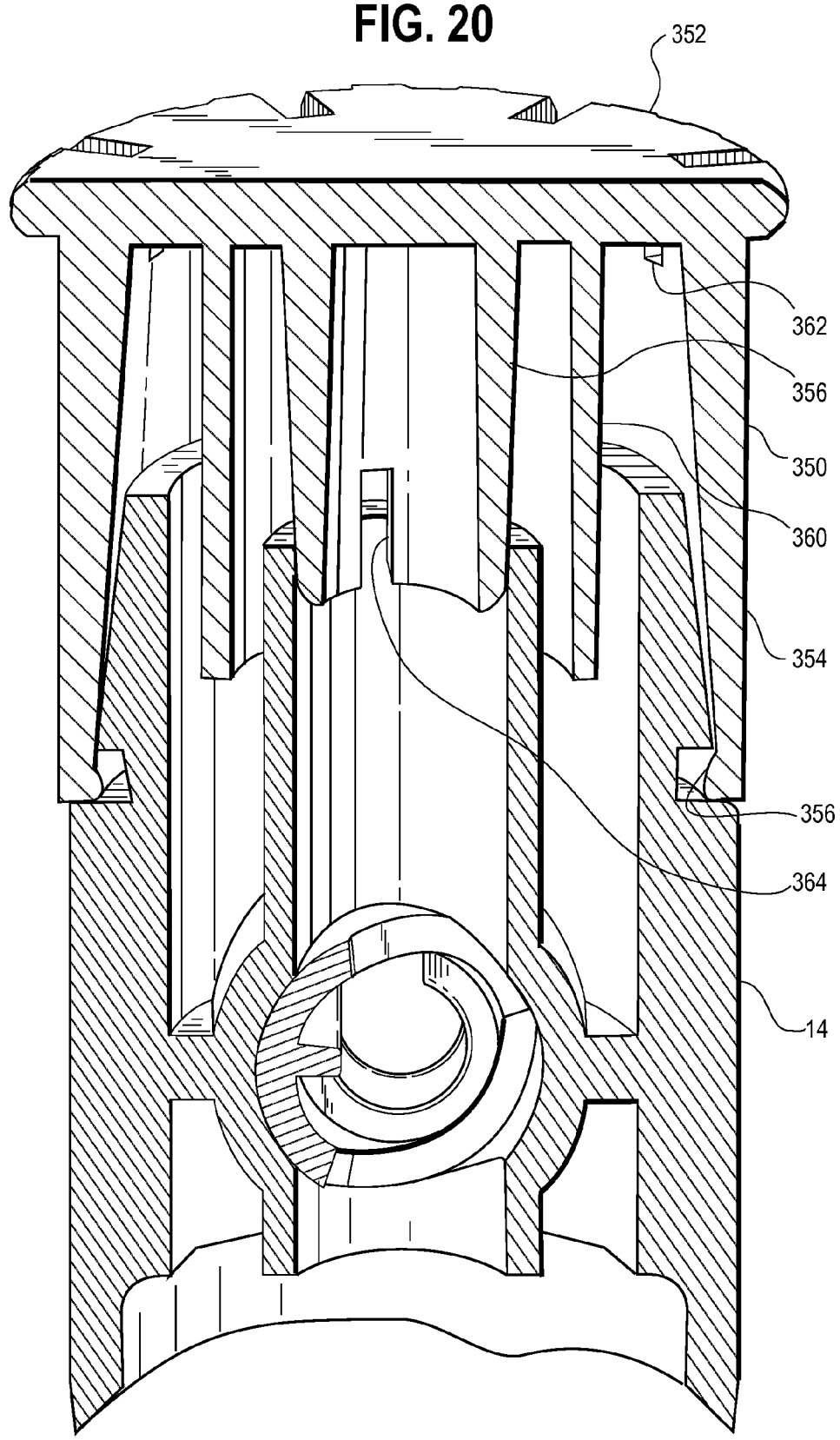
FIG. 20 is a detailed sectional view of a second embodiment of a nozzle body attached to an end of the riser.
Figure 21:
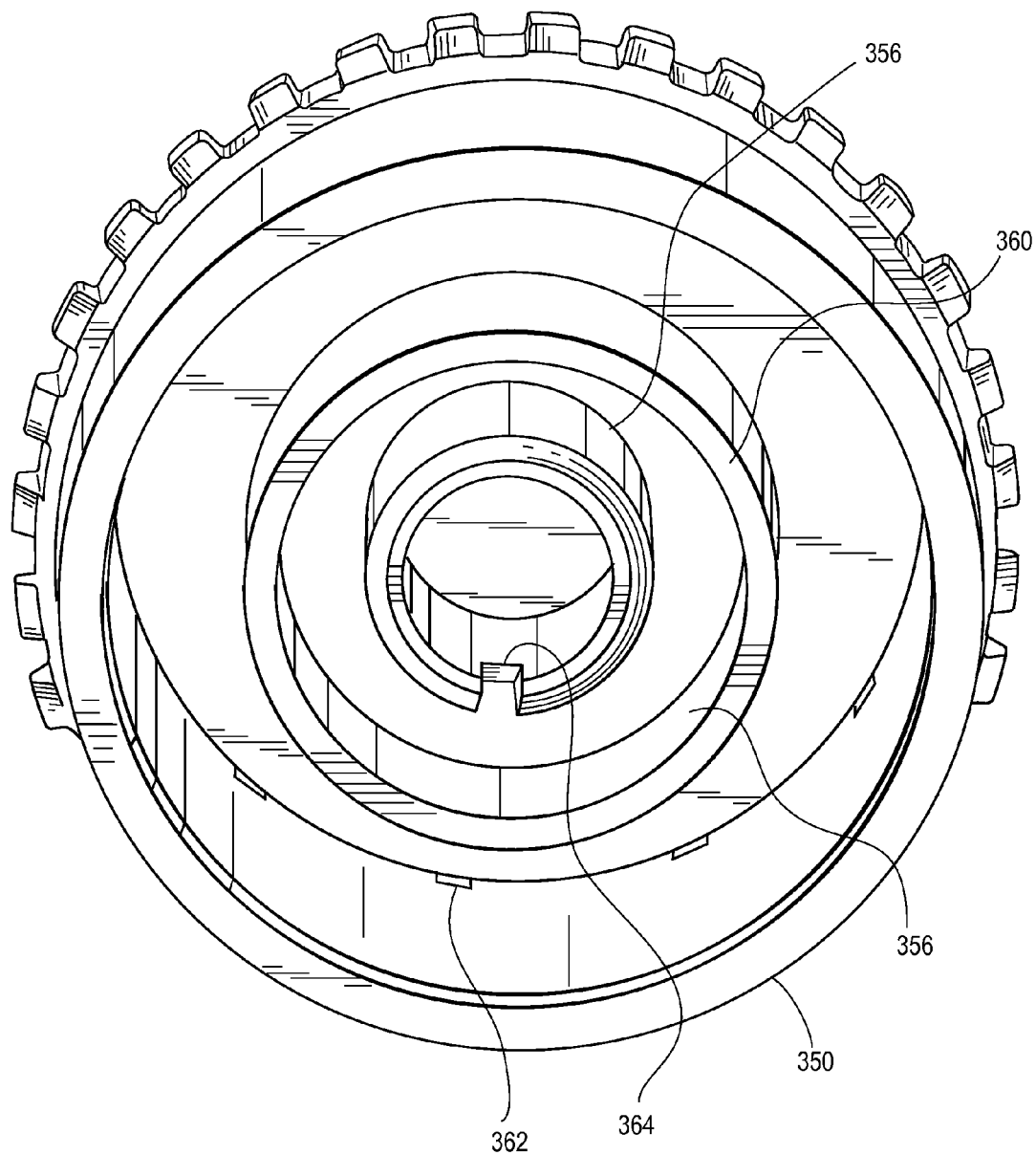
FIG. 21 is a perspective view of the bottom of the nozzle body of FIG. 20.

In an alternative nozzle body 350, illustrated in FIGS. 20 and 21, an intermediate skirt 360 is positioned between an inner skirt 356 and an outer skirt 354. The intermediate skirt 360 creates a more circuitous flow path for the fluid exiting the riser 14 to facilitate more uniform velocities of fluid exiting orifices 362 of the nozzle body 350. More specifically, and similar to the aforementioned nozzle bodies, the nozzle body 350 with the more circuitous flow path includes a top 352 with the outer skirt 354 depending therefrom. The lower end portion of the outer skirt 354 includes a radially-inward extending protuberance 356 for engaging with a circumferential groove 78 of the riser 14 to secure the nozzle body 350 in a removable, snap-on type arrangement. A depending inner skirt 356 can mate with either the inner diameter or the outer diameter of the inner wall 82 of the riser 14. The inner skirt 356 includes one or more slots 364 through which fluid can pass to the region between the inner skirt 356 and the outer skirt 354 before exiting through the orifices 362 in the outer skirt 354. In order to create a more circuitous path for the fluid, the intermediate skirt 360 depends from the top 352 and is positioned between the inner skirt 356 and the outer skirt 354. When attached to the riser 14, the intermediate skirt 360 is positioned between the outer diameter of the inner wall 82 of the riser 14 and the inner diameter of the tapered portion 76 of the riser 14, as illustrated in FIG. 20, and has a length extending below the slot 364. Thus, fluid exiting through the slot 364 of the inner skirt 356 must go generally radially outward, axially downward, around the end of the intermediate skirt 360, then axially upward before exiting through the orifices 362. A similar type of intermediate skirt 360 can be utilized in any of the foregoing nozzle bodies, as well as in the below-described nozzle bush 200 or otherwise shaped arrangement.

As described above, the number of the slots and orifices can be selected to provide for a pressure drop, as well as for desired exit velocities of the streams. By way of example, there may be one slot and five orifices for irrigating about 180 degrees. To irrigate about 90 degrees, there may be one smaller slot and three smaller orifices. To irrigate about 360 degrees, there may be two to four slots and eight orifices. However, any suitable number and sizes of orifices and slots may be utilized to achieve the desired irrigation pattern.

In yet another alternative, a nozzle body 370 is configured for emitting a spray pattern. The nozzle body 370 can optionally be configured for providing a higher relative volume of water at the edges of the spray pattern, which can make for a more visually appealing and well defined spray pattern. This is accomplished by altering the geometry of the nozzle body 370 at the sidewalls 396 of the mouth or discharge opening 388 which define the edges of the spray pattern. More specifically, the surface area of the sidewalls 396 is increased as compared to if the sidewalls 396 were flat. As a higher fraction of water tends to flow immediately adjacent to the structural boundaries of the discharge opening 388, increasing the surface area of the structural boundaries in select locations can increase the water volume in those locations. Here, outwardly extending notches 398 are formed in the sidewalls 396 of the discharge opening 388 to increase the relative volume of water flowing therealong, thereby providing a greater water volume at the edges of the spray pattern with the resultant appearance of better, more defined edges to the spray pattern.

Figure 29:
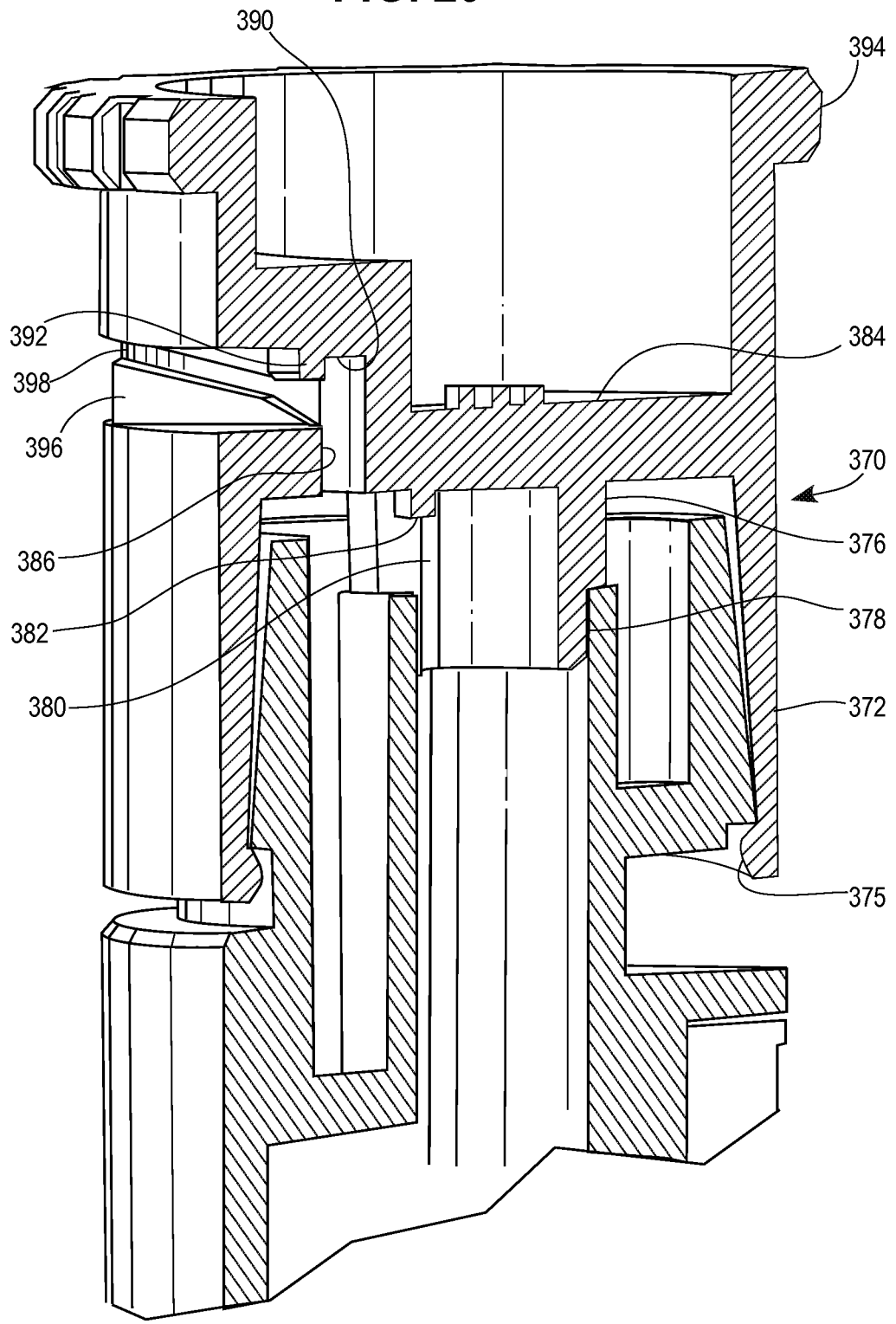
FIG. 29 is a section view of the nozzle body of FIG. 25 mounted on the end of a riser.

As with prior embodiments of nozzle bodies, the nozzle body 370 illustrated in FIGS. 25-29 includes an outer skirt 372 depending from a recessed wall 384. A toothed flange 394 is circumferentially disposed at the top of the nozzle body 370. The inner side of the outer skirt 372 can have threads 374 (FIG. 28) or a snap bead 375 (FIG. 29) to facilitate attachment relative to a riser. An inner skirt 376 is configured to engage the upper end of the riser, as illustrated in FIG. 29. The inner skirt 376 includes a downwardly extending narrowed portion 378, with a step formed at the junction of the narrowed portion 378. That step can seat on the top of an inner skirt portion of the riser, as illustrated in FIG. 29, with the step resting on the top edge thereof.

An outer chamber is defined in part between the inner and outer skirts 376 and 372, and an inner chamber is defined in part within the inner skirt 376. The inner skirt 376 includes one or more longitudinally extending slots 380 through which water can exit the riser and then flow from the inner chamber to the outer chamber, then from the outer chamber and from the interior of the nozzle body 370 through an exit orifice 392 which is directed into the discharge opening 388. The use of the two chambers can beneficially result in a pressure drop of the fluid as it flows from the inner chamber to the outer chamber through the one or more slots 380. For further fluid control, a depending wall 382 can be aligned with the slot 380 and positioned between the slot 380 and the recessed wall 384 to reduce the volume of water flowing through the slot 380 as compared to if there were no depending wall 382 and the slot 380 extended the whole length of the inner skirt 376.

The orifice 386 in the recessed wall 384 has a shape preferably, but not necessarily, corresponding to the arcuate span of the discharge opening. For example, a discharge opening having an arcuate span of 120 degrees can have a smaller sized orifice than a discharge opening having an arcuate span of 180 degrees. The shape of the orifice can be such that uniformity of flow is achieved or approached through the orifice and into the discharge opening. For instance, the orifice can be D-shaped. The orifice 386 can be directly aligned with the slot 380 so that velocity losses are minimized.

The water exiting through the orifice 386 first is directed upwardly toward a rearwardly disposed, recessed region or chamber 390, separated by a depending wall 392 of the top wall 387 of the discharge opening 388 from the remainder of the top wall 387 of the discharge opening 388. This forces the water to be directed downwardly instead of simply outwardly, thereby reducing the velocity of the exiting water. The discharge opening is bounded by the top wall 387, a bottom wall 385 and the sidewalls 396, the latter having the aforementioned notches 398. The notches 398 can extend at an upward inclination, toward the top wall 387, in order to provide the increased water volume in an upper portion of the trajectory of the discharged water. The angle can be between about 5 and 25 degrees, and more preferably about 8 degrees, although other angles can be chosen depending upon the desired pattern. The notches 398 can have a height of between about 10 and 50 percent of the height of the discharge opening 388, and more preferably about 35 percent, although other percentages can be chosen depending upon the particular circumstances or desired pattern. In an exemplary embodiment, the notches 398 can have a height of about 0.02 inches, a depth of between 0.01 and 0.024 inches, and an angle of inclination of about 8 degrees, with the discharge opening 388 having a height of about 0.06 inches, although other dimensions could be utilized.

Although as illustrated there is a single discharge opening 388 of the nozzle body 370, more than one discharge opening can be present. In the illustrated embodiment, the spray pattern is 180 degrees. To achieve less, the arcuate extent of the discharge opening can be reduced. To achieve more, the arcuate extent can be increased or more than one discharge opening or mouth can be provided. For example, a 240 degree spray pattern can be formed using two 120 degree openings. A 360 degree spray pattern can be formed using four 90 degree openings or two 180 degree openings.

Each discharge opening can have an aligned slot. That is, the number of slots can directly correspond to the number of discharge openings. For example, a 90 degree, 120 degree, or 180 degree arcuate discharge opening can have one orifice and one slot. A nozzle body can have multiple discharge openings each with their own orifice, e.g., a nozzle with three 90 degree discharge openings can have three orifices (one for each opening); a nozzle with two 180 or 120 degree discharge openings can have two orifices (one for each opening). When more than one discharge opening or mouth is present, adjacent ones of the sidewalls may omit the notch, such that the increased water volume is present only on the arcuate edges of the spray to provide improved edge definition. In the case of a nozzle body configured for 360 degree spray, no notches may be needed.

Figure 35:
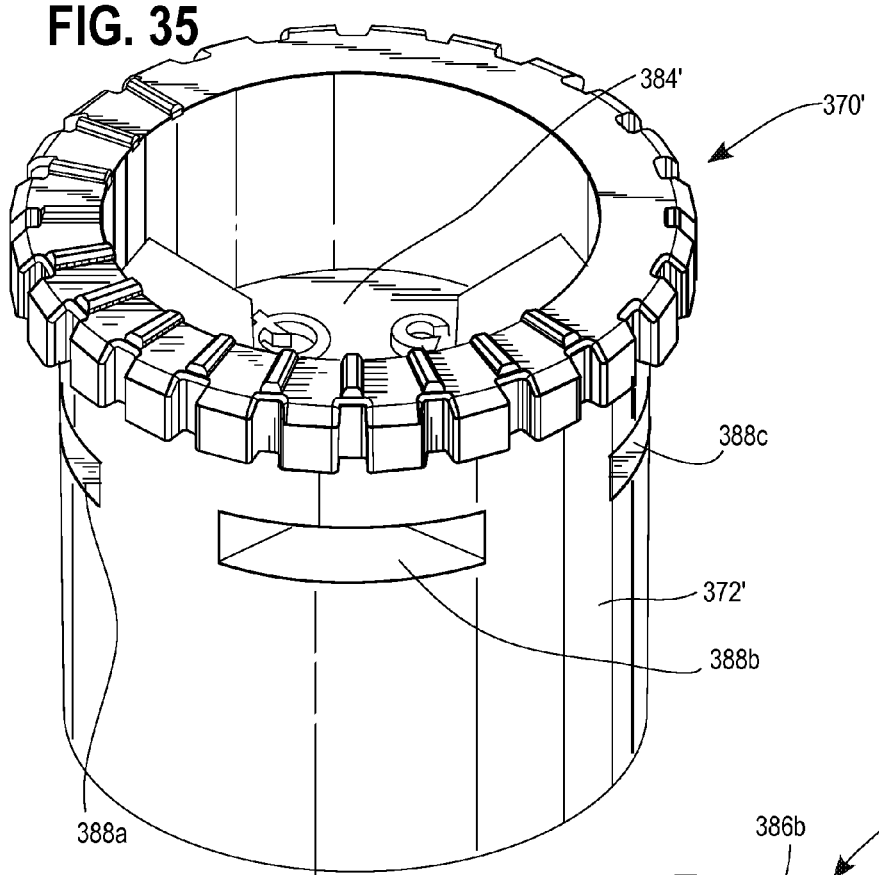
FIG. 35 is a perspective view of an alternative of the third embodiment of the nozzle body, differing in that it is configured for emitting fluid in a pattern having about 240 degrees of arcuate extent.
Figure 36:
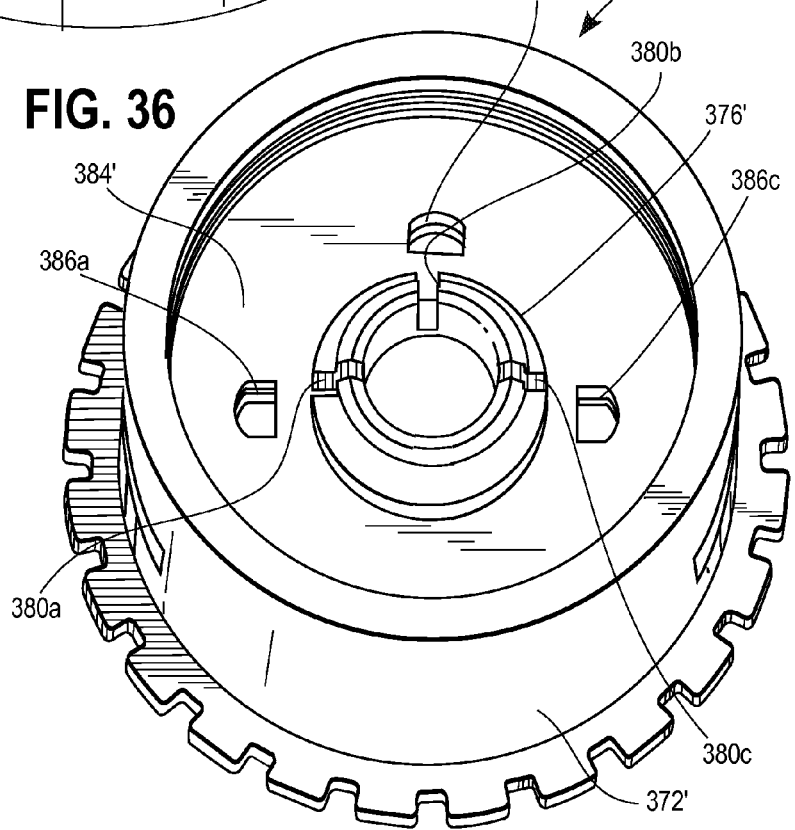
FIG. 36 is a bottom perspective view of the alternative of the third embodiment of the nozzle body of FIG. 35

With reference to an exemplary embodiment illustrating these variations, a nozzle body 370' is depicted in FIGS. 35 and 36 of similar construction to the nozzle body 370 discussed above and depicted in FIGS. 25-29. That is, the nozzle body 370' has an outer skirt 372' and an inner skirt 376' connected to a wall 384'. However, instead of one mouth 388, three mouths 388a, 388b and 388c are provided. Each of the mouths discharges water in a pattern having an arcuate extent of about 90 degrees; thus, this nozzle body 370' provides about 270 degrees of coverage. Each of the mouths 388a, 388b and 388c has an aligned orifice 386a, 386b or 386c as well as in turn an aligned slot 380a, 380b or 380c in the inner skirt 376'.

The descriptions herein of the discharge openings as being a particular degree can refer to either the arcuate span of the opening and/or the effective flow resulting therefrom, and the degrees to not have to be precise. Further, the nozzle bodies described herein are not limited to use with the devices described herein, and can be adapted for either or both snap-on or threaded attachment to a riser, or integrally formed with other components of an irrigation device.

Nozzle Carriers

The different nozzle bodies 16, 204, 206, 208, 210 and 212 can be provided as part of a nozzle arrangement, such as the bush 200 illustrated in FIGS. 9-11. The nozzle bush 200 includes a carrier 202 with each of the nozzle bodies 16, 204, 206, 208, 210 and 212 attached about its periphery via breakable bridges 216. The nozzle bush 200 is preferably formed of injection molded plastic. The carrier 202 includes a circular, generally planar central portion 220 having an upstanding peripheral rim 222. An optional protruding tool 224 can extend radially outward from the carrier 202. The tool 224 can have a pry bar 226 formed at an end thereof, such as for use in insertion into the slot 86 of the riser 14 for removal of an attached nozzle body 16, as discussed above. Other types of tools can also be provided on the bush 200 or other arrangement having a different shape. In addition, a cap 214 for attachment to one of the connection ports 30 can be attached by a bridge 216 to the periphery of the carrier 202. Exemplary nozzle carriers are described in U.S. application Ser. No. 12/642,470, filed Dec. 18, 2009, which is hereby incorporated by reference in its entirety.

Disposed in the center of the central portion 220 of the carrier 202 is a flush port 218. The flush port 218 is designed to be used during the flushing of the irrigation device 10. More specifically, a depending skirt 228 with an inwardly-facing annular protuberance 234 of the carrier 202 can be attached to the upper end portion of the riser 14 in the same manner as the aforementioned nozzle body 16, thereby attaching the carrier 202 to the riser 14 of the irrigation device 10. That is, the minimum inner diameter of the protuberance 234 of the skirt 228 associated with the flush port 218 of the nozzle bush 200 is substantially the same as that of the protuberance of the 234 of the outer skirt 236 of the nozzle body 216. A pair of walls 230 and 232 are each inclined inwardly into the interior of the skirt 228 and have spaced free ends which at least partially define the flush port 218 therebetween. The inclined walls 230 and 232 cooperate to laterally deflect fluid exiting the riser through the flush port 218. This can permit a user to flush the irrigation device 10 without being in the path of the flushing stream, e.g., by standing on an opposite side of the carrier 202 from the direction in which the flush port 218 is aimed. Instead of being arranged in a bush-shape, the nozzle carrier incorporating some or all of the foregoing features can be in linear form, with the nozzle bodies attached along one or both longitudinal sides thereof.

Flush Caps

A flush cap can be provided for attachment to the foregoing risers, or to any other type of riser of an irrigation device (whether fixed or moveable). The flush cap can be present during installation to restrict debris from entering the housing, as well as during initial pressurization of the device to permit debris to exit the housing. Following initial pressurization or prior to final set-up, the flush cap can be replaced with a nozzle body, such as one the foregoing embodiments. To assist in restricting debris from entering the housing, the flush cap can have a moveable flap positioned adjacent an exit opening. The flap can move from a closed position, generally restricting ingress through the opening when unpressurized, to an open position, permitting egress through the opening when pressurized. By generally restricting or generally blocking, what is meant is that not all of the opening has to be blocked, just more than what is blocked when the flap is in the open position, which can be substantially more or, in some circumstances, completely blocked.

Figure 30:
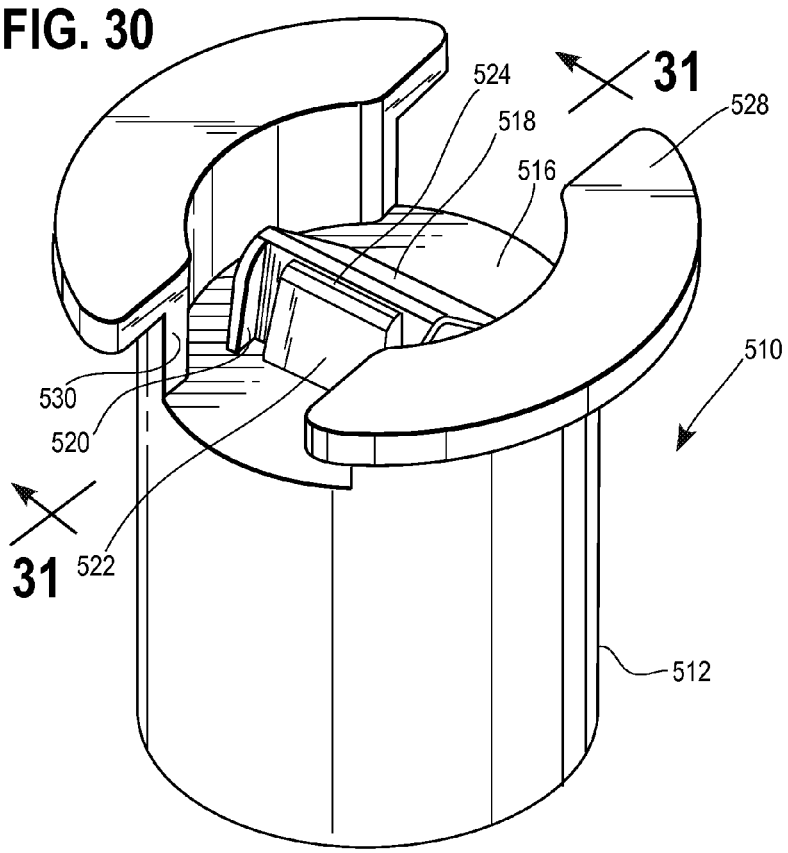
FIG. 30 is a perspective view of a first embodiment of a flush cap for attachment to a riser.
Figure 31:
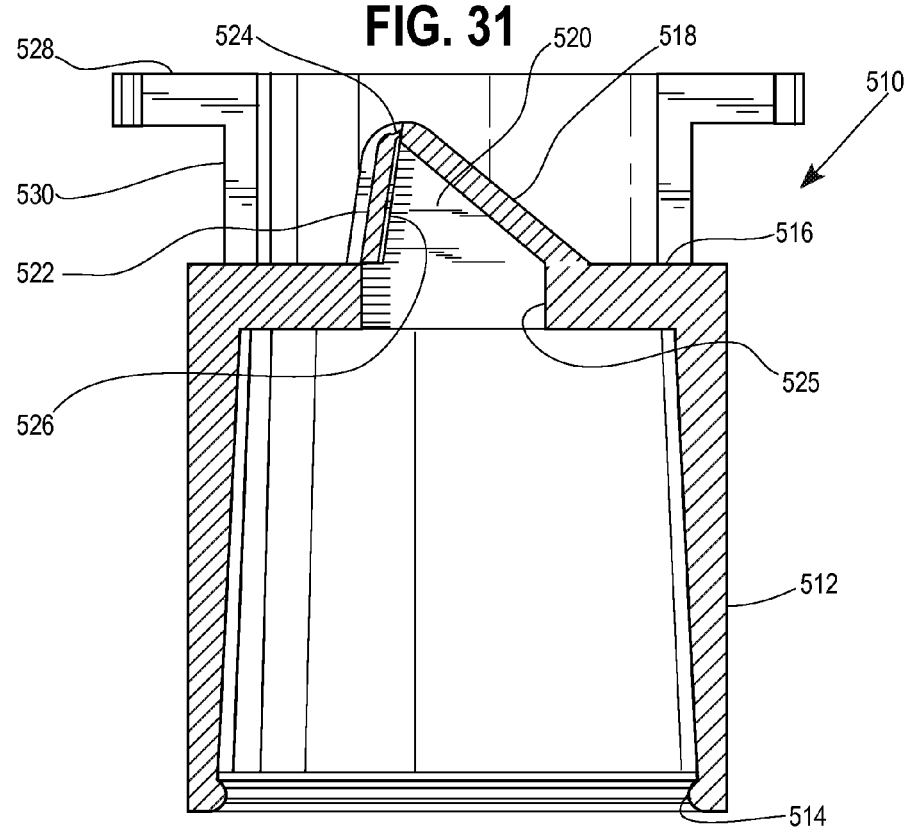
FIG. 31 is a section view of the first embodiment of the flush cap of FIG. 30 taken along line 31-31 thereof, showing a flap in a closed position.

In a first embodiment, illustrated in FIGS. 30 and 31, the flush cap 510 has a generally cylindrical sidewall 512 depending from a top wall 516. The interior of the sidewall 512 communicates via an opening 525 in the top wall with a chamber protruding upwardly from the top wall 516 on an opposite side thereof from the sidewall 512. The chamber is bounded by a pair of spaced sidewalls 520 and an inclined deflector wall 518. The sidewalls 520 are triangular and the inclined deflector wall 518 extends upwardly at an angle from the top wall 516 such that the resulting structure has the appearance of a triangular protrusion from the top wall 516. A flap 522 is moveable about a hinge 524 between open and closed positions with respect to an opening 526. The hinge 524 is at the apex or upper portion of the inclined deflector wall 518, although it could also be positioned at other edges surrounding the opening 526. When pressurized, fluid can flow through a riser and into the attached flush cap 510. The fluid can flow through the opening 525 and into the protruding chamber, where it is deflected from its vertical path by the inclined deflector wall 518, against the flap 522 to move the flap 522 from the closed position to the open position, then outwardly away from the flush cap 510 in a direction at an inclined relative to a central axis thereof. Until pressurized, the flap 522 can be in the closed position to restrict debris from entering the flush cap, riser and subsequently the housing.

To protect the sidewalls 520 and deflector wall 518 bounding the chamber, a pair of flanged ears 528 extends upwardly and, at their tops, outwardly from the top wall 516. The height of the flanged ears 528 is preferably greater than the height of the sidewalls 520 and deflector wall 518 bounding the chamber to provide protection for the chamber. A gap 530 between the ears 528 is aligned with the exit opening 526 of the flush cap 510 so that most, if not all, of the exiting fluid does not impact the flanged ears 528. A similar gap 530 may be disposed on an opposite side of the ears 528 such that the ears 528 are symmetrical. The flanged ears 528 can advantageously also provide a convenient location to grasp and pull the flush cap 510 off of the riser. The protection can be provided by one or more of the ears without the flanges, or by one or more of the ears with the flanges, in combination with an opening for the water to exit.

The bottom portion of the sidewall 512 is adapted for removable attachment to the upper end of a riser. In the illustrated form of a snap-on flush cap, a radially-inward extending protuberance 514 is configured to be at least partially received with a radially-outward facing groove extending about the circumference of the upper portion of the riser. Other types of attachment, such as threads, can be used.

Figure 32:
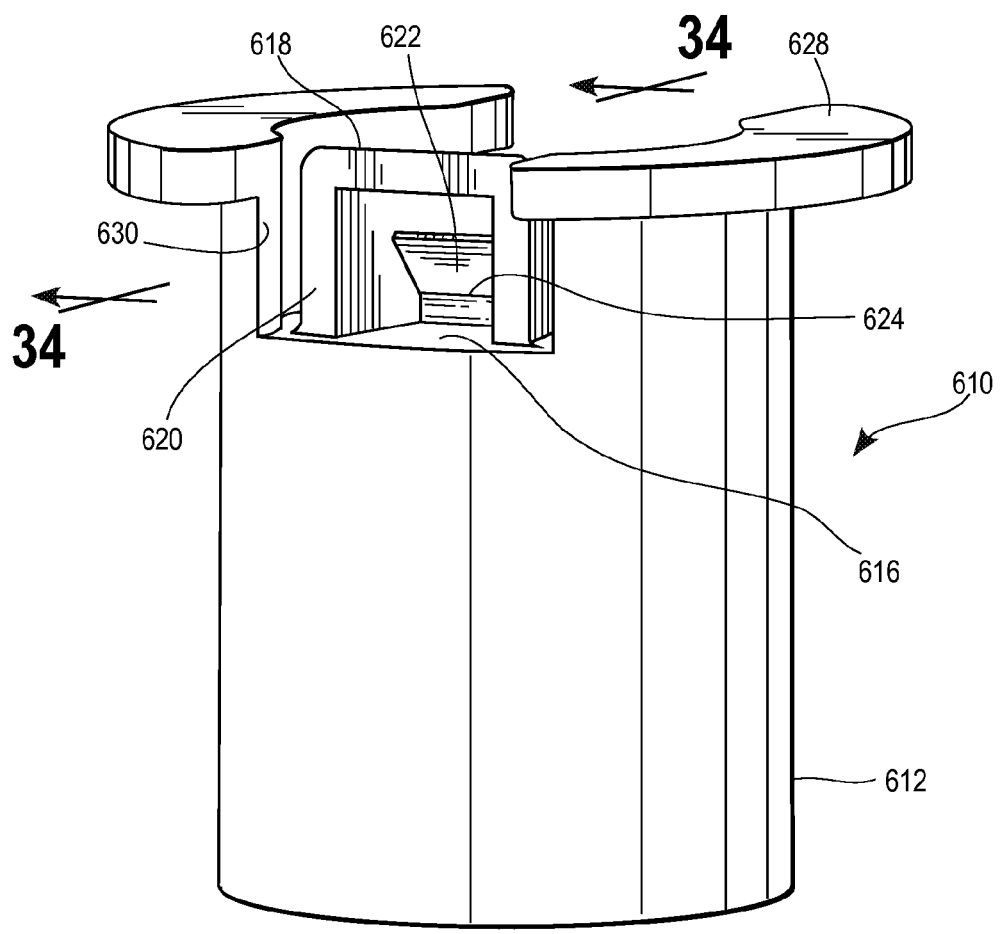
FIG. 32 is a perspective view of a second embodiment of a flush cap for attachment to a riser.

In a second embodiment, illustrated in FIGS. 32-34, the flush cap 610 is very similar in construction to that of the prior embodiment. That is, there is a hollow, cylindrical sidewall 612 depending from a top wall 616, and a radially inward extending protuberance 614 at the bottom portion of the sidewall 612. A pair of flanged ears 628 protect a protruding chamber. Although two are illustrated, a single flanged ear could also be used with an opening aligned with the exit of the chamber. The chamber has a pair of sidewalls 620, an inclined, top deflector wall 618, and a rear wall 632. A flap 622 is pivotable about a hinge 624 from a closed position to an open position to permit fluid and/or debris to exit the chamber. Unlike the first embodiment, the flush cap 610 of the second embodiment has a longer span of its sidewalls 60 and deflector wall 618 downstream of the flap to provide further downstream confinement of the issuing stream of fluid. This can provide additional control of the issuing water, such as facilitating minimal interference with the one or more flanged ears 628. The longer span can also further restrict debris from entering the chamber.

In any of the flush caps, the exiting water is preferably directed away from a user. The nozzle bodies, flush caps, and nozzle arrangements described herein can be made of an acetal polymer, although other suitable materials can be used. They can preferably be made using single-shot injection molding techniques.

Barbed Connection

Barbed connections suitable for use in connecting with flexible irrigation tubing are provided, where the barbs include at least one circumferential barb and at least one corner barb, exemplary embodiments of which are illustrated in FIGS. 39-55. The circumferential barb is configured for forming a fluid tight seal with the tubing, while the corner barb is configured for biting into the tubing to assist in retention of the tubing on the connection.

The barbed connection 800 includes a hollow, tubular body 802 having an open end 804 at one end and a central longitudinal axis 803. An outer surface of the body 802 is a first radius $r_1$ from the axis 803. A pair of circumferential barbs 806 and 808 extend radially outwardly from the body 802. A distal one of the circumferential barbs 806 is positioned adjacent the open end 804 of the body 802 and a proximate one of the circumferential barbs 808 is spaced from the open end 804 by the distal circumferential barb 806.

Each of the circumferential barbs 806 and 808 having a ramp or inclined wall angling upwardly from the central axis 803 and away from the open end 804. The ramps each terminate at a circumferential edge that is at a maximum circumferential radius $r_2$ or $r_3$ from the axis 803 and greater than the first radius $r_1$ of the body 802. At the circumferential edge, a rear wall, preferably, radially extending, spans from the edge to the outer surface of the body 802. When tubing is slipped past the circumferential barb 806 or 808, the ramp will stretch the tubing and then the tubing will elastically return toward (but not necessarily to) its original size past the rear wall in order to at least assist in maintaining the tubing on the connection 800.

Figure 44:
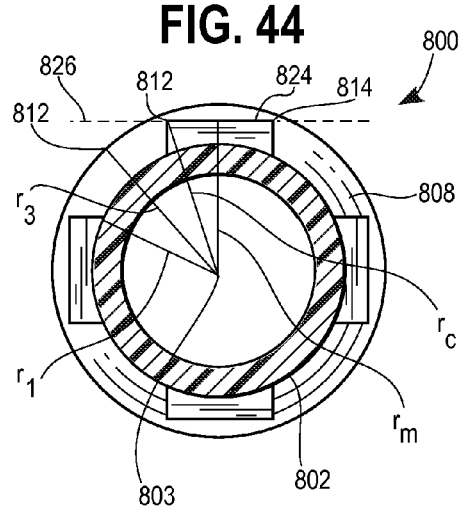
FIG. 44 is a partial front elevation view of the connection port of FIG. 41 taken along line 44-44 of FIG. 42.
Figure 45:
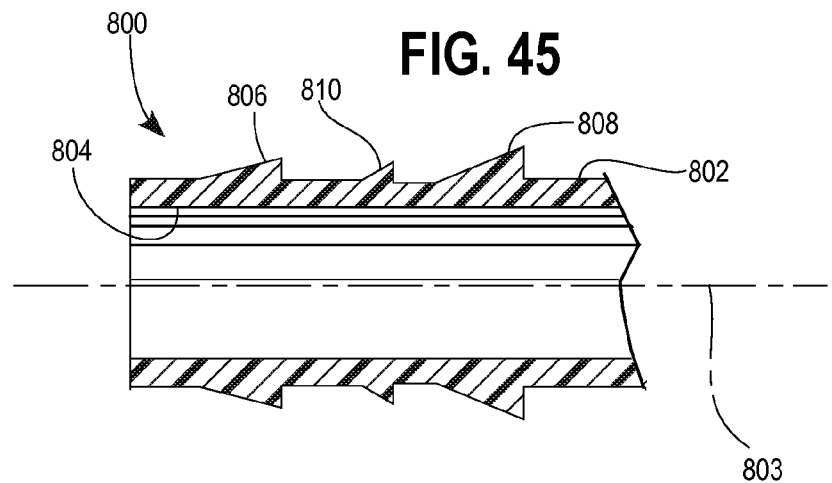
FIG. 45 is a sectional view of the connection port of FIG. 41 taken along line 45-45 of FIG. 43.
Figure 46:
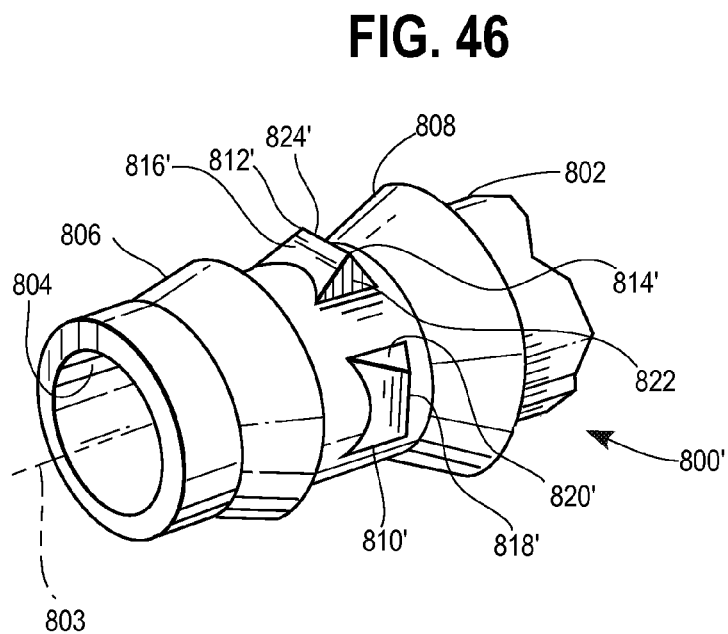
FIG. 46 is a detailed perspective view of an alternative corner barb configuration suitable for use with the connection port of the pop-up irrigation device of FIG. 39.
Figure 47:
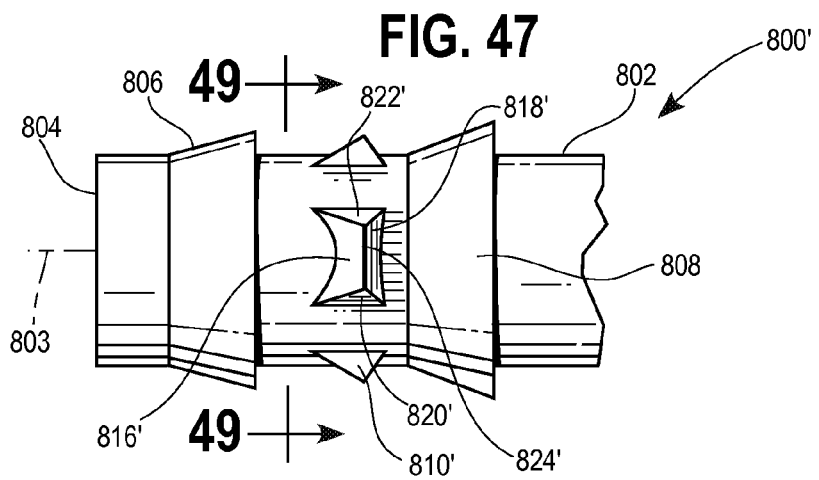
FIG. 47 is a side elevation view of the connection port of FIG. 46.
Figure 48:
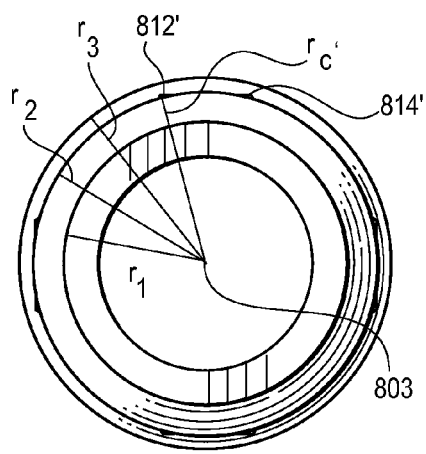
FIG. 48 is a front elevation view of the connection port of FIG. 46.
Figure 49:
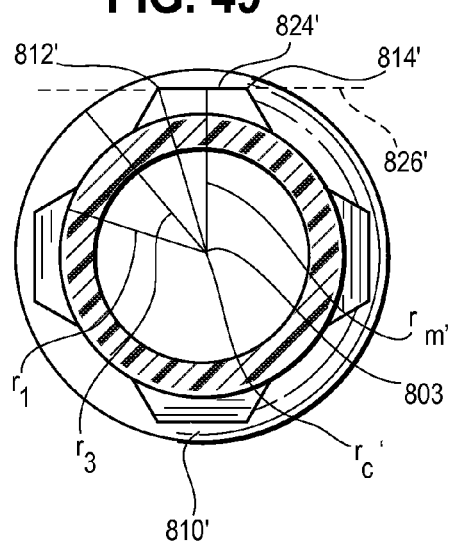
FIG. 49 is a partial front elevation view of the connection port of FIG. 46 taken along line 49-49 of FIG. 47.

A plurality of corner barbs 810 are disposed on the body 802 of the barbed connection 800 and are positioned between the proximate circumferential barb 806 and the distal circumferential barb 808, as illustrated in FIGS. 41-45. The corner barbs 810 are preferably aligned in a ring circumscribing the body 802. Each corner barb 810 has a pair of generally closely spaced, radially-outwardly facing corners 812 and 814 that function to bite into the flexible irrigation tubing disposed thereover but yet not form a fluid tight seal therebetween with the tubing. The corners 812 and 814 each extend to a corner maximum radius $r_c$ from the central axis 803 of the body 802 of the connection 800. Although both corners may have the same corner maximum radius $r_c$, it could also vary. A structure extends between the pair of corners 812 and 814 of each of the corner barbs 810, and has a midpoint at a midpoint maximum radius $r_m$ from the central axis 803, as illustrated in FIG. 44.

Preferably, though not necessarily, the corner maximum radius $r_c$ is greater than the maximum circumferential radius $r_2$ or $r_3$ of one of the circumferential barbs 806 or 808, and preferably greater than the maximum circumferential radius $r_2$ of the distal circumferential barb 806 ($r_c > r_2$). This provides for a bit into the tubing at a location where the tubing is beyond the distal circumferential barb 806. This results in a configuration where the fluid seal, i.e., between the distal circumferential barb 806 and the tubing, is upstream of the corner barbs 810 such that the fluid in the tubing and in the body 802 of the connection 800 does not reach the corner barbs 810. The midpoint maximum radius $r_m$ of the imaginary line 826 can be less than the maximum circumferential radius $r_2$ of the distal circumferential barb 806 ($r_2 > r_m$). This results in a configuration where the corners 812 and 814 protrude radially beyond the distal circumferential barb 806 and can locally deform or bite into the tubing.

Preferably, the maximum circumferential radius $r_2$ of the distal circumferential barbs 806, closer to the open end 804, is less than the maximum circumferential radius $r_3$ of the optional proximate circumferential barbs 808, on an opposite side of the distal circumferential barb 806 from the open end 804 of the body 802 of the connection 800. As described above with respect to the connection ports 430 of the embodiment of the pop-up irrigation device 410 illustrated in FIGS. 22-24, the different radii of the circumferential barbs 806 and 808 advantageously allows for different diameters of tubing to be connected to the same connection 800. If the proximate circumferential barb 808 is optionally present, the maximum circumferential radius $r_3$ of the proximate circumferential barb 808 is preferably greater than the corner maximum radius $r_c$.

Figure 41:
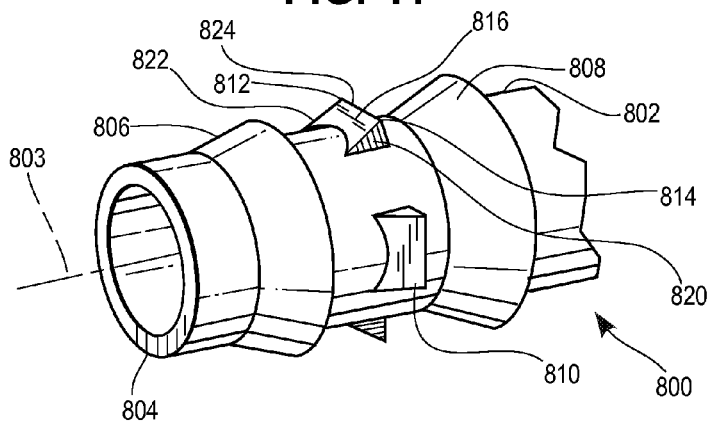
FIG. 41 is a detailed perspective view of one of the connection ports of FIG. 39.
Figure 42:
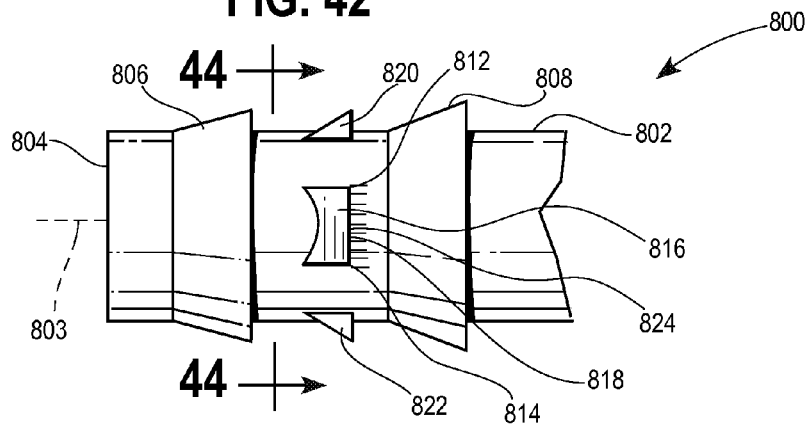
FIG. 42 is a side elevation view of the connection port of FIG. 41.
Figure 43:
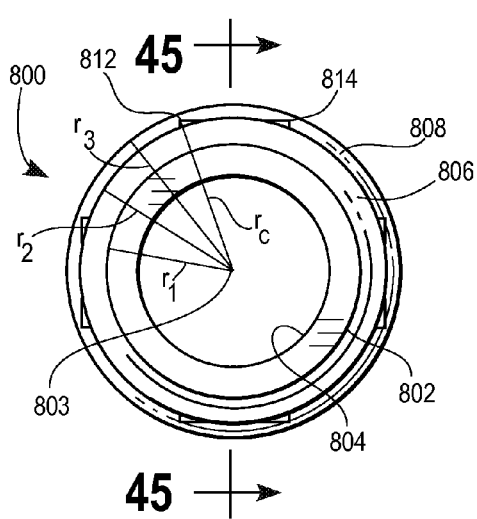
FIG. 43 is a front elevation view of the connection port of FIG. 41.

Turning now to details of the corner barb 810, each has a front ramp 816 inclined upward from the body 802 of the connection 800 and away from the open end 804 to an intersection 824 with a rear wall 818 which extends upward from the body 802 in a radial direction. The intersection 824 can be a straight or linear line that is the structure extending between the corners 812 and 814 with the midpoint maximum radius $r_m$. The structure can coincide with an imaginary linear line 826 that extends between the pair of corners 812 and 814 of the corner barb 810, as illustrated in FIGS. 41 and 42, although the structure does not have to be linear as in the exemplary embodiments. For example, a radially-inward curved intersection or a of the front ramp and rear wall can define the structure. Yet another alternative is a V-shaped structure between the corners. A pair of generally triangular sidewalls 820 and 822 also extend upward from the body 802, each spanning between edges of the front ramp 816 and the rear wall 818 on a respective side thereof. The intersections of the front ramp 816, rear wall 818 and sidewalls 820 and 822 define the corners 812 and 814.

Although the sidewalls 820 and 822 can be perpendicular to the front ramp 816 and rear wall 818 and parallel to each other, and the rear wall 818 can extend perpendicularly relative to the central axis 803 of the body 802, as illustrated in FIGS. 41-45, other configurations can be utilized, such as illustrated in FIGS. 46-49 (where like numbers refer to like parts). For example, in an alternative corner barb 810' the sidewalls 820' and 822' can be inclined toward each other, being closer together as the extend away from the body 802, as illustrated in FIGS. 46-49. Alone or in combination with the inclined sidewalls 820' and 822', the rear wall 818' can also be inclined at an angle from perpendicular to the central axis 803, such as toward the open end 804. In certain circumstances, having the sidewalls 820' and 822' and/or rear wall 818' inclined can reduce the sharpness of the corners 812' and 814', but also increase their resistance to rounding off or wear.

Figure 50:
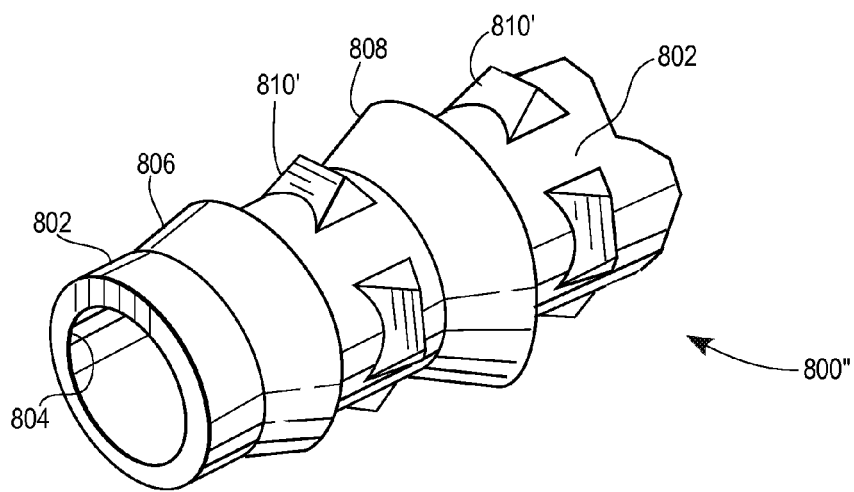
FIG. 50 is a detailed perspective view of yet another alternative corner barb configuration suitable for use with the connection port of the pop-up irrigation device of FIG. 39.

Various permutations in the arrangement of the barbed connection can be provided, such as omitting one or even both of the circumferential barbs 806 and 808 of the embodiments of FIGS. 41-49. Similarly, the number of corner barbs 810 or 810' in a given array or ring can vary, such as one, two, three, four or more, which may or may not be equally spaced. In addition, the corner barbs 810 or 810' can be positioned between, before or after one or both of the circumferential barbs 806 and 808. As illustrated in FIG. 50, a second array or ring of corner barbs 810 or 810' can be provided such that there is one array between the circumferential barbs 806 and 808 and one on an opposite side of the proximate circumferential barb 808 from the open end 804.

Injection molding can be used to make the connection 800. For example, two corner barbs can be equally spaced on a circumference of the body and the barbed connection is injection molded between two or more die cavities with a parting plane parallel to and coinciding with the central axis of the body and the imaginary line of each of the two corner barbs is either parallel or perpendicular to the parting plane. In another example, four corner barbs can be equally spaced on a circumference of the body and the barbed connection is injection molded between two or more die cavities with a parting plane parallel to and coinciding with the central axis of the body and the imaginary line of each of the four corner barbs is either parallel or perpendicular to the parting plane.

The barbed connection 800 can be incorporated into a variety of different structures, such as an irrigation device or a fitting for connecting the device or fitting with one or more different pieces of flexible irrigation tubing. For example, the barbed connection 800 can be incorporated into the pop-up irrigation device of FIG. 22, as illustrated in the modified version thereof in FIGS. 39 and 40, where each of the connection ports 430 incorporates the barbed connection 800 for connecting with irrigation tubing 860 and 862.

The connection 800 can be incorporated into a pair of arms 832 and 834 that are joined by a hollow elbow 836 for form an elbow fitting, as illustrated in FIG. 51. Each of the arms 832 and 834 can have a central axis 803 and 803' that intersect at a 90 degree angle. The connection 800 can also be incorporated into a pair of arms 842 and 844 that are joined by a hollow straight tube 846, as illustrated in FIG. 52. Each of the arms 842 and 844 can have an axis 803 and 803" that are parallel and coincide with each other to form a straight fitting. The connection 800 can also be incorporated into three arms 852, 854 and 856 that joined by T-shaped, hollow component, as illustrated in FIG. 53, to form a T-shaped fitting with two of the central axes 803 and 803" being parallel and coinciding with each other and another of the central axes 803'" being perpendicular thereto.

Figure 54:
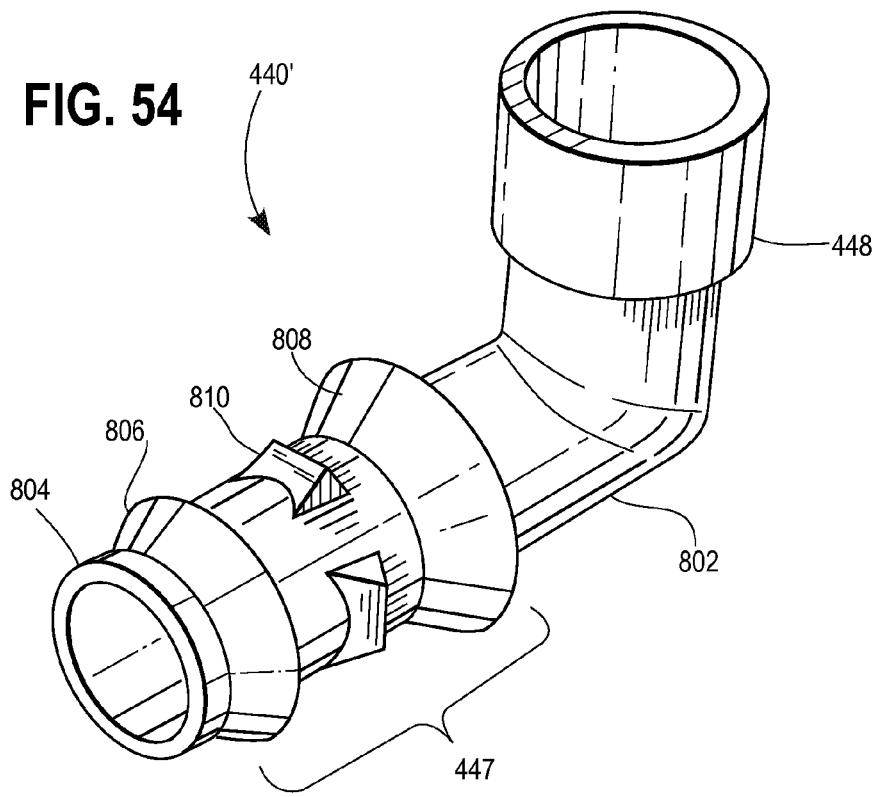
FIG. 54 is a perspective view of a rotatable arm incorporating a corner barb disposed between a pair of circumferential barbs, the arm being configured for attachment to a connection port of a housing of a pop-up irrigation device of the types of FIGS. 22 and 39.
Figure 55:
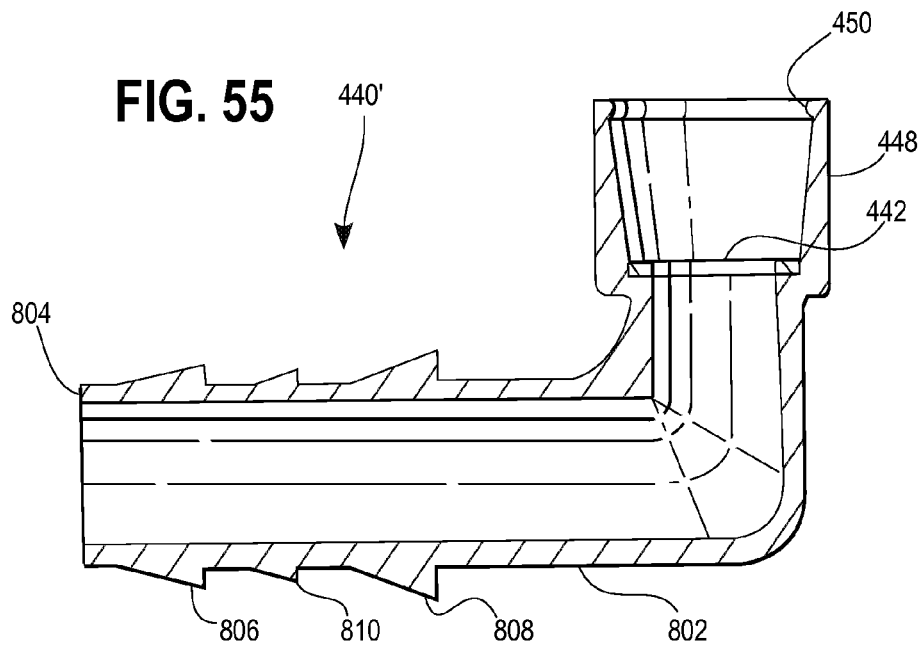
FIG. 55 is a section view of the rotatable arm of FIG. 54.

The connection 800 can also be incorporated into a rotatable elbow 440', illustrated in FIGS. 54 and 55. The rotatable elbow 440' having the connection 800 is the same in other respects to the elbow 440 discussed above with reference to FIGS. 22-24. That is, the rotatable elbow 440' has an end portion 448 with an inner snap bead 450, much like the snap-on cap 214 discussed above, to facilitate the attachment in a manner which allows the elbow 440' to rotate relative to the connection port 430 or 30. A gasket 442 or other sealing member can be carried in the end portion 448 of the elbow 440 for abutting the face of the connection port 430 or 30 for forming a seal. The opposite end portion 447 of the elbow 440 can have a pair of circumferential barbs 806 and 808 with an intermediate corner barb 810 or 810' for attachment of flexible tubing, such as the above-described connections 800.

The drawings and the foregoing descriptions are not intended to represent the only forms of the barbed connection, flush caps, nozzles, flow control adapters, and pop-up and other devices configured for use in a low-pressure irrigation system. Changes in form and in the proportion of parts, as well as the substitution of equivalents, are contemplated as circumstances may suggest or render expedient; and although specific terms have been employed, they are intended in a generic and descriptive sense only and not for the purposes of limitation.

The invention claimed is:

1. A barbed connection for irrigation tubing, the barbed connection comprising a hollow tubular body having a central axis and an open end, a first circumferential barb extending from the body to a first circumferential maximum radius from the central axis and at least one corner barb extending from the body and positioned on an opposite side of the first circumferential barb from the open end of the body, each of the corner barbs having a pair of corners extending to a corner maximum radius from the central axis and an intermediate structure extending between the pair of corners and having a midpoint at a midpoint maximum radius from the central axis, wherein the corner maximum radius is greater than the first circumferential maximum radius and the midpoint maximum radius is less than the first maximum radius, and wherein the corner maximum radius is the radially outermost part of the corner barb.

2. The barbed connection of claim 1, wherein an imaginary linear line extending between the corners is perpendicular to the central axis.

3. The barbed connection of claim 1, wherein each of the at least one corner barbs comprises a front ramp, a rear wall and a pair of side walls spanning between the front ramp and the rear wall, each of the front ramp, rear wall and side walls extending outwardly from the tubular body, the intersection of the front ramp, rear wall and one of the pair of sidewalls defining one of the pair of corners and the intersection of the front ramp, rear wall and the other of the pair of sidewalls defining the other of the pair of corners.

4. The barbed connection of claim 3, wherein two corner barbs are equally spaced on a circumference of the body and the barbed connection is injection molded between at least two die cavities with a parting plane parallel to and coinciding with the central axis of the body and an imaginary linear line extending between each of the corners of the two corner barbs is either parallel or perpendicular to the parting plane.

5. The barbed connection of claim 3, wherein four corner barbs are equally spaced on a circumference of the body and the barbed connection is injection molded between at least two die cavities with a parting plane parallel to and coinciding with the central axis of the body and an imaginary linear line of extending between each of the corners of the four corner barbs is either parallel or perpendicular to the parting plane.

6. The barbed connection of claim 3, wherein an imaginary linear line extending between the corners of the at least one corner barb is perpendicular to the central axis.

7. The barbed connection of claim 6, further comprising a second circumferential barb extending to a second circumferential maximum radius from the central axis is positioned on an opposite side of the at least one corner barb from the first circumferential barb, wherein the second circumferential maximum radius is greater than the first circumferential maximum radius.

8. The barbed connection of claim 7, wherein the second circumferential maximum radius is greater than the corner maximum radius.

9. The barbed connection of claim 1, wherein the barbed connection is incorporated as a connection port of a housing of a pop-up irrigation device.

10. The barbed connection of claim 1, wherein the barbed connection is incorporated as a connection port of a housing of a pop-up irrigation device for use with a low-pressure irrigation system, the device comprising:
   a housing having a sidewall, an open upper end and a lower end defining an interior, the connection port extending from the sidewall of the housing and in fluid communication with the interior of the housing;
   an annular cap attached to the open end of the housing and having an annular, radially-inward extending seal;
   a tubular riser partially extendable from within the housing and through the cap and seal; and
   a removable nozzle body attached to the riser, the nozzle having at least one orifice for discharging fluid from the interior of the housing via the riser.

11. The barbed connection of claim 1, wherein each of the corners of the corner barb has the same corner maximum radius.

12. A barbed connection for irrigation tubing, the barbed connection comprising a hollow tubular body having a central axis and an open end, a first circumferential barb extending from the body to a first circumferential maximum radius from the central axis and at least one corner barb extending from the body and positioned on an opposite side of the first circumferential barb from the open end of the body, each of the corner barbs having a pair of corners extending to a corner maximum radius from the central axis and an intermediate structure extending between the pair of corners and having a midpoint at a midpoint maximum radius from the central axis, wherein the corner maximum radius is greater than the first circumferential maximum radius and the midpoint maximum radius is less than the first maximum radius, further comprising a second circumferential barb extending to a second circumferential maximum radius from the central axis and positioned on an opposite side of the at least one corner barb from the first circumferential barb, wherein the second circumferential maximum radius is greater than the first circumferential maximum radius.

13. The barbed connection of claim 12, wherein a second corner barb is provided between on an opposite side of the second circumferential barb from the other corner barb.

14. The barbed connection of claim 12, wherein the second circumferential maximum radius is greater than the corner maximum radius.

15. A barbed connection for irrigation tubing, the barbed connection comprising a hollow tubular body having a central axis and an open end, a first circumferential barb extending from the body to a first circumferential maximum radius from the central axis and at least one corner barb extending from the body and positioned on an opposite side of the first circumferential barb from the open end of the body, each of the corner barbs having a pair of corners extending to a corner maximum radius from the central axis and an intermediate structure extending between the pair of corners and having a midpoint at a midpoint maximum radius from the central axis, wherein the corner maximum radius is greater than the first circumferential maximum radius and the midpoint maximum radius is less than the first circumferential maximum radius, wherein each of the at least one corner barbs comprises a front ramp, a rear wall and a pair of side walls spanning between the front ramp and the rear wall, each of the front ramp, rear wall and side walls extending outwardly from the tubular body, the intersection of the front ramp, rear wall and one of the pair of sidewalls defining one of the pair of corners and the intersection of the front ramp, rear wall and the other of the pair of sidewalls defining the other of the pair of corners, and wherein each of the pair of sidewalls are parallel.

16. The barbed connection of claim 15, wherein each of the pair of sidewalls are closer together radially outward as compared to where they intersect the body.

17. The barbed connection of claim 15, wherein each of the pair of sidewalls are inclined toward each outwardly from the body.

18. A barbed connection for irrigation tubing, the barbed connection comprising a hollow tubular body having a central axis and an open end, a first circumferential barb extending from the body to a first circumferential maximum radius from the central axis and at least one corner barb extending from the body and positioned on an opposite side of the first circumferential barb from the open end of the body, each of the corner barbs having a pair of corners extending to a corner maximum radius from the central axis and an intermediate structure extending between the pair of corners and having a midpoint at a midpoint maximum radius from the central axis, wherein the corner maximum radius is greater than the first circumferential maximum radius and the midpoint maximum radius is less than the first maximum radius, wherein each of the at least one corner barbs comprises a front ramp, a rear wall and a pair of side walls spanning between the front ramp and the rear wall, each of the front ramp, rear wall and side walls extending outwardly from the tubular body, the intersection of the front ramp, rear wall and one of the pair of sidewalls defining one of the pair of corners and the intersection of the front ramp, rear wall and the other of the pair of sidewalls defining the other of the pair of corners, and wherein the front ramp and rear wall intersect along a linear line defining the intermediate structure and the midpoint thereof.

19. The barbed connection of claim 18, wherein the linear line is perpendicular to the central axis.

* * * * *